(12) United States Patent
Fang et al.

(10) Patent No.: US 12,490,225 B2
(45) Date of Patent: Dec. 2, 2025

(54) POSITIONING METHOD AND APPARATUS, AND READABLE STORAGE MEDIUM

(71) Applicant: DATANG MOBILE COMMUNICATIONS EQUIPMENT CO., LTD., Beijing (CN)

(72) Inventors: Rongyi Fang, Beijing (CN); Ren Da, Beijing (CN); Xiaotao Ren, Beijing (CN); Bin Ren, Beijing (CN); Hui Li, Beijing (CN); Zhenyu Zhang, Beijing (CN); Gang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 305 days.

(21) Appl. No.: 18/551,388

(22) PCT Filed: Mar. 14, 2022

(86) PCT No.: PCT/CN2022/080723
§ 371 (c)(1),
(2) Date: Sep. 19, 2023

(87) PCT Pub. No.: WO2022/206361
PCT Pub. Date: Oct. 6, 2022

(65) Prior Publication Data
US 2024/0179670 A1    May 30, 2024

(30) Foreign Application Priority Data

Apr. 2, 2021  (CN) .......................... 202110362526.4

(51) Int. Cl.
*H04W 64/00*    (2009.01)
*H04L 5/00*    (2006.01)
*H04W 24/10*    (2009.01)

(52) U.S. Cl.
CPC ........... *H04W 64/00* (2013.01); *H04L 5/0051* (2013.01); *H04W 24/10* (2013.01)

(58) Field of Classification Search
CPC ..... H04W 64/00; H04W 24/10; H04W 88/18; H04W 56/0055; H04L 5/0051; H04L 5/0048; G01S 5/0009; G01S 5/021
See application file for complete search history.

(56) References Cited

U.S. PATENT DOCUMENTS 7,548,736 B2 * 6/2009 Sakai ..................... H04L 1/1867
398/140
9,712,316 B2 * 7/2017 Shirakawa ................ H04L 7/04

OTHER PUBLICATIONS

Extended European Search Report for the corresponding European Patent Application No. 22778545.8 issued by the European Patent Office on Mar. 20, 2024.

(Continued)

*Primary Examiner* — Kabir A Timory
(74) *Attorney, Agent, or Firm* — Ladas & Parry, LLP

(57) ABSTRACT

Embodiments of the present disclosure provide a positioning method and apparatus, and a readable storage medium, relating to the technical field of communications. The method includes: obtaining a first timing error group configuration parameter; receiving the first reference signal to obtain first positioning measurement value, and determining first receiving timing errors of the first positioning measurement value; dividing the first receive timing errors into groups according to the first timing error group configuration parameter to obtain at least one first receive timing error group for positioning a UE. The first reference signal includes one of a positioning reference signal and a sounding reference signal; and the first positioning measurement value is used to represent a distance between a transmitting end and the receiving end of the first reference signal. The embodiments of the present disclosure enhance flexibility of (Continued)

positioning services and pertinence of specific scenarios, effectively reduces receiving-transmitting timing errors, thereby improving positioning accuracy.

20 Claims, 9 Drawing Sheets

(56) References Cited

OTHER PUBLICATIONS

"FL Summary #5 for accuracy improvements by mitigating UE Rx/Tx and gNB Rx/Tx timing delays" 3GPP TSG RAN WG1 Meeting #104-e, e-Meeting, Jan. 25-Feb. 5, 2021, R1-2102204, Source: Moderator (CATT), Agenda Item: 8.5.1.

* cited by examiner

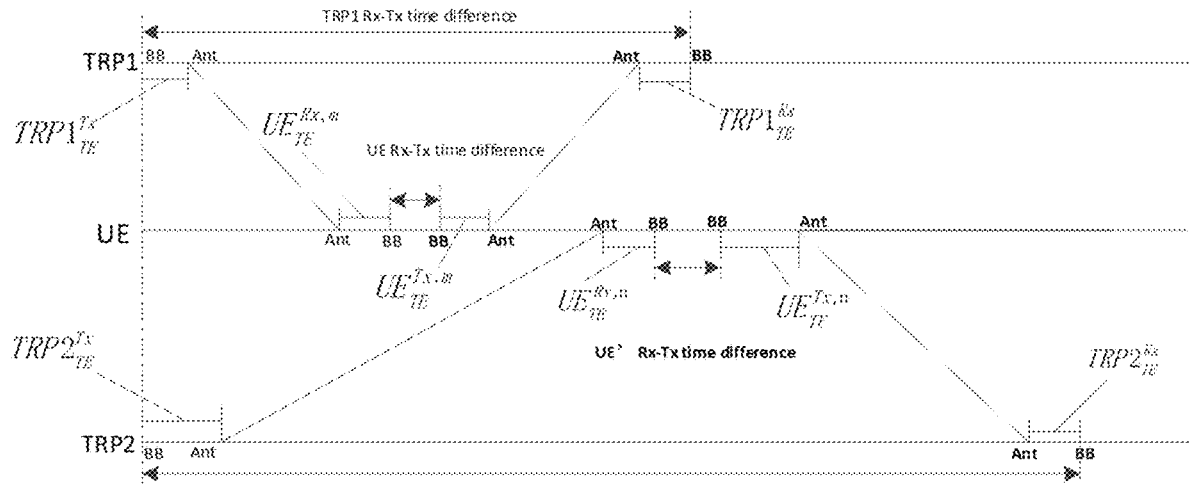

FIG. 8 receiving correspondence information of a first receiving-transmitting time difference from a receiving end of a first reference signal and correspondence information of a second receiving-transmitting time difference from a receiving end of a second reference signal — S301 determining at least two target receiving-transmitting time difference pairs according to the correspondence information of the first receiving-transmitting time difference and the correspondence information of the second receiving-transmitting time difference; where the target receiving-transmitting time difference pair includes a first receiving-transmitting time difference and a second receiving-transmitting time difference. — S302 determining a corresponding round-trip delay according to the target receiving-transmitting time difference, and performing positioning based on the round-trip delay — S303

FIG. 9

POSITIONING METHOD AND APPARATUS, AND READABLE STORAGE MEDIUM

CROSS-REFERENCE TO RELATED APPLICATIONS

This application is the U.S. national phase of PCT Application NO. PCT/CN2022/080723 filed on Mar. 14, 2022, which claims the priority to Chinese application No. 202110362526.4, filed on Apr. 2, 2021, the disclosures of which are incorporated in their entireties by reference herein.

TECHNICAL FIELD

The present disclosure relates to the field of communication technologies, and in particular to a positioning method, an apparatus, and a readable storage medium.

BACKGROUND

In the New Radio (NR) Rel-16 system, reference signals for positioning are newly defined and include a positioning reference signal (PRS) used for downlink positioning and a sounding reference signal (SRS) used for uplink positioning.

At present, when using reference information for positioning, a location is generally calculated according to an arrival time of a reference signal. However, since a transmitting end and a receiving end of the reference signal may have multiple transmitting chains or receiving chains to receive the reference signal, different transmitting chains or receiving chains may have the same or different transmission time delay errors, which results in an inaccurate positioning result.

SUMMARY

Embodiments of the present disclosure provide a positioning method and apparatus, which can overcome the above problems or at least partially solve the above problems.

In a first aspect, a positioning method is provided and includes:
  obtaining a first timing error group configuration parameter;
  receiving the first reference signal to obtain first positioning measurement value, and determining first receiving timing errors of the first positioning measurement value;
  dividing the first receive timing errors into groups according to the first timing error group configuration parameter to obtain at least one first receive timing error group for positioning a UE;
  wherein the first reference signal includes one of a positioning reference signal and a sounding reference signal; and the first positioning measurement value is used to represent a distance between a transmitting end and the receiving end of the first reference signal.

In one possible implementation, the obtaining a first timing error group configuration parameter, includes:
  receiving the first timing error group configuration parameter which is determined by a location management function module according to positioning requirement; wherein the positioning requirement includes at least one of a positioning accuracy of a UE, a positioning scenario, and capability information for indicating that the UE supports dividing timing errors into groups; and the UE is the transmitting end or the receiving end of the first reference signal.

In one possible implementation, the first timing error group configuration parameter includes a first grouping granularity;
  the dividing the first receive timing errors into groups according to the first timing error group configuration parameter to obtain at least one first receive timing error group, includes:
  determining division ranges of first receive timing error groups according to the first grouping granularity;
  dividing the first receive timing errors into groups according to the division ranges, to obtain the at least one first receive timing error group.

In one possible implementation, any one first receive timing error in the first receive timing error group is located in a division range of the first receive timing error group; or,
  a difference between any one first receive timing error in the first receive timing error group and at least one other first receive timing error in the first receive timing error group except for the any one first receive timing error, is located in a division range of the first receive timing error group.

In one possible implementation, the positioning method further includes:
  generating first receive timing error group information;
  wherein the first receive timing error group information includes feature information of the at least one first receive timing error group;
  the feature information includes at least one of an error group identifier, an actual range, and an actual range relative difference.

In one possible implementation, the positioning method further includes:
  determining correspondence information of the first positioning measurement value according to the first receive timing error group information;
  wherein the correspondence information includes the first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

In one possible implementation, the positioning method further includes:
  receiving first transport timing error group information determined by the transmitting end;
  determining correspondence information of the first positioning measurement value, according to the first transport timing error group information and the first receive timing error group information;
  wherein the first transport timing error group information includes feature information of at least one first transport timing error group;
  the correspondence information includes the first positioning measurement value, feature information of a first receive timing error group having a corresponding relationship with the first positioning measurement value and feature information of a first transport timing error group having a corresponding relationship with the first positioning measurement value; a first receive timing error of the first positioning measurement value is located in a division range of the first receive timing error group having the corresponding relationship with the first positioning measurement value; a first transport timing error of the first positioning measurement value is located in a division range of the first transport timing error group having the corresponding relationship with the first positioning measurement value.

In one possible implementation, the positioning method further includes:
  transmitting the correspondence information to a location management function module, thereby enabling the location management function module to perform positioning according to the correspondence information; or,
  when the first reference signal is a positioning reference signal, performing, by the receiving end, positioning according to the correspondence information.

In one possible implementation, the positioning method further includes:
  when the first reference signal is a positioning reference signal, determining at least one pair of first positioning measurement values which are corresponding to different transmitting ends, respectively, as a target first positioning measurement value pair, and obtaining a reference signal timing difference of the target first positioning measurement value pair;
  obtaining correspondence information of each first positioning measurement value in the target first positioning measurement value pair, as target correspondence information of the target first positioning measurement value pair;
  wherein the different transmitting ends include a reference base station and a non-reference base station.

In one possible implementation, the determining at least one pair of first positioning measurement values which are corresponding to different transmitting ends, respectively, as a target first positioning measurement value pair, includes:
  in case that there is a correspondence between the feature information of the same first receive timing error group and two first positioning measurement values corresponding to different transmitting ends respectively, obtaining the target first positioning measurement value pair according to the two first positioning measurement values corresponding to different transmitting ends respectively.

In one possible implementation, the positioning method further includes:
  receiving first transport timing error group information determined by the transmitting end;
  determining correspondence information of the first positioning measurement value, according to the first receive timing error group information and the first transport timing error group information;
  wherein the first transport timing error group information includes feature information of at least one first transport timing error group;
  wherein the correspondence information includes the first positioning measurement value, feature information of a first receive timing error group having a corresponding relationship with the first positioning measurement value and feature information of the first transport timing error group having a corresponding relationship with the first positioning measurement value; a first receive timing error of the first positioning measurement value is located in a division range of the first receive timing error group having the corresponding relationship with the first positioning measurement value; and a first transport timing error of the first positioning measurement value is located in the division range of the first transport timing error group having the corresponding relationship with the first positioning measurement value.

In one possible implementation, the obtaining the target first positioning measurement value pair according to the two first positioning measurement values corresponding to different transmitting ends respectively, includes:
  determining similarity between feature information of a first transport timing error group corresponding to a first positioning measurement value of the reference base station and feature information of a first transport timing error group corresponding to a first positioning measurement value of the non-reference base station;
  taking at least one pair of first positioning measurement values corresponding to different transmitting ends respectively, with the greatest similarity, as the target first positioning measurement value pair.

In one possible implementation, the positioning method further includes:
  transmitting a reference signal timing difference of the target first positioning measurement value pair and the target correspondence information to a location management function module, thereby enabling the location management function module to perform positioning, or,
  performing positioning according to the reference signal timing difference of the target first positioning measurement value pair and the target correspondence information.

In one possible implementation, the positioning method further includes:
  determining second transport timing errors of a second reference signal, and dividing the second transport timing errors into groups according to the first timing error group configuration parameter to obtain second transport timing error group information;
  transmitting the second reference signal to the transmitting end of the first reference signal, and determining a transmitting moment of the second reference signal;
  obtaining a first receiving-transmitting time difference according to a receiving moment of the first reference signal and the transmitting moment of the second reference signal; wherein the first positioning measurement value includes the receiving moment of the first reference signal;
  determining corresponding relationship information of the first receiving-transmitting time difference, and transmitting the corresponding relationship information to a location management function module, thereby enabling the location management function module to perform positioning;
  wherein when the first reference signal is a positioning reference signal, the second reference signal is a sounding reference signal; when the first reference signal is a sounding reference signal, the second reference signal is a positioning reference signal;
  the second transport timing error group information includes feature information of at least one second transport timing error group;
  the corresponding relationship information includes the first receiving-transmitting time difference, feature information of a first receiving-transmitting timing error group having a corresponding relationship with the first receiving-transmitting time difference, and feature information of a second receiving-transmitting timing error group having a corresponding relationship with the first receiving-transmitting time difference;
a first receive timing error corresponding to the first receiving-transmitting time difference is located in a division range of the first receive timing error group having the corresponding relationship with the first receiving-transmitting time difference; a second transport timing error corresponding to the first receiving-transmitting time difference is located in a division range of the second transport timing error group having the corresponding relationship with the first receiving-transmitting time difference.

In one possible implementation, the first positioning measurement value includes a receiving moment of the first reference signal;
the positioning method further includes:
determining a second transport timing error of a second reference signal;
transmitting the second reference signal to the transmitting end of the first reference signal, and determining a transmitting moment of the second reference signal;
wherein the dividing the first receive timing errors into groups according to the first receive timing error group configuration parameter, includes: summing the first receive timing error and the second transport timing error, and dividing summation results into groups according to the first receive timing error group configuration parameter, thereby obtaining first receiving-transmitting timing error group information;
the positioning method further includes:
obtaining a first receiving-transmitting time difference according to the receiving moment of the first reference signal and the transmitting moment of the second reference signal; determining corresponding relationship information of the first receiving-transmitting time difference, and transmitting the corresponding relationship information to a location management function module, thereby enabling the location management function module to perform positioning;
wherein the first receiving-transmitting timing error group information includes feature information of at least one first receiving-transmitting timing error group;
the corresponding relationship information includes the first receiving-transmitting time difference and feature information of a first receiving-transmitting timing error group having a corresponding relationship with the first receiving-transmitting time difference; the first receiving-transmitting timing error group includes a summation result of the first receive timing error of the first reference signal and the second transport timing error of the second reference signal, which are corresponding to the first receiving-transmitting time difference, respectively.

In a second aspect, a positioning method, performed by a transmitting end of a first reference signal, is provided and includes:
obtaining a second timing error group configuration parameter;
determining first transport timing errors of the first reference signal, and dividing the first transport timing errors into groups according to the second timing error group configuration parameter to obtain at least one first transport timing error group;
transmitting the first reference signal;
wherein the first reference signal includes one of a positioning reference signal and a sounding reference signal.

In one possible implementation, the obtaining a second timing error group configuration parameter, includes:
receiving the second timing error group configuration parameter which is determined by a location management function module according to positioning requirement;
wherein the positioning requirement includes at least one of a positioning accuracy of a UE, a positioning scenario, and capability information for indicating that the UE supports dividing timing errors into groups.

In one possible implementation, the second timing error group configuration parameter includes a second grouping granularity;
the dividing the first transport timing errors into groups according to the second timing error group configuration parameter to obtain at least one first transport timing error group, includes:
determining division ranges of first transport timing error groups according to the second grouping granularity;
dividing the first transport timing errors into groups according to the division ranges, to obtain the at least one first transport timing error group.

In one possible implementation, any one first transport timing error in the first transport timing error group is located in a division range of the first transport timing error group; or,
a difference between any one first transport timing error in the first transport timing error group and at least one other first transport timing error in the first transport timing error group except for the any one first transport timing error, is located in a division range of the first transport timing error group.

In one possible implementation, the positioning method further includes:
generating first transport timing error group information;
transmitting the first transport timing error group information to a location management function module;
wherein the first transport timing error group information includes feature information of at least one first transport timing error group;
wherein the feature information includes at least one of an error group identifier, an actual range, and an actual range relative difference.

In one possible implementation, the positioning method further includes:
receiving a second reference signal from a receiving end of the first reference signal, and determining second receive timing errors and a receiving moment of the second reference signal;
dividing the second receive timing errors into groups according to the second timing error group configuration parameter, thereby obtaining second receive timing error group information; wherein the second receive timing error group information includes feature information of at least one second receive timing error group;
determining a second receiving-transmitting time difference according to the receiving moment of the second reference signal and a transmitting moment of the first reference signal;
determining correspondence information of the second receiving-transmitting time difference, and transmitting the correspondence information to a location management function module, thereby enabling the location management function module to perform positioning;
wherein when the first reference signal is a positioning reference signal, the second reference signal is a sounding reference signal; when the first reference signal is a sounding reference signal, the second reference signal is a positioning reference signal;

the correspondence information includes the second receiving-transmitting time difference, feature information of a second receiving-transmitting timing error group having a corresponding relationship with the second receiving-transmitting time difference, and feature information of a first receiving-transmitting timing error group having a corresponding relationship with the second receiving-transmitting time difference;

a second receive timing error corresponding to the second receiving-transmitting time difference is located in a division range of a second receive timing error group having a corresponding relationship with the second receiving-transmitting time difference; a first transport timing error corresponding to the second receiving-transmitting time difference is located in a division range of a first transport timing error group having a corresponding relationship with the second receiving-transmitting time difference.

In one possible implementation, the positioning method further includes:

receiving a second reference signal from a receiving end of the first reference signal to obtain a second positioning measurement value; wherein the second positioning measurement value includes a receiving moment of the second reference signal; and determining a second receive timing error of the second reference signal;

the dividing the first transport timing errors into groups according to the second timing error group configuration parameter, includes: summing the second receive timing error and the first transport timing error, and dividing summation results into groups according to the second timing error group configuration parameter, thereby obtaining second receiving-transmitting timing error group information;

wherein the positioning method further includes:

obtaining a second receiving-transmitting time difference according to the receiving moment of the second reference signal and the transmitting moment of the first reference signal, determining correspondence information of the second receiving-transmitting time difference, and transmitting the correspondence information to a location management function module, thereby enabling the location management function module to perform positioning;

wherein the receiving-transmitting timing error group information includes feature information of at least one receiving-transmitting timing error group;

wherein the correspondence information includes the second receiving-transmitting time difference and feature information of a second receiving-transmitting timing error group having a corresponding relationship with the second receiving-transmitting time difference; the second receiving-transmitting timing error group includes a summation result of the second receive timing error of the second reference signal and the first transport timing error of the first reference signal, which are corresponding to the second receiving-transmitting time difference, respectively.

In a third aspect, a positioning method, performed by a location management function module, is provided and includes:

transmitting a first timing error group configuration parameter to a receiving end of a first reference signal, thereby enabling the receiving end to obtain first receive timing error group information according to the first timing error group configuration parameter;

wherein the first reference signal is a positioning reference signal or a sounding reference signal;

the first receive timing error group information includes feature information of at least one first receive timing error group; the feature information includes at least one of an error group identifier, an actual range, and an actual range relative difference.

In one possible implementation, the positioning method further includes:

receiving correspondence information from the receiving end of the first reference signal, and performing positioning according to the correspondence information;

wherein the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value;

the first positioning measurement value is used to represent a distance between a transmitting end and the receiving end of the first reference signal.

In one possible implementation, the performing positioning according to the correspondence information, includes:

when the first reference signal is a positioning reference signal, obtaining a reference signal timing difference according to first positioning measurement values which are corresponding to the feature information of the same first receive timing error group and respectively corresponding to different transmitting ends; and performing positioning according to the reference signal timing difference;

when the first reference signal is a sounding reference signal, obtaining a difference of first positioning measurement values which are corresponding to different transmitting ends, and performing positioning based on an obtained difference;

wherein the different transmitting ends include a reference base station and a non-reference base station.

In one possible implementation, the positioning method further includes:

transmitting a second timing error group configuration parameter to a transmitting end of the first reference signal, thereby enabling the transmitting end of the first reference signal to obtain first transport timing error group information according to the second timing error group configuration parameter;

wherein the first transport timing error group information includes feature information of at least one first transport timing error group.

In one possible implementation, the positioning method further includes:

receiving first transport timing error group information from the transmitting end of the first reference signal, and transmitting the first transport timing error group information to the receiving end of the first reference signal, thereby enabling the receiving end of the first reference signal to generate correspondence information;

receiving the correspondence information from the receiving end of the first reference signal, and performing positioning according to the correspondence information;

wherein the first transport timing error group information includes feature information of at least one first transport timing error group;

wherein the correspondence information includes corresponding relationship among a first positioning measurement value, the feature information of the first receive timing error group, and the feature information of the first transport timing error group; a first receive timing error of the first positioning measurement value is located in a division range of a first receive timing error group having the corresponding relationship with the first positioning measurement value; a first transport timing error of the first reference signal corresponding to the first positioning measurement value is located in a division range of the first transport timing error group having the corresponding relationship with the first positioning measurement value.

In one possible implementation, the performing positioning according to the correspondence information, includes:

taking first positioning measurement value pairs, which are corresponding to feature information of the same first receive timing error group and respectively corresponding to different transmitting ends, as a basic first positioning measurement value pair;

determining similarity between feature information of first transport timing error groups corresponding to any basic first positioning measurement value pairs;

determining a difference between two first positioning measurement values in at least one basic first positioning measurement value pair with the greatest similarity, and performing positioning according to the difference.

In one possible implementation, the positioning method further includes:

receiving correspondence information of a first receiving-transmitting time difference from the receiving end of the first reference signal and correspondence information of a second receiving-transmitting time difference from a receiving end of the second reference signal;

determining at least two target receiving-transmitting time difference pairs according to the correspondence information of the first receiving-transmitting time difference and the correspondence information of the second receiving-transmitting time difference; wherein the target receiving-transmitting time difference pair includes a first receiving-transmitting time difference and a second receiving-transmitting time difference;

determining a corresponding round-trip delay according to the target receiving-transmitting time difference, and performing positioning based on the round-trip delay;

wherein the transmitting end of the second reference signal is the receiving end of the first reference signal, and the first receiving-transmitting time difference is obtained by the receiving end of the first reference signal according to a receiving moment of the first reference signal and a transmitting moment of the second reference signal;

wherein the receiving end of the second reference signal is a transmitting end of the first reference signal; the second receiving-transmitting time difference is obtained by the receiving end of the second reference signal according to a receiving moment of the second reference signal and a transmitting moment of the first reference signal.

In one possible implementation, the correspondence information of the first receiving-transmitting time difference includes the first receiving-transmitting time difference, feature information of the first receive timing error group having a corresponding relationship with the first receiving-transmitting time difference, and feature information of the second transport timing error group having a corresponding relationship with the first receiving-transmitting time difference;

a first receive timing error corresponding to the first receiving-transmitting time difference is located in a division range of the first receive timing error group having the corresponding relationship with the first receiving-transmitting time difference; a second transport timing error corresponding to the first receiving-transmitting time difference is located in a division range of the second transport timing error group having the corresponding relationship with the first receiving-transmitting time difference;

the correspondence information of the second receiving-transmitting time difference includes the second receiving-transmitting time difference, feature information of the second receive timing error group having a corresponding relationship with the second receiving-transmitting time difference, and feature information of the first transport timing error group having a corresponding relationship with the second receiving-transmitting time difference;

second receive timing error corresponding to the second receiving-transmitting time difference is located in a division range of the second receive timing error group having the corresponding relationship with the second receiving-transmitting time difference; a first transport timing error corresponding to the second receiving-transmitting time difference is located in a division range of the first transport timing error group having the corresponding relationship with the second receiving-transmitting time difference;

for a first receiving-transmitting time difference in any two target receiving-transmitting time difference pairs: similarity of feature information of the first receive timing error groups that have corresponding relationship with first receive timing errors which are corresponding to two first receiving-transmitting time differences respectively, is greater than a first preset threshold; similarity of feature information of the second transport timing error groups that have corresponding relationship with second transport timing errors which are corresponding to two first receiving-transmitting time differences respectively, is greater than a second preset threshold;

for a second receiving-transmitting time difference in any two target receiving-transmitting time difference pairs: similarity of feature information of the second receive timing error groups that have corresponding relationship with second receive timing errors which are corresponding to two second receiving-transmitting time differences respectively, is greater than a third preset threshold; similarity of feature information of the first transport timing error groups that have corresponding relationship with first transport timing errors which are corresponding to two second receiving-transmitting time differences respectively, is greater than a fourth preset threshold.

In one possible implementation, the correspondence information of the first receiving-transmitting time difference includes the first receiving-transmitting time difference and feature information of a first receiving-transmitting timing error group having a corresponding relationship with the first receiving-transmitting time difference; the first receiving-transmitting timing error group includes a summation result of the first receive timing error of the first reference signal and the second transport timing error of the second reference signal, which are corresponding to the first receiving-transmitting time difference, respectively;

the correspondence information of the second receiving-transmitting time difference includes the second receiving-transmitting time difference and feature information of a second receiving-transmitting timing error group having a corresponding relationship with the second receiving-transmitting time difference; the second receiving-transmitting timing error group includes a summation result of the second receive timing error of the second reference signal and the first transport timing error of the first reference signal, which are corresponding to the second receiving-transmitting time difference, respectively;

in case that two receiving-transmitting time difference pairs which are corresponding to different base stations, respectively, have corresponding relationship with feature information of the same receiving-transmitting timing error group, then the two receiving-transmitting time difference pairs which are corresponding to different base stations, are taken as two target receiving-transmitting time difference pairs.

In a fourth aspect, an apparatus is provided and includes: a memory, a transceiver and a processor;

wherein the memory is used to store a computer program; the transceiver is used to transmit and receive data under the control of the processor; the processor is used to read the computer program in the memory and perform the following operations:

obtaining a first timing error group configuration parameter;

receiving the first reference signal to obtain first positioning measurement value, and determining first receiving timing errors of the first positioning measurement value;

dividing the first receive timing errors into groups according to the first timing error group configuration parameter to obtain at least one first receive timing error group for positioning a UE;

wherein the first reference signal includes one of a positioning reference signal and a sounding reference signal; and the first positioning measurement value is used to represent a distance between a transmitting end and the receiving end of the first reference signal.

In one possible implementation, the obtaining a first timing error group configuration parameter, includes:

receiving the first timing error group configuration parameter which is determined by a location management function module according to positioning requirement;

wherein the positioning requirement includes at least one of a positioning accuracy of a UE, a positioning scenario, and capability information for indicating that the UE supports dividing timing errors into groups; and the UE is the transmitting end or the receiving end of the first reference signal.

In one possible implementation, the first timing error group configuration parameter includes a first grouping granularity;

the dividing the first receive timing errors into groups according to the first timing error group configuration parameter to obtain at least one first receive timing error group, includes:

determining division ranges of first receive timing error groups according to the first grouping granularity;

dividing the first receive timing errors into groups according to the division ranges, to obtain the at least one first receive timing error group.

In one possible implementation, any one first receive timing error in the first receive timing error group is located in a division range of the first receive timing error group; or, a difference between any one first receive timing error in the first receive timing error group and at least one other first receive timing error in the first receive timing error group except for the any one first receive timing error, is located in a division range of the first receive timing error group.

In one possible implementation, the apparatus is configured to perform the following operations:

generating first receive timing error group information;

wherein the first receive timing error group information includes feature information of the at least one first receive timing error group;

the feature information includes at least one of an error group identifier, an actual range, and an actual range relative difference.

In one possible implementation, the apparatus is configured to perform the following operations:

determining correspondence information of the first positioning measurement value according to the first receive timing error group information;

wherein the correspondence information includes the first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

In one possible implementation, the apparatus is configured to perform the following operations:

receiving first transport timing error group information determined by the transmitting end;

determining correspondence information of the first positioning measurement value, according to the first transport timing error group information and the first receive timing error group information;

wherein the first transport timing error group information includes feature information of at least one first transport timing error group;

the correspondence information includes the first positioning measurement value, feature information of a first receive timing error group having a corresponding relationship with the first positioning measurement value and feature information of a first transport timing error group having a corresponding relationship with the first positioning measurement value; a first receive timing error of the first positioning measurement value is located in a division range of the first receive timing error group having the corresponding relationship with the first positioning measurement value; a first transport timing error of the first positioning measurement value is located in a division range of the first transport timing error group having the corresponding relationship with the first positioning measurement value.

In one possible implementation, the apparatus is configured to perform the following operations:

transmitting the correspondence information to a location management function module, thereby enabling the location management function module to perform positioning according to the correspondence information; or, when the first reference signal is a positioning reference signal, performing, by the receiving end, positioning according to the correspondence information.

In a fifth aspect, an apparatus is provided and includes: a memory, a transceiver and a processor;

wherein the memory is used to store a computer program; the transceiver is used to transmit and receive data under the control of the processor; the processor is used to read the computer program in the memory and perform the following operations:

obtaining a second timing error group configuration parameter;

determining first transport timing errors of the first reference signal, and dividing the first transport timing errors into groups according to the second timing error group configuration parameter to obtain at least one first transport timing error group;

transmitting the first reference signal;

wherein the first reference signal includes one of a positioning reference signal and a sounding reference signal.

In one possible implementation, the obtaining a second timing error group configuration parameter, includes:

receiving the second timing error group configuration parameter which is determined by a location management function module according to positioning requirement;

wherein the positioning requirement includes at least one of a positioning accuracy of a UE, a positioning scenario, and capability information for indicating that the UE supports dividing timing errors into groups.

In one possible implementation, the second timing error group configuration parameter includes a second grouping granularity;

the dividing the first transport timing errors into groups according to the second timing error group configuration parameter to obtain at least one first transport timing error group, includes:

determining division ranges of first transport timing error groups according to the second grouping granularity;

dividing the first transport timing errors into groups according to the division ranges, to obtain the at least one first transport timing error group.

In one possible implementation, any one first transport timing error in the first transport timing error group is located in a division range of the first transport timing error group; or, a difference between any one first transport timing error in the first transport timing error group and at least one other first transport timing error in the first transport timing error group except for the any one first transport timing error, is located in a division range of the first transport timing error group.

In one possible implementation, the apparatus is configured to perform the following operations:

generating first transport timing error group information; transmitting the first transport timing error group information to a location management function module;

wherein the first transport timing error group information includes feature information of at least one first transport timing error group;

wherein the feature information includes at least one of an error group identifier, an actual range, and an actual range relative difference.

In a sixth aspect, an apparatus is provided and includes: a memory, a transceiver and a processor;

wherein the memory is used to store a computer program; the transceiver is used to transmit and receive data under the control of the processor; the processor is used to read the computer program in the memory and perform the following operations:

transmitting a first timing error group configuration parameter to a receiving end of a first reference signal, thereby enabling the receiving end to obtain first receive timing error group information according to the first timing error group configuration parameter;

wherein the first reference signal is a positioning reference signal or a sounding reference signal;

the first receive timing error group information includes feature information of at least one first receive timing error group; the feature information includes at least one of an error group identifier, an actual range, and an actual range relative difference.

In one possible implementation, wherein the apparatus is configured to perform the following operations:

receiving correspondence information from the receiving end of the first reference signal, and performing positioning according to the correspondence information;

wherein the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value;

the first positioning measurement value is used to represent a distance between a transmitting end and the receiving end of the first reference signal.

In one possible implementation, the performing positioning according to the correspondence information, includes:

when the first reference signal is a positioning reference signal, obtaining a reference signal timing difference according to first positioning measurement values which are corresponding to the feature information of the same first receive timing error group and respectively corresponding to different transmitting ends; and performing positioning according to the reference signal timing difference;

when the first reference signal is a sounding reference signal, obtaining a difference of first positioning measurement values which are corresponding to different transmitting ends, and performing positioning based on an obtained difference;

wherein the different transmitting ends include a reference base station and a non-reference base station.

In one possible implementation, the apparatus is configured to perform the following operations:

transmitting a second timing error group configuration parameter to a transmitting end of the first reference signal, thereby enabling the transmitting end of the first reference signal to obtain first transport timing error group information according to the second timing error group configuration parameter;

wherein the first transport timing error group information includes feature information of at least one first transport timing error group.

In one possible implementation, the apparatus is configured to perform the following operations:

receiving first transport timing error group information from the transmitting end of the first reference signal, and transmitting the first transport timing error group information to the receiving end of the first reference signal, thereby enabling the receiving end of the first reference signal to generate correspondence information;

receiving the correspondence information from the receiving end of the first reference signal, and performing positioning according to the correspondence information;

wherein the first transport timing error group information includes feature information of at least one first transport timing error group;

wherein the correspondence information includes corresponding relationship among a first positioning measurement value, the feature information of the first receive timing error group, and the feature information of the first transport timing error group; a first receive timing error of the first positioning measurement value is located in a division range of a first receive timing error group having the corresponding relationship with the first positioning measurement value; a first transport timing error of the first reference signal corresponding to the first positioning measurement value is located in a division range of the first transport timing error group having the corresponding relationship with the first positioning measurement value.

In one possible implementation, the performing positioning according to the correspondence information, includes:
taking first positioning measurement value pairs, which are corresponding to feature information of the same first receive timing error group and respectively corresponding to different transmitting ends, as a basic first positioning measurement value pair;
determining similarity between feature information of first transport timing error groups corresponding to any basic first positioning measurement value pairs;
determining a difference between two first positioning measurement values in at least one basic first positioning measurement value pair with the greatest similarity, and performing positioning according to the difference.

In one possible implementation, the apparatus is configured to perform the following operations: receiving correspondence information of a first receiving-transmitting time difference from the receiving end of the first reference signal and correspondence information of a second receiving-transmitting time difference from a receiving end of the second reference signal;
determining at least two target receiving-transmitting time difference pairs according to the correspondence information of the first receiving-transmitting time difference and the correspondence information of the second receiving-transmitting time difference; wherein the target receiving-transmitting time difference pair includes a first receiving-transmitting time difference and a second receiving-transmitting time difference;
determining a corresponding round-trip delay according to the target receiving-transmitting time difference, and performing positioning based on the round-trip delay;
wherein the transmitting end of the second reference signal is the receiving end of the first reference signal, and the first receiving-transmitting time difference is obtained by the receiving end of the first reference signal according to a receiving moment of the first reference signal and a transmitting moment of the second reference signal;
wherein the receiving end of the second reference signal is a transmitting end of the first reference signal; the second receiving-transmitting time difference is obtained by the receiving end of the second reference signal according to a receiving moment of the second reference signal and a transmitting moment of the first reference signal.

In one possible implementation, the correspondence information of the first receiving-transmitting time difference includes the first receiving-transmitting time difference, feature information of the first receive timing error group having a corresponding relationship with the first receiving-transmitting time difference, and feature information of the second transport timing error group having a corresponding relationship with the first receiving-transmitting time difference;
a first receive timing error corresponding to the first receiving-transmitting time difference is located in a division range of the first receive timing error group having the corresponding relationship with the first receiving-transmitting time difference; a second transport timing error corresponding to the first receiving-transmitting time difference is located in a division range of the second transport timing error group having the corresponding relationship with the first receiving-transmitting time difference;
the correspondence information of the second receiving-transmitting time difference includes the second receiving-transmitting time difference, feature information of the second receive timing error group having a corresponding relationship with the second receiving-transmitting time difference, and feature information of the first transport timing error group having a corresponding relationship with the second receiving-transmitting time difference;
a second receive timing error corresponding to the second receiving-transmitting time difference is located in a division range of the second receive timing error group having the corresponding relationship with the second receiving-transmitting time difference; a first transport timing error corresponding to the second receiving-transmitting time difference is located in a division range of the first transport timing error group having the corresponding relationship with the second receiving-transmitting time difference;
for a first receiving-transmitting time difference in any two target receiving-transmitting time difference pairs: similarity of feature information of the first receive timing error groups that have corresponding relationship with first receive timing errors which are corresponding to two first receiving-transmitting time differences respectively, is greater than a first preset threshold; similarity of feature information of the second transport timing error groups that have corresponding relationship with second transport timing errors which are corresponding to two first receiving-transmitting time differences respectively, is greater than a second preset threshold;
for a second receiving-transmitting time difference in any two target receiving-transmitting time difference pairs: similarity of feature information of the second receive timing error groups that have corresponding relationship with second receive timing errors which are corresponding to two second receiving-transmitting time differences respectively, is greater than a third preset threshold; similarity of feature information of the first transport timing error groups that have corresponding relationship with first transport timing errors which are corresponding to two second receiving-transmitting time differences respectively, is greater than a fourth preset threshold.

In one possible implementation, the correspondence information of the first receiving-transmitting time difference includes the first receiving-transmitting time difference and feature information of a first receiving-transmitting timing error group having a corresponding relationship with the first receiving-transmitting time difference; the first receiving-transmitting timing error group includes a summation result of the first receive timing error of the first reference signal and the second transport timing error of the second reference signal, which are corresponding to the first receiving-transmitting time difference, respectively;

the correspondence information of the second receiving-transmitting time difference includes the second receiving-transmitting time difference and feature information of a second receiving-transmitting timing error group having a corresponding relationship with the second receiving-transmitting time difference; the second receiving-transmitting timing error group includes a summation result of the second receive timing error of the second reference signal and the first transport timing error of the first reference signal, which are corresponding to the second receiving-transmitting time difference, respectively;

in case that two receiving-transmitting time difference pairs which are corresponding to different base stations, respectively, have corresponding relationship with feature information of the same receiving-transmitting timing error group, then the two receiving-transmitting time difference pairs which are corresponding to different base stations, are taken as two target receiving-transmitting time difference pairs.

In a seventh aspect, one embodiment of the present disclosure provides a positioning apparatus, including:

a first configuration parameter obtaining module configured to obtain a first timing error group configuration parameter;

a first receive timing error obtaining module configured to receive a first reference signal to obtain first positioning measurement values, and determine first receiving timing errors of the first positioning measurement values;

a first grouping module configured to divide the first receive timing errors into groups according to the first timing error group configuration parameter to obtain at least one first receive timing error group for positioning a UE;

wherein the first reference signal includes one of a positioning reference signal and a sounding reference signal; the first positioning measurement value is used to represent a distance between a transmitting end and a receiving end of the first reference signal.

In an eighth aspect, one embodiment of the present disclosure provides a positioning apparatus, including:

a second configuration parameter obtaining module configured to obtain a second timing error group configuration parameter;

a second grouping module configured to determine first transport timing errors of a first reference signal, and divide the first transport timing errors into groups according to the second timing error group configuration parameter to obtain first transport timing error groups;

a first resource transmitting module configured to transmit the first reference signal;

wherein the first reference signal includes one of a positioning reference signal and a sounding reference signal.

In a ninth aspect, one embodiment of the present disclosure provides a positioning apparatus, including:

a first configuration parameter transmitting module configured to transmit a first timing error group configuration parameter to a receiving end of a first reference signal, thereby enabling the receiving end to obtain first receive timing error group information according to the first timing error group configuration parameter;

wherein the first reference signal is a positioning reference signal or a sounding reference signal;

wherein the first receive timing error group information includes feature information of at least one first receive timing error group; the feature information includes at least one of an error group identifier, an actual range, and an actual range relative difference.

In a tenth aspect, one embodiment of the present disclosure provides a processor-readable storage medium, including a computer program stored thereon; wherein the computer program is configured to cause a processor to perform the method provided in the first to third aspects.

According to the positioning method, apparatus and processor-readable storage medium provided in the embodiment of the present disclosure, by obtaining the first timing error group configuration parameter which is used for dividing first receive timing errors in first positioning measurement values into groups, the receiving end of the first reference signal receives the first reference signal, then obtains first positioning measurement values and first receiving timing errors of the first positioning measurement values, and then divides the first receive timing errors into groups according to the first timing error group configuration parameter to obtain the first receive timing error group, so that in case that RSTD and/or TDOA is used for subsequent positioning, a smallest possible result can be obtained when obtaining a difference between first receive timing errors of first positioning measurement values which are corresponding to the same receive timing error group but belong to different first positioning measurement values (which are corresponding to different transmitting ends), thereby improving positioning accuracy.

BRIEF DESCRIPTION OF THE DRAWINGS

In order to illustrate technical solutions according to embodiments of the present disclosure more clearly, drawings to be used in the description of the embodiments will be described briefly hereinafter.

FIG. 8 is a schematic diagram exemplarily showing interaction between UE, TRP and LMF in uplink positioning according to an embodiment of the present disclosure;

FIG. 9 is a schematic flowchart of performing multi (round-trip time) RTT positioning on LMF side according to an embodiment of the present disclosure;

DETAILED DESCRIPTION

Figure 1:
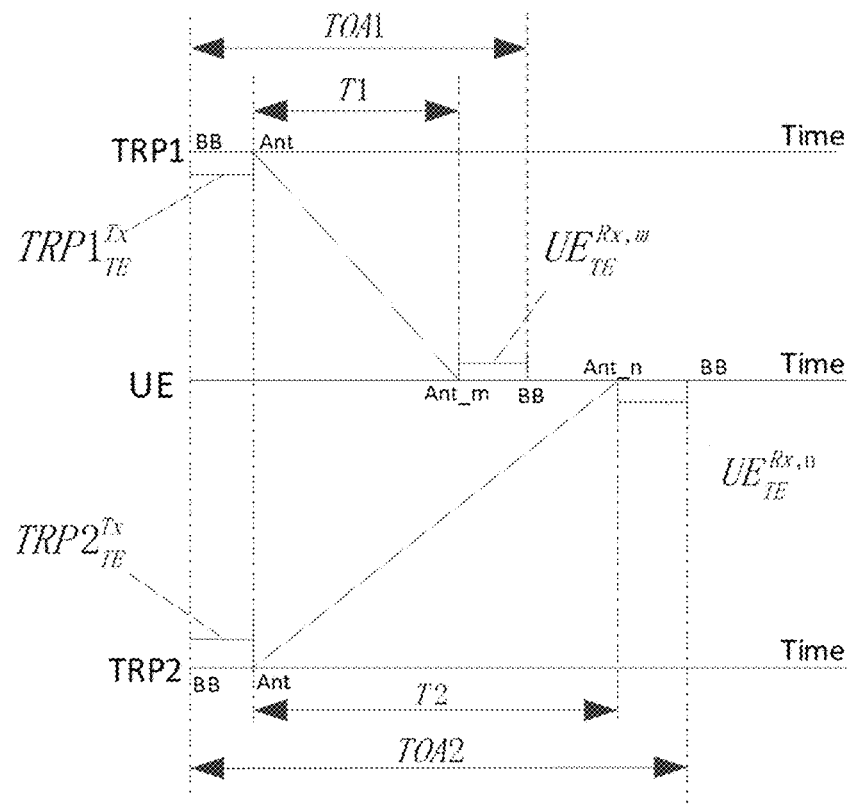
FIG. 1 is a schematic diagram exemplarily showing influence of a receive timing error of a UE on a TOA measurement value in a downlink positioning process according to an embodiment of the present disclosure.

Embodiments of the present disclosure are described in detail hereinafter. Examples of the embodiments are shown in the accompanying drawings, and the same or similar reference numerals throughout the drawings represent the same or similar elements or elements having the same or similar functions. The embodiments described hereinafter with reference to the drawings are exemplary and are only used for explaining the present disclosure, and should not be construed as limiting to the present invention.

It is to be understood by those skilled in the art that the singular forms "a", "an" and "the" used herein include plural aspects unless the context clearly dictates otherwise. It is to be further understood that the word "include" as used in the description of the present disclosure refers to presence of features, integers, steps, operations, elements and/or components, but does not exclude the presence or addition of one or more other features, integers, steps, operations, elements, components and/or groups thereof. It is to be understood that in the present disclosure, when one element is "connected" or "coupled" to another element, the one element may be directly connected or coupled to another element, or an intervening element may also be present. In addition, "connected" or "coupled" as used herein may include wireless connection or wireless coupling. The expression "and/or" as used herein includes all or any elements and all combinations of one or more associated listed items.

In order to make objects, technical solutions and advantages of the present disclosure more apparent, the embodiments of the present disclosure are described in details hereinafter below with reference to the accompanying drawings.

The technical solutions provided in the embodiments of the present disclosure may be applicable to various systems, especially the fifth generation communication (5G) system. For example, applicable systems may be global system of mobile communication (GSM) system, code division multiple access (CDMA) system, wideband code division multiple access (WCDMA) general packet wireless service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, etc. Each of the various systems includes a user equipment and a network device. The system may further include a core network part, such as an evolved packet system (EPS), a 5G system (5GS).

A terminal involved in the embodiments of the present disclosure may be a device that provides voice and/or data connectivity to a user, a handheld device with a wireless connection function, or other processing device coupled to a wireless modem. In different systems, names of the terminal may be different. For example, in the 5G system, the terminal may be referred as user equipment (UE). A wireless terminal device may communicate with one or more core networks (CN) via a radio access network (RAN). The wireless terminal device may be a mobile terminal device such as a mobile phone (or referred as cell phone), or a computer with a mobile terminal device, such as a portable, pocket-sized, handheld, computer built-in or vehicle-mounted mobile device, which exchange language and/or data with wireless access networks, for example, a personal communication service (PCS) phone, a cordless phone, a session initiated protocol (SIP) phone, a wireless local loop (WLL) station, a personal digital assistant (PDA) and other device. The wireless terminal device may also be referred to as system, subscriber unit, subscriber station, mobile station, mobile, remote station, access point, remote terminal, access terminal, user terminal, user agent, or user device, which are not limited in the embodiments of the present disclosure.

A base station involved in the embodiments of the present disclosure may include a plurality of cells for providing services for the terminal. According to different specific application scenarios, the base station may also be referred as an access point, or the base station may be a device in an access network that communicates with wireless terminal devices through one or more sectors on air interfaces, or other names. The network device may be used to exchange received frames with internet protocol (IP) packets, and act as a router between the wireless terminal device and the rest of the access network, where the rest of the access network may include an internet protocol (IP) communication network. The network device may also coordinate attribute management for air interfaces. For example, the network device involved in the embodiments of the present disclosure may be a base transceiver station (BTS) in global system for mobile communications (GSM) or code division multiple access (CDMA), a NodeB in wide-band code division multiple access (WCDMA), an evolutional Node B (eNB or e-NodeB) in long term evolution (LTE) system, a 5G base station (gNB) in the 5G network architecture (next generation system), a home evolved Node B (HeNB), a relay node, a femto, a pico, or a transmit receive point (TRP), which are not limited in the embodiments of the present disclosure. In some network structures, the base station may include a centralized unit (CU) node and a distributed unit (DU) node; and the centralized unit and the distributed unit may also be geographically separated.

Each of the base station and the terminal can use one or more antennas for multi input multi output (MIMO) transmission between the base station and the terminal. The MIMO transmission may be single user MIMO (SU-MIMO), or multiple user MIMO (MU-MIMO). According to forms and numbers of antenna combinations, MIMO transmission may be two dimensional-MIMO (2D-MIMO), three dimensional-MIMO (3D-MIMO), full dimensional-MIMO (FD-MIMO), or massive-MIMO, or diversity transmission, precoding transmission, or beamforming transmission.

A location management function (LMF) entity involved in the embodiments of the present disclosure is used in core network location management function for providing location service, and obtains propagation delay of a wireless location signal from a transmitting end to a receiving end and a distance between the transmitting end and the receiving end by measuring time of arrival (TOA) of the wireless location signal to the receiving end.

A transport timing error (Tx TE) involved in the embodiments of the present disclosure mainly includes, from a signal being generated at a baseband (BB) to being transmitted out at a radio frequency end, a group delay introduced by a filter or a corrected group delay residual value, and a delay deviation caused by an offset between a reference phase center and a physical antenna phase center. In downlink positioning, a transport timing error is a transport timing error which occurs when a base station transmits PRS; and in uplink positioning, a transport timing error is a transport timing error which occurs when a terminal transmits SRS.

A receive timing error (Rx TE) involved in the embodiments of the present disclosure mainly includes, from receiving a signal at a radio frequency end, to, before processing the signal at a baseband side, a group delay introduced by a filter or a corrected group delay residual value, and a delay deviation caused by an offset between a reference phase center and a physical antenna phase center. In downlink positioning, a receive timing error is a receive timing error which occurs when a terminal receives PRS; and in uplink positioning, a receive timing error is a receive timing error which occurs when the base station receives SRS.

For the sake of description, the following embodiments of the present disclosure use TRP as an example to describe the base station. For downlink positioning, the transport timing error may be further expressed as TRP Tx TE, and the receive timing error may be further expressed as UE Rx TE. For uplink positioning, the transport timing error may be further expressed as UE Tx TE, and the receive timing error may be further expressed as TRP Rx TE. For multi RTT positioning, since UE needs to transmit SRS to TRP and receive PRS and PRS needs to transmits the PRS to the UE and receives the SRS, the transport timing error includes both of TRP Tx TE and UE Tx TE, and the receive timing error also includes both of UE Rx TE and TRP Rx TE.

For transport timing error group (UE Tx TEG) of UE, one UE Tx TEG is associated with one or more UL positioning reference signal (UL SRS, also referred to as SRS) resources, and transport timing errors (UE Tx TE) of positioning UL SRS resources in the same UE Tx TEG are within the same range.

For receive timing error group (UE Rx TEG) of UE, one UE Rx TEG is associated with one or more UE positioning measurement values (TOA measurement values); receive timing errors (UE Rx TE) of UE positioning measurement values in the same UE Rx TEG are within the same range.

For transport timing error group of (TRP Tx TEG) of a transmit receive point (TRP), one TRP Tx TEG is associated with one or more DL positioning reference signals (such as DL PRS, also referred to as PRS); transport timing errors (TRP Tx TE) of DL PRS in the same TRP Tx TEG are within the same range.

For receive timing error group of (TRP Rx TEG) of a transmit receive point (TRP), one TRP Rx TEG is associated with one or more TRP positioning measurement values, and the TRP positioning measurement value may be a relative time of arrival (RTOA) measurement value.

Multi RTT involved in the present disclosure, also known as multi-cell RTT, means that a base station and a UE perform Rx-Tx timing difference measurements on a signal of each cell. Measurement reports from the UE and the base station are reported to LMF to determine round-trip time of each cell and obtain the UE's location.

The network architecture and service scenarios described in the embodiments of the present disclosure are used to illustrate the technical solutions of the embodiments of the present disclosure more clearly, and do not constitute limitations to the technical solutions of the embodiments of the present disclosure. Those of ordinary skill in the art know that with evolution of network architecture and emergence of new service scenarios, the technical solutions of the embodiments of the present disclosure are also applicable to similar technical problems.

It is to be understood that it is a common wireless positioning method to obtain propagation delay from a transmitting end to a receiving end and a distance between the transmitting end and the receiving end by measuring time of arrival (TOA). TOA measurement accuracy is affected by receive/transport timing errors.

Referring to FIG. 1, it is a schematic diagram exemplarily showing influence of a receive timing error of a UE on a TOA measurement value in a downlink positioning process (DL-TDOA) according to an embodiment of the present disclosure. As shown in FIG. 1, two transmit receive points (TRPs) including TRP1 and TRP2, simultaneously transmit DL PRS signals; a UE has multiple radio frequency (Rx RF) chains, and uses an m-th Rx RF chain to receive the DL PRS of TRP1, a measured TOA1 from the TRP1 to the UE is $TRP1_{TE}^{Tx}+T1+UE_{TE}^{Rx,m}$, and a receive timing error is $UE_{TE}^{Rx,m}$. The UE uses an n-th Rx RF chain to receive the DL PRS of TRP2, a measured TOA2 from the TRP2 to the UE is $TRP2_{TE}^{Tx}+T2+UE_{TE}^{Rx,n}$, and a receive timing error is $UE_{TE}^{Rx,n}$. In the DL-TDOA positioning, a reference signal time difference (RSTD) measurement value is used for positioning calculation.

The UE's RSTD measurement value for TRP1 and TRP2 is:

$$RSTD_{TRP1,TRP2} =$$
$$TOA2 - TOA1 = \left(TRP2_{TE}^{Tx} + T2 + UE_{TE}^{Rx,n}\right) - \left(TRP1_{TE}^{Tx} + T1 + UE_{TE}^{Rx,m}\right) =$$
$$(T2 - T1) + \left(TRP2_{TE}^{Tx} - TRP1_{TE}^{Tx}\right) + \left(UE_{TE}^{Rx,n} - UE_{TE}^{Rx,m}\right)$$

Where T1 and T2 represents signal propagation delays from TRP1 and TRP2 to the UE, respectively.

If it is assumed that TRP1 and TRP2 transmit DL PRS in complete time synchronization, that is, $TRP2_{TE}^{Tx}=TRP1_{TE}^{Tx}$, then, the RSTD measurement value is affected by a difference $(UE_{TE}^{Rx,n}-UE_{TE}^{Rx,m})$ between UE receive timing errors $UE_{TE}^{Rx,n}$ and $UE_{TE}^{Rx,m}$.

Whether the m-th Rx RF chain and the n-th Rx RF chain of the UE can be divided into the same UE Rx TEG, depends on whether $UE_{TE}^{Rx,m}$ and $UE_{TE}^{Rx,n}$ are close to each other. For example, if the difference between $UE_{TE}^{Rx,n}$ and $UE_{TE}^{Rx,m}$ is very small, $(UE_{TE}^{Rx,n}-UE_{TE}^{Rx,m})$ has little impact on RSTD measurement, then the m-th Rx RF chain and the n-th Rx RF chain of the UE can be divided into the same UE Rx TEG. Otherwise, the m-th Rx RF chain and the n-th Rx RF chain of the UE should not be divided into the same UE Rx TEG.

Figure 2:
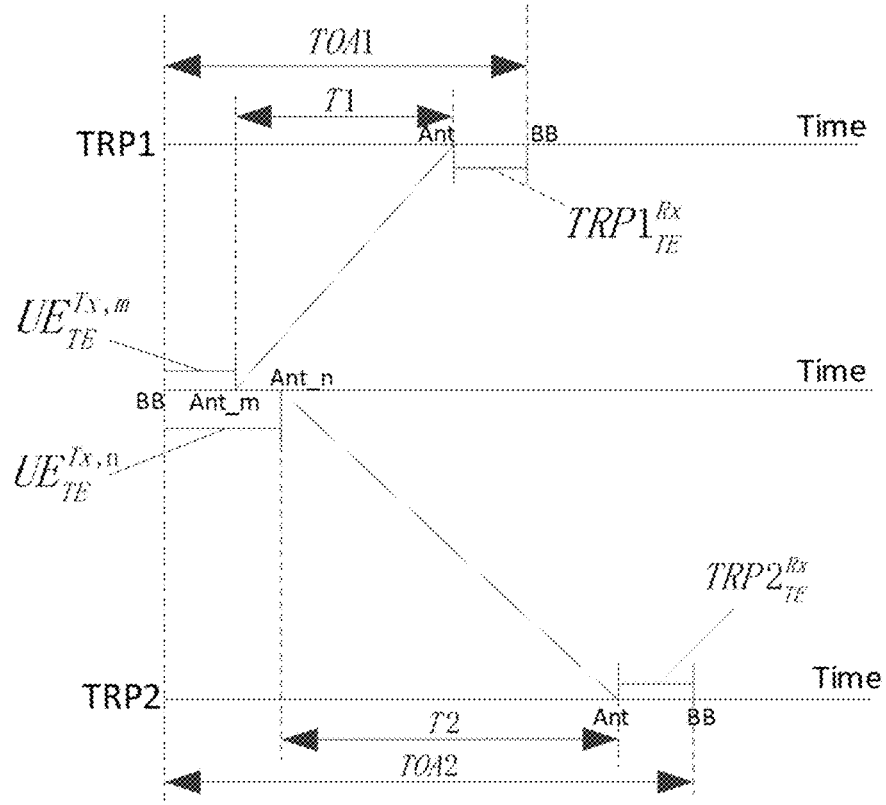
FIG. 2 is a schematic diagram exemplarily showing influence of a transport timing error of a UE on a TOA measurement value in an uplink positioning process according to an embodiment of the present disclosure.

Referring to FIG. 2, it is a schematic diagram exemplarily showing influence of a transport timing error of a UE on a TOA measurement value in an uplink positioning process (UL-TDOA) according to an embodiment of the present disclosure.

In FIG. 2, two TRPs (TRP1 and TRP2) receive UL SRS signals transmitted by a UE. The UE has multiple Tx RF chains to transmit UL SRS. A transport timing error of UL SRS, which is transmitted from the m-th Tx RF chain of the UE and is received by the TRP1, is $UE_{TE}^{Tx,m}$. A RTOA1 from the UE to the TRP1, measured by the TRP1, is $UE_{TE}^{Tx,m}+T1+TRP1_{TE}^{Rx}$.

A transport timing error of UL SRS, which is transmitted from the n-th Tx RF chain of the UE and is received by the TRP2, is $UE_{TE}^{Tx,n}$. A RTOA2 from the UE to the TRP2, measured by the TRP2, is $UE_{TE}^{Tx,n}+T2+TRP2_{TE}^{Rx}$. In the UL-TDOA positioning, a difference between measured values of RTOA, i.e., TDOA, is used for positioning calculation. The difference between measured values of RTOA2 and RTOA1 is:

$$TDOA_{TRP1,TRP2} = \\ RTOA2 - RTOA1 = \left(UE_{TE}^{Tx,n} + T2 + TRP2_{TE}^{Rx}\right) - \left(UE_{TE}^{Tx,m} + T1 + TRP1_{TE}^{Rx}\right) = \\ (T2 - T1) + \left(TRP2_{TE}^{Rx} - TRP1_{TE}^{Rx}\right) + \left(UE_{TE}^{Tx,n} - UE_{TE}^{Tx,m}\right)$$

Where T1 and T2 represents signal propagation delays from UE to TRP1 and TRP2, respectively.

If it is assumed that TRP1 and TRP2 receive UL SRS in complete time synchronization, that is, $TRP2_{TE}^{Rx}=TRP1_{TE}^{Rx}$, then, the $TDOA_{TRP1,TRP2}$ is only affected by a difference between UE transport timing errors $UE_{TE}^{Tx,n}$ and $UE_{TE}^{Tx,m}$.

Whether the m-th Rx RF chain and the n-th Rx RF chain of the UE can be divided into the same UE Tx TEG, depends on whether $UE_{TE}^{Tx,m}$ and $UE_{TE}^{Tx,n}$ are close to each other. For example, if the difference between $UE_{TE}^{Tx,n}$ and $UE_{TE}^{Tx,m}$ is very small, $(UE_{TE}^{Tx,n}-UE_{TE}^{Tx,m})$ has little impact on RSTD measurement, then the m-th Rx RF chain and the n-th Rx RF chain of the UE can be divided into the same UE Tx TEG. Otherwise, the m-th Rx RF chain and the n-th Rx RF chain of the UE should not be divided into the same UE Tx TEG.

How UE and TRP determine and divide Tx/Rx TEG, related information of transport and receive timing error groups, and how to use TEG related information for positioning, have not been defined in related art, which results in an inaccurate positioning result when reference information is used for positioning in the related art.

The receiving end and the transmitting end of reference signals, the positioning method and the system provided in the present disclosure are intended to solve the above technical problems in the related art.

The technical solution of the present disclosure and how the technical solution of the present disclosure solves the above technical problems are described in detail hereinafter with specific embodiments. The following specific embodiments may be combined with each other, and the same or similar concepts or processes may not be described again in some embodiments. Embodiments of the present disclosure will be described hereinafter with reference to the accompanying drawings.

Figure 3:
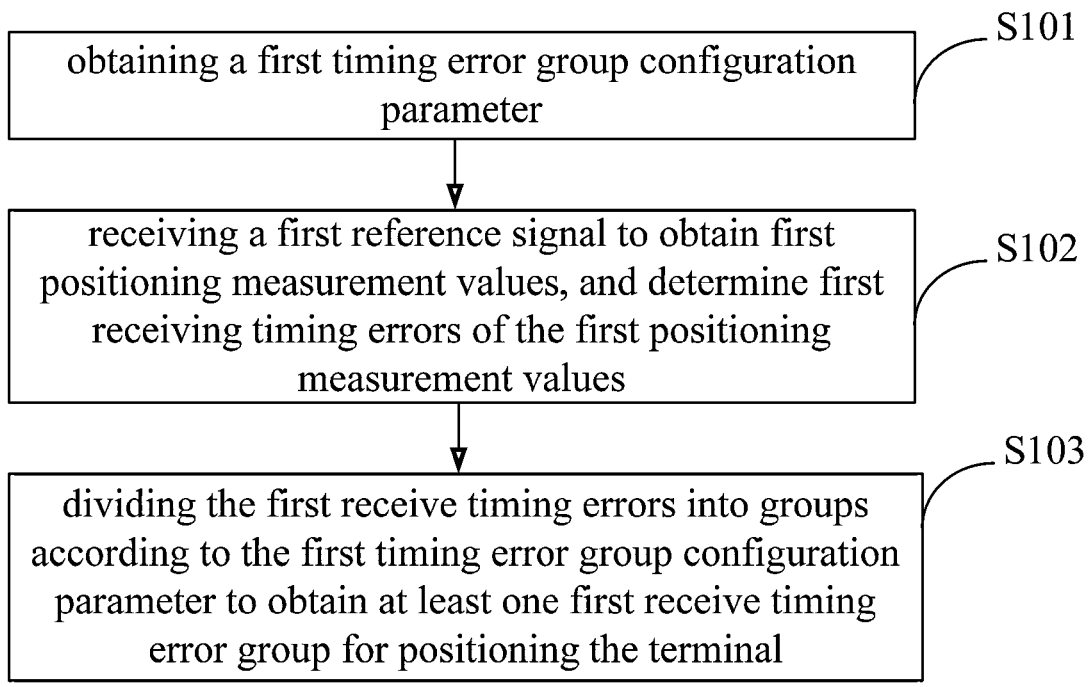
FIG. 3 is a schematic flowchart of a positioning method at a receiving end side of a first reference signal resource according to an embodiment of the present disclosure.

Referring to FIG. 3, it is a schematic flowchart of a positioning method at a receiving end side of a first reference signal resource according to an embodiment of the present disclosure. As shown in FIG. 3, the method includes:

S101: obtaining a first timing error group configuration parameter.

The first timing error group configuration parameter in this embodiment of the present disclosure is used for the receiving end to divide first receive timing errors in first positioning measurement values into groups. For example, the first timing error group configuration parameter may include grouping ranges of multiple first receive timing error groups, and then a grouping result corresponding to each first receive timing error may be determined by determining the grouping range where each first receive timing error is located.

In the embodiment of the present disclosure, by obtaining the first timing error group configuration parameter, the receiving end of the first reference signal receives the first timing error group configuration parameter, and then maps first receive timing errors located within the same grouping range to the same receive timing error group, so that in case that RSTD or TDOA is used for subsequent positioning, a smallest possible result can be obtained when obtaining a difference between first receive timing errors of first positioning measurement values which are corresponding to the same receive timing error group but corresponding to different transmitting ends, thereby improving positioning accuracy.

S102: receiving a first reference signal to obtain first positioning measurement values, and determine first receiving timing errors of the first positioning measurement values.

It is to be noted that there is no necessary time sequence between the step S101 and the step S102; in practical application, the step S101 may be performed first, or the step S102 may be performed first, or the steps S101 and S102 may be performed at the same time, which are not specifically limited in the embodiments of the present disclosure.

In this embodiment of the present disclosure, the first reference signal is PRS or SRS.

In case that the first reference signal is a PRS, it means that the first reference signal is transmitted by the TRP which services as a transmitting end, and the UE serves as a receiving end of the first reference signal. The first receive timing error may be expressed as UE Rx TE; and then the obtained first receive timing error group may be expressed as UE Rx TEG. At this point, the positioning method is suitable for downlink positioning.

In case that the first reference signal is an SRS, it means that the first reference signal is transmitted by the UE which services as a transmitting end, and the TRP serves as a receiving end of the first reference signal. The first receive timing error may be expressed as TRP Rx TE; and then the obtained first receive timing error group may be expressed as TRP Rx TEG. At this point, the positioning method is suitable for uplink positioning.

In addition to the foregoing uplink positioning and downlink positioning, the embodiments of the present disclosure may also be applicable to other positioning, and different applicable positioning will be described in detail in subsequent embodiments.

In the embodiment of the present disclosure, the first positioning measurement value is used to represent a distance between the transmitting end and the receiving end of the first reference signal. For example, when the first reference signal is PRS, the first positioning measurement value may be a TOA measurement value; and when the first reference signal is SRS, the first positioning measurement value may be an RTOA measurement value.

As can be seen from FIG. 1 and FIG. 2, the UE has more than one transmitting chains and more than one receiving chains, and there are more than one first reference signals in actual applications, thus, there are also more than one first positioning measurement values. Regardless of whether the receiving end is a UE or a TRP, after the receiving end obtains the first positioning measurement values, the receiving end can determine, according to its own features (such as a group delay introduced by its own filter or a corrected group delay residual value, and a delay deviation caused by an offset between a reference phase center and a physical antenna phase center), first receiving timing errors of the first positioning measurement values. By taking the downlink positioning shown in FIG. 1 as an example, the first receive timing error includes $UE_{TE}^{Rx,m}$ and $UE_{TE}^{Rx,n}$. By taking the uplink positioning shown in FIG. 2 as an example, the first receive timing error includes $TRP1_{TE}^{Rx}$ and $TRP2_{TE}^{Rx}$.

S103: dividing the first receive timing errors into groups according to the first timing error group configuration parameter to obtain at least one first receive timing error group for positioning the terminal.

It is to be understood that the number of first receive timing errors determined by the receiving end is more than one, and multiple first receive timing errors can be divided into groups according to the first timing error group configuration parameter. For example, the first timing error group configuration parameter may include ranges of multiple first receive timing error groups, and each first receive timing error is divided into one first receive timing error group of a range matching the first receive timing error.

One specific example is provided hereinafter.

The first timing error group configuration parameter includes ranges of three groups: [0, 0.2 ns], (0.2 ns, 0.4 ns] and (0.4 ns, 0.6 ns]; in case that the determined first receive timing errors include 0.1 ns, 0.2 ns, 0.3 ns and 0.4 ns, then, two first receive timing error groups can be obtained. That is, one first receive timing error group includes two first receive timing errors, i.e., 0.1 ns and 0.2 ns; the other first receive timing error group includes two first receive timing errors, i.e., 0.3 ns and 0.4 ns.

The positioning method according to the embodiment of the present disclosure is performed by the receiving end of the first reference signal, by obtaining the first timing error group configuration parameter which is used for dividing first receive timing errors in first positioning measurement values into groups, the receiving end of the first reference signal receives the first reference signal, then obtains first positioning measurement values and first receiving timing errors of the first positioning measurement values, and then divides the first receive timing errors into groups according to the first timing error group configuration parameter to obtain the first receive timing error group, so that in case that RSTD and/or TDOA is used for subsequent positioning, a smallest possible result can be obtained when obtaining a difference between first receive timing errors of first positioning measurement values which are corresponding to the same receive timing error group but belong to different first positioning measurement values (which are corresponding to different transmitting ends), thereby improving positioning accuracy.

On the basis of the foregoing embodiments, as an optional embodiment, the obtaining a first timing error group configuration parameter in this embodiment of the present disclosure includes:

receiving the first timing error group configuration parameter which is determined by a location management function module according to positioning requirement.

Specifically, the positioning requirement may be transmitted by the UE to the LMF, or may be preset by the LMF. In case that the positioning requirement is transmitted by the UE, compared with parameters reported by the UE to the LMF in the related art, a parameter of the above positioning requirement is further reported. It is to be noted that, in addition to indicating that the UE supports dividing timing errors into groups, another purpose of capability information is that the LMF transmits a required timing error group configuration parameter to the TRP only after the LMF obtains a capability signal.

In the embodiment of the present disclosure, by receiving the first timing error group configuration parameter which is determined by the LMF according to positioning requirement, a foundation is laid for the receiving end of the first reference signal to divide the first receive timing errors into groups.

In the embodiment of the present disclosure, a first positioning requirement includes at least one of a positioning accuracy of the UE, a positioning scenario, and capability information for indicating that the UE supports dividing first receive timing errors into groups.

For example, in the 3GPP R17 standard, for an industrial internet of things (IIoT) scenario, the positioning accuracy requirement is generally at a sub-meter level; for an ordinary business scenario, the positioning accuracy requirement is generally at a meter level. The addition to the capability information enables the LMF to know that the receiving end has the capability of dividing the first receive timing errors into groups, so that the LMF determines that the first timing error group configuration parameter needs to be transmitted to the receiving end.

On the basis of the foregoing embodiments, as an optional embodiment, the first timing error group configuration parameter includes a first grouping granularity.

TABLE 1

Correspondence table between positioning accuracy and grouping granularity

| positioning accuracy | TRP TEG Granularity | UE TEG Granularity |
|---|---|---|
| 1 m | 0.22 ns | 0.44 ns |
| 0.5 m | 0.11 ns | 0.22 ns |
| 0.2 m | 0.055 ns | 0.11 ns |
| 0.1 m | 0.0275 ns | 0.055 ns |
| 0.05 m | 0.01875 ns | 0.0275 ns |

Table 1 is a correspondence table between positioning accuracy and grouping granularity, which is pre-established by the LMF according to the embodiment of the present disclosure. As shown in the table 1, in case that the receiving end is a UE and a TRP respectively, grouping granularities are different under the same positioning accuracy. It is to be understood that the correspondence table shown in the table 1 is only an example, and based on this, those skilled in the art can obtain correspondence tables of other correspondence relationships, such as establishing a correspondence table between positioning scenarios and grouping granularity, which is not described in the embodiments of the present disclosure. In addition, in practical applications, the grouping granularity may also be a range value instead of the above point value.

Further, the dividing the first receive timing errors into groups according to the first timing error group configuration parameter to obtain at least one first receive timing error group, includes:
  determining division ranges of first receive timing error groups according to the first grouping granularity;
  dividing the first receive timing errors into groups according to the division ranges, to obtain at least one first receive timing error group.

In the embodiment of the present disclosure, since the first timing error group configuration parameter is related to the positioning requirement, the division ranges of the first receive timing error groups determined according to the first timing error group configuration parameter can also meet the positioning requirement.

In this embodiment of the present disclosure, a boundary of the division range may be a preset multiple of a first grouping granularity, and may be obtained by performing a table look-up or mathematical operation on the first grouping granularity, or may be determined based on absolute timing errors or relative timing errors in combination with the first grouping granularity. A division range based on the absolute timing errors means that any first receive timing error in the first receive timing error group is located in a division range of the first receive timing error group. A division range based on relative timing errors means that a difference between any one first receive timing error in the first receive timing error group and at least one other first receive timing error in the first receive timing error group except for the any one first receive timing error, is located in a division range of the first receive timing error group.

For example, there are three first receive timing errors, which are 0.05, 0.08 and 0.2, respectively. When determining the first receive timing error groups according to absolute timing errors, there may be two division ranges of receive timing error groups: (0, 0.1] and (0.1, 0.2], then the two first receive timing errors including 0.05 and 0.08 are corresponding to a first receive timing error group with the division range of (0, 0.1], and the first receive timing error, i.e., 0.2, is corresponding to a first receive timing error group with the division range of (0.1, 0.2]. When determining the first receive timing error groups according to relative timing errors, there may be two division ranges of receive timing error groups: (0, 0.03] and (0.03, 1], then the two first receive timing errors including 0.05 and 0.08 are corresponding to a first receive timing error group with the division range of (0, 0.03], and the first receive timing error, i.e., 0.2, is corresponding to a first receive timing error group with the division range of (0.03, 1].

In some scenarios, the receiving end cannot obtain absolute values of the first receive timing errors, but can only obtain relative values of the first receive timing errors, that is, a difference between two first receive timing errors, and thus determining the division ranges of the first receive timing error groups based on relative errors has better applicability.

The grouping granularity can be applied to the division ranges determined based on the absolute timing errors and based on the relative timing errors, with differences that the multiple of the grouping granularity when the division ranges are determined based on the relative timing errors is smaller than the multiple of the grouping granularity when the division ranges are determined based on the absolute timing errors.

It is to be noted that, in the embodiment of the present disclosure, the meaning of the first receive timing error being within the division range of the first receive timing error group may be that the first receive timing error is completely within the division range of the first receive timing error group, or, may be that when the first receive timing error is a range value, a ratio of an overlapping interval between the range value and the division range of the first receive timing error group to the range value is greater than a preset threshold. For example, a certain first receive timing error is [0.023, 0.026], and there are two first receive timing error groups, which are [0.021, 0.025] and (0.025, 0.029], respectively. Since a ratio of the first receive timing error to the first receive timing error group with a division range of [0.021, 0.025] reaches 75%, which is greater than the preset threshold, the first receive timing error is corresponding to the first receive timing error group with the division range of [0.021, 0.025]. On this basis, in the embodiment of the present disclosure, one receive timing error group with a largest ratio of an overlapping interval between the range value and the division range of the first receive timing error group to the range value, is taken as the first receive timing error group where the first receive timing error is located. By taking the above example as an example, since an overlapping interval between the first receive timing error and the first receive timing error group with a division range of [0.021, 0.025], is greater than an overlapping interval between the first receive timing error and the first receive timing error group with a division range of (0.025, 0.029], then the first receive timing error is considered to be within the division range of the first receive timing error group with the division range is [0.021, 0.025].

On the basis of the foregoing embodiments, as an optional embodiment, after obtaining the first receive timing error group, the method further includes:
  generating first receive timing error group information, where the first receive timing error group information includes feature information of at least one first receive timing error group.

The feature information includes at least one of an error group identifier, an actual range, and an actual range relative difference.

It is to be understood that the actual range of each first receive timing error group is obtained according to a maximum value and a minimum value of the first receive timing errors in the first receive timing error group. For example, in a certain first receive timing error group, a largest first receive timing error is 0.5 ns, and a smallest first receive timing error is 0.04 ns, then the actual range of the first receive timing error group is 0.46 ns. The actual range relative difference is a difference between actual ranges of two first receive timing error groups. In the embodiment of the present disclosure, it is not specifically limited about the difference for measuring the actual ranges, for example, a difference of maximum timing errors of two first receive timing error groups, a difference of minimum timing errors of two first receive timing error groups, a difference of average timing errors of two first receive timing error groups, or a difference of medians of two first receive timing error groups.

On the basis of the foregoing embodiments, as an optional embodiment, the positioning method further includes:

determining correspondence information of the first positioning measurement values according to the first receive timing error group information;

where the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

By constructing the first receive timing error group information, the first positioning measurement value obtained by the receiving end can be associated with the first receive timing error group, so that for subsequent RSTD or TDOA calculations, first positioning measurement values corresponding to the same first receive timing error group are selected and subtracted to obtain a more accurate RSTD or TDOA value.

By taking FIG. 1 as an example, from analysis of the formula of the RSTD measurement value of UE for TRP1 and TRP2 shown in FIG. 1, it can be concluded that if TOA1 and TOA2 are associated with the same first receive timing error group, it means that a difference between first receive timing errors corresponding to TOA1 and TOA2 is very small, that is, $UE_{TE}^{Rx,n} - UE_{TE}^{Rx,m}$ is close to 0. Then, the RSTD measurement value thus obtained is closer to the difference between T2 and T1, and then the result of positioning calculation based on the RSTD measurement value is more accurate.

On the basis of the foregoing embodiments, as an optional embodiment, the positioning method further includes:

transmitting the correspondence information to the location management function module, so that the location management function module performs positioning according to the correspondence information, or, when the first reference signal is a positioning reference signal, performing, by the receiving end, positioning according to the correspondence information.

In the embodiment of the present disclosure, after obtaining the corresponding relationship information, the corresponding relationship information may be transmitted to the LMF so that the LMF performs positioning according to the corresponding relationship information, or when the first reference signal is the PRS, the UE may directly perform positioning according to the corresponding relationship information.

When the first reference signal is PRS, it means that the transmitting end and the receiving end of the first reference signal are TRP and UE, respectively, the corresponding first positioning measurement value is TOA measurement value, and the positioning method may be downlink positioning in DL-TDOA. Regardless of whether positioning is performed by LMF or UE, it is necessary to first obtain TOA measurement values corresponding to different TRPs, perform reasonable differences to obtain RSTD measurement values, and then perform positioning calculation based on multiple RSTD measurement values to obtain the positioning result. In the present disclosure, since the first receive timing error group corresponding to the TOA measurement value is also transmitted when the TOA measurement value is transmitted, the TOA measurement values corresponding to the same first receive timing error group and corresponding to different TRPs, can be used to calculate the RSTD, which is closer to real propagation delay difference.

On the basis of the above embodiments, as an optional embodiment, in downlink positioning, that is, when the UE receives the PRS, the UE may also directly generate RSTD according to TOA (instead of transmitting TOA to LMF, and then LMF generates RSTD), and then transmit the generated RSTD to the LMF for positioning, or directly position itself according to the generated RSTD. Specifically, the positioning method further includes:

determining at least one pair of first positioning measurement values which are corresponding to different transmitting ends, respectively, as a target first positioning measurement value pair, and obtaining a reference signal timing difference of the target first positioning measurement value pair;

obtaining correspondence information of each first positioning measurement value in the target first positioning measurement value pair, as target correspondence information;

where the different transmitting ends include a reference base station and a non-reference base station.

It is to be understood that in actual positioning, there are more than two transmitting ends in communication with the UE, including one reference base station and at least one non-reference base station. When obtaining the target first positioning measurement value pair, two first positioning measurement values (TOA) in the target first positioning measurement value pair are corresponding to the reference base station and the non-reference base station, respectively, and cannot be corresponding to the same transmitting end or two non-reference base stations. After the target first positioning measurement value pair is determined, it is also necessary to obtain corresponding relationship information of each TOA in the target first positioning measurement value pair, and use the corresponding relationship information as target positioning relationship information, so that it is convenient for the LMF or the UE itself to select, based on various RSTD measurement values and feature information of corresponding receive timing error groups, a suitable RSTD measurement value for positioning calculation.

On the basis of the foregoing embodiments, as an optional embodiment, in order to further obtain an RSTD measurement value which is closer to the signal propagation delay difference, in this embodiment of the present disclosure, the method includes a step of screening TOA for calculating the RSTD measurement value. Specifically, determining at least one pair of first positioning measurement values which are corresponding to different transmitting ends, respectively, as a target first positioning measurement value pair, includes:

if it is determined that there is a correspondence between the feature information of the same first receive timing error group and two first positioning measurement values corresponding to different transmitting ends respectively, obtaining the target first positioning measurement value pair according to the two first positioning measurement values corresponding to different transmitting ends respectively.

It is to be noted that if there is a correspondence between the feature information of the same receive timing error group and two TOAs corresponding to different TRPs respectively, it means that the first receive timing errors of the two TOAs are located in the same receive timing error group, then the RSTD measurement value obtained by making a difference of the two TOAs can cancel out the two first receive timing errors, so that the obtained RSTD measurement value is closer to the signal propagation delay.

On the basis of the foregoing embodiments, as an optional embodiment, the positioning method in the embodiment of the present disclosure further includes:

receiving first transport timing error group information determined by the transmitting end;

determining correspondence information of each first positioning measurement value, according to the first transport timing error group information and the first receive timing error group information.

It is to be understood that the transmitting end can determine the transport timing error, i.e., first transport timing error, for each first reference signal, and then can divide the transport timing errors into groups according to a method similar to the above embodiment to obtain first transport timing error group information. The first transport timing error group information includes feature information of at least one first transport timing error group. The feature information corresponding to the first transport timing error group includes timing error group unique identifier, an actual range, and an actual range relative difference of the first transport timing error group. Apparently, the actual range relative difference is a difference between actual ranges of two first transport timing error groups. In the embodiment of the present disclosure, it is not specifically limited about the difference for measuring the actual ranges, for example, a difference of maximum timing errors of two first transport timing error groups, a difference of minimum timing errors of two first transport timing error groups, a difference of average timing errors of two first transport timing error groups, or a difference of medians of two first transport timing error groups.

The correspondence information includes a first positioning measurement value, feature information of a first receive timing error group having a corresponding relationship with the first positioning measurement value and feature information of the first transport timing error group having a corresponding relationship with the first positioning measurement value.

The first receive timing error of the first positioning measurement value is located in the actual range of the first receive timing error group having the corresponding relationship with the first positioning measurement value. The first transport timing error of the first reference signal corresponding to the first positioning measurement value is located in the actual range of the first transport timing error group having the corresponding relationship with the first positioning measurement value.

On this basis, obtaining the target first positioning measurement value pair according to the two first positioning measurement values corresponding to different transmitting ends respectively, includes:

determining similarity between an actual range of a first transport timing error group corresponding to a first positioning measurement value of a reference base station and an actual range of a first transport timing error group corresponding to a first positioning measurement value of a non-reference base station;

taking at least one pair of first positioning measurement values with the greatest similarity corresponding to different transmitting ends respectively, as the target first positioning measurement value pair.

After further introducing the corresponding relationship between the transport timing error group and the TOA in the correspondence information, on the basis of determining that there is a corresponding relationship between the feature information of the same first receive timing error group and the two first positioning measurement values corresponding to different transmitting ends, in the embodiment of the present disclosure, it can be realized that the receive timing errors of two TOAs are almost canceled when making a difference therebetween. Further, by determining similarity between an actual range of the first transport timing error group corresponding to the first positioning measurement value of the reference base station and an actual range of the first transport timing error group corresponding to the first positioning measurement value of the non-reference base station, and taking at least one pair of first positioning measurement values with the greatest similarity corresponding to different transmitting ends respectively, as the target first positioning measurement value pair, it can be realized that the transport timing errors of the two TOAs are almost canceled when making a difference therebetween, thereby obtaining an RSTD that is closer to the signal propagation delay difference value.

For example, if there are two first transport timing error groups corresponding to TRP1, namely TRP1 Tx TEG1 and TRP1 Tx TEG2; and there are three transport timing error groups corresponding to TRP2, namely TRP2 Tx TEG1, TRP2 Tx TEG2 and TRP2 Tx TEG3; when it is determined that similarity between TRP1 Tx TEG1 and TRP2 Tx TEG3 is the largest, then TOA measurement values belonging to TRP1 Tx TEG 1 and TRP2 Tx TEG3 in the UE's first receive timing error group Rx TEG 1 and/or UE Rx TEG 2 are taken as the target first positioning measurement value pair. Subsequently, according to the target first positioning measurement value pair, an RSTD can be obtained for positioning calculation.

The embodiments of the present disclosure do not specifically limit ways of defining the similarity between the transport timing error groups. For example, the similarity can be represented by a degree of overlap between the actual ranges of the transport timing error groups, and the larger the degree of overlap, the higher the similarity. The similarity may also be determined directly based on an actual range relative difference of the two transport timing error groups recorded in the feature information. The greater the actual range relative difference, the lower the similarity.

On the basis of the foregoing embodiments, as an optional embodiment, the positioning method further includes:

transmitting a reference signal timing difference of the target first positioning measurement value pair and the target correspondence information to the location management function module, thereby enabling the location management function module to perform positioning, or, performing positioning according to the reference signal timing difference of the target first positioning measurement value pair and the target correspondence information.

In the embodiment of the present disclosure, after obtaining the RSTD, the receiving end of the first reference signal can transmit the RSTD and the target correspondence information to the LMF, and then the LMF selects a reasonable RSTD for positioning calculation, or, when the receiving end is UE, the UE itself performs positioning calculation based on RSTD.

Figure 4:
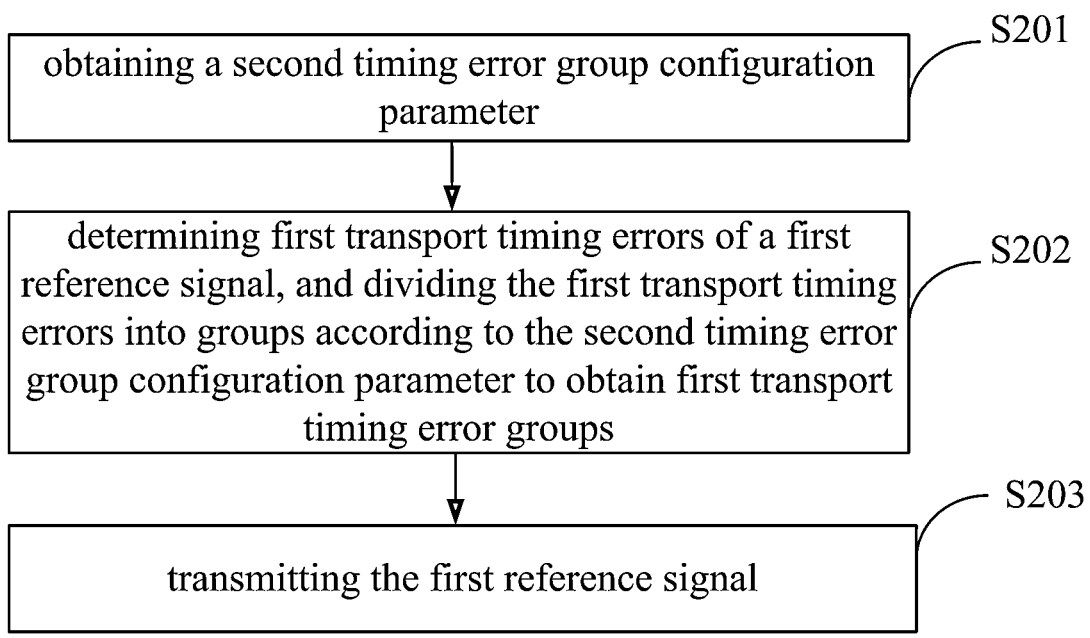
FIG. 4 is a schematic flowchart of a positioning method at a transmitting end side of a first reference signal resource according to an embodiment of the present disclosure.

On the basis of the foregoing embodiments, one embodiment of the present disclosure further provides a positioning method performed by a transmitting end of a first reference signal. Referring to FIG. 4, it is a schematic flowchart of a positioning method at a transmitting end side of a first reference signal according to an embodiment of the present disclosure. As shown in FIG. 4, the positioning method includes the flowing steps.

S201: obtaining a second timing error group configuration parameter.

The second timing error group configuration parameter in this embodiment of the present disclosure is used for the transmitting end to group first transport timing errors which occur when a first reference signal is transmitted. For example, the second timing error group configuration parameter may include grouping ranges of multiple first transport timing error groups, and then a grouping result corresponding to each first transport timing error may be determined by determining the grouping range where each first transport timing error is located.

In the embodiment of the present disclosure, by obtaining second timing error group configuration parameter, the transmitting end of the first reference signal receives the second timing error group configuration parameter, and then maps first transport timing errors located within the same grouping range to the same transport timing error group, so that when performing positioning according to RSTD/TDOA, the transport timing error group is used to further reduce a difference between the RSTD and an actual signal transmission delay, thereby improving the positioning accuracy.

S202: determining first transport timing errors of a first reference signal, and dividing the first transport timing errors into groups according to the second timing error group configuration parameter to obtain first transport timing error groups.

In this embodiment of the present disclosure, the first reference signal is PRS or SRS.

In case that the first reference signal is a PRS, it means that the first reference signal is transmitted by the TRP which services as a transmitting end, and the UE serves as a receiving end of the first reference signal. The first transport timing error may be expressed as TRP Tx TE; and then the obtained first transport timing error group may be expressed as TRP Tx TEG. At this point, the positioning method is suitable for downlink positioning.

In case that the first reference signal is an SRS, it means that the first reference signal is transmitted by the UE which services as a transmitting end, and the TRP serves as a receiving end of the first reference signal. The first transport timing error may be expressed as UE Tx TE; and then the obtained first transport timing error group may be expressed as UE Tx TEG. At this point, the positioning method is suitable for uplink positioning.

It is to be understood that the transmitting end transmits more than one first reference signals, and correspondingly, more than one first transport timing errors are determined. Through the second timing error group configuration parameter, multiple first transport timing errors can be divided into groups. For example, the second timing error group configuration parameter may include ranges of multiple first transport timing error groups, and each first transport timing error is divided into one first transport timing error group of a range matching the first transport timing error.

One specific example is provided hereinafter.

The second timing error group configuration parameter includes ranges of three groups: [0, 0.2 ns], (0.2 ns, 0.4 ns] and (0.4 ns, 0.6 ns]; in case that the determined first transport timing errors include 0.1 ns, 0.2 ns, 0.3 ns and 0.4 ns, then, two first transport timing error groups can be obtained. That is, one first transport timing error group includes two first transport timing errors, i.e., 0.1 ns and 0.2 ns; the other first transport timing error group includes two first transport timing errors, i.e., 0.3 ns and 0.4 ns.

S203: transmitting the first reference signal.

It is to be noted that there is no necessary time sequence between the step S202 and the step S203; in practical application, the step S202 may be performed first, or the step S203 may be performed first, or the steps S202 and S203 may be performed at the same time, which are not specifically limited in the embodiments of the present disclosure.

The positioning method in this embodiment of the present disclosure is performed by the transmitting end of the first reference signal, by obtaining the second timing error group configuration parameter, the second timing error group configuration parameter is used for grouping first transport timing errors which occur when the first reference signal is transmitted, thereby obtaining first transport timing error groups, so that when performing positioning according to RSTD/TDOA, the transport timing error group is used to further reduce a difference between the RSTD and an actual signal transmission delay, thereby improving the positioning accuracy.

On the basis of the foregoing embodiments, as an optional embodiment, obtaining a second timing error group configuration parameter, includes:

receiving the second timing error group configuration parameter which is determined by a location management function module according to positioning requirement.

The positioning requirement includes at least one of a positioning accuracy of the UE, a positioning scenario, and capability information for indicating that the UE supports dividing first receive timing errors into groups.

Specifically, the positioning requirement may be transmitted by the UE to the LMF, or may be preset by the LMF. In case that the positioning requirement is transmitted by the UE, compared with parameters reported by the UE to the LMF in the related art, a parameter of the above positioning requirement is further reported.

In the embodiment of the present disclosure, by receiving the second timing error group configuration parameter which is determined by the LMF according to positioning requirement, a foundation is laid for the transmitting end of the first reference signal to divide the first transport timing errors into groups.

On the basis of the foregoing embodiments, as an optional embodiment, the second timing error group configuration parameter includes a second grouping granularity. In one embodiment of the present disclosure, the second grouping granularity may be a range value or point values.

Further, dividing the first transport timing errors into groups according to the second timing error group configuration parameter to obtain first transport timing error groups, includes:

determining division ranges of first transport timing error groups according to the second grouping granularity;

dividing the first transport timing errors into groups according to the division ranges, to obtain at least one first transport timing error group.

In the embodiment of the present disclosure, since the second timing error group configuration parameter is related to the positioning requirement, the division ranges of the first transport timing error groups determined according to the second transport timing error group configuration parameter can also meet the positioning requirement.

In this embodiment of the present disclosure, the division range may be determined based on absolute timing errors or relative timing errors. A division range based on the absolute timing errors means that any first transport timing error in the first transport timing error group is located in a division range of the first transport timing error group. A division range based on relative timing errors means that a difference between any one first transport timing error in the first transport timing error group and at least one other first transport timing error in the first transport timing error group except for the any one first transport timing error, is located in a division range of the first transport timing error group.

For example, there are three first transport timing errors, which are 0.05, 0.08 and 0.2, respectively. When determining the first transport timing error groups according to absolute timing errors, there may be two division ranges of transport timing error groups: (0, 0.1] and (0.1, 0.2], then the two first transport timing errors including 0.05 and 0.08 are corresponding to a first transport timing error group with the division range of (0, 0.1], and the first transport timing error, i.e., 0.2, is corresponding to a first transport timing error group with the division range of (0.1, 0.2]. When determining the first transport timing error groups according to relative timing errors, there may be two division ranges of transport timing error groups: (0, 0.03] and (0.03, 1], then the two first transport timing errors including 0.05 and 0.08 are corresponding to a first transport timing error group with the division range of (0, 0.03], and the first transport timing error, i.e., 0.2, is corresponding to a first transport timing error group with the division range of (0.03, 1].

In some scenarios, the transmitting end cannot obtain absolute values of the first transport timing errors, but can only obtain relative values of the first transport timing errors, that is, a difference between two first transport timing errors, and thus determining the division ranges of the first transport timing error groups based on relative errors has better applicability.

It is to be noted that, in the embodiment of the present disclosure, the meaning of the first transport timing error being within the division range of the first transport timing error group may be that the first transport timing error is completely within the division range of the first transport timing error group, or, may be that when the first transport timing error is a range value, a ratio of an overlapping interval between the range value and the division range of the first transport timing error group to the range value is greater than a preset threshold. For example, a certain first transport timing error is [0.023, 0.026], and there are two first transport timing error groups, which are [0.021, 0.025] and (0.025, 0.029], respectively. Since a ratio of the first transport timing error to the first transport timing error group with a division range of [0.021, 0.025] reaches 75%, which is greater than the preset threshold, the first transport timing error is corresponding to the first transport timing error group with the division range of [0.021, 0.025]. On this basis, in the embodiment of the present disclosure, one transport timing error group with a largest ratio of an overlapping interval between the range value and the division range of the first transport timing error group to the range value, is taken as the first transport timing error group where the first transport timing error is located. By taking the above example as an example, since an overlapping interval between the first transport timing error and the first transport timing error group with a division range of [0.021, 0.025], is greater than an overlapping interval between the first transport timing error and the first transport timing error group with a division range of (0.025, 0.029], then the first transport timing error is considered to be within the division range of the first transport timing error group with the division range is [0.021, 0.025].

On the basis of the foregoing embodiments, as an optional embodiment, after obtaining the first transport timing error groups, the method further includes:

generating first transport timing error group information;

transmitting the first transport timing error group information to a location management function module;

where the first transport timing error group information includes feature information of at least one first transport timing error group.

The feature information includes at least one of an error group identifier, an actual range, and an actual range relative difference.

It is to be understood that the actual range of each first transport timing error group is obtained according to a maximum value and a minimum value of the first transport timing errors in the first transport timing error group. For example, in a certain first transport timing error group, a largest first transport timing error is 0.5 ns, and a smallest first transport timing error is 0.04 ns, then the actual range of the first transport timing error group is 0.46 ns. The actual range relative difference is a difference between actual ranges of two first transport timing error groups. In the embodiment of the present disclosure, it is not specifically limited about the difference for measuring the actual ranges, for example, a difference of maximum timing errors of two first transport timing error groups, a difference of minimum timing errors of two first transport timing error groups, a difference of average timing errors of two first transport timing error groups, or a difference of medians of two first transport timing error groups.

On the basis of the foregoing embodiments, as an optional embodiment, one embodiment of the present disclosure further provides a positioning method performed by a location management function (LMF) module. The positioning method includes:

transmitting a first timing error group configuration parameter to a receiving end of a first reference signal, thereby enabling the receiving end to obtain first receive timing error group information according to the first timing error group configuration parameter;

where the first reference signal is a positioning reference signal or a sounding reference signal.

The first receive timing error group information includes feature information of at least one first receive timing error group. The feature information includes at least one of an error group identifier, an actual range, and an actual range relative difference.

In the embodiment of the present disclosure, the LMF transmits the first timing error group configuration parameter to the receiving end of the first reference signal, thereby enabling the receiving end to obtain first receive timing error group information according to the first timing error group configuration parameter. As can be seen from the above embodiment, the LMF of the embodiment of the present disclosure is suitable for multiple positioning schemes, such as uplink positioning, downlink positioning and Multi RTT positioning. Thus, the first timing error group configuration parameter transmitted by the LMF may be configuration parameters corresponding to different positioning schemes. For example, in uplink positioning, a first timing error group configuration parameter suitable for the uplink positioning is transmitted to the receiving end of the first reference signal; in downlink positioning, a first timing error group configuration parameter suitable for the downlink positioning is transmitted to the receiving end of the first reference signal.

As can be seen from the above embodiment, the timing error group configuration parameter transmitted by the LMF in the embodiment of the present disclosure is determined according to the positioning requirement. The positioning requirement may be actively reported by the UE or set by the LMF by default.

On the basis of the foregoing embodiments, as an optional embodiment, the positioning method in this embodiment of the present disclosure further includes:

receiving correspondence information from the receiving end of the first reference signal, and performing positioning according to the correspondence information;

where the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

The first positioning measurement value is used to represent a distance between the transmitting end and the receiving end of the first reference signal.

In the embodiment of the present disclosure, the LMF receives the correspondence information from the receiving end of the first reference signal, and performs positioning according to the correspondence information. The correspondence information includes corresponding relationship between the first positioning measurement value and the feature information of the first receive timing error group. A first receive timing error of the first positioning measurement value is located in a division range of the first receive timing error group having the corresponding relationship with the first positioning measurement value. The first positioning measurement value is used to represent a distance between the transmitting end and the receiving end of the first reference signal.

In downlink positioning, the first positioning measurement value is TOA measurement value, and the corresponding first receive timing error group is UE Rx TEG, and the correspondence information records a value of each TOA measurement value and feature information of the UE Rx TEG where the UE Rx TE corresponding to the TOA measurement value is located, such as identifier information, actual range, and so on.

RSTD information is required for downlink positioning, and it is particularly important to select an appropriate TOA value to calculate RSTD. Since the LMF in the embodiment of the present disclosure has obtained the correspondence information of the first reference signal, it selects TOAs corresponding to the same UE Rx TEG but corresponding to different TRPs for calculation. Selecting the TOAs corresponding to the same UE Rx TEG can ensure that UE's receive timing errors can be eliminated when calculating the difference, thereby obtaining a more accurate RSTD result.

In uplink positioning, the first positioning measurement value is RTOA measurement value, and the corresponding first receive timing error group is TRP Rx TEG, and the correspondence information records a value of each RTOA measurement value and feature information of the TRP Rx TEG where the TRP Rx TE corresponding to the RTOA measurement value is located, such as identifier information, actual range, and so on.

In uplink positioning, since a set of first receive timing errors corresponding to different TRPs are corresponding to the same UE, it is only necessary to directly calculate a difference between RTOA measurement values of different TRPs, and perform positioning calculation based on the difference.

It is to be understood that when calculating a difference between two TOAs, TRPs corresponding to the two TOAs include one reference TRP and one non-reference TRP, and cannot be two non-reference TRPs at the same time.

On the basis of the foregoing embodiments, as an optional embodiment, the positioning method in this embodiment of the present disclosure further includes:

transmitting, by the LMF, a second timing error group configuration parameter to a transmitting end of the first reference signal, thereby enabling the transmitting end of the first reference signal to obtain first transport timing error group information according to the second timing error group configuration parameter;

where the first transport timing error group information includes feature information of at least one first transport timing error group.

The LMF transmits the second timing error group configuration parameter to the transmitting end of the first reference signal, so that the transmitting end can also divide the first transport timing errors into group, thereby obtaining the first transport timing error group information. Further, the transmitting end transmits the first transport timing error group information to the LMF, and then the LMF forwards the first transport timing error group information to the receiving end, so that the receiving end further establishes corresponding relationship between the first positioning measurement value, the transport timing error group and the receive timing error group, thereby laying a foundation for subsequent elimination of transport timing errors and receive timing errors.

On the basis of the foregoing embodiments, as an optional embodiment, the positioning method further includes:

receiving first transport timing error group information from the transmitting end of the first reference signal, and transmitting the first transport timing error group information to the receiving end of the first reference signal, thereby enabling the receiving end of the first reference signal to generate correspondence information;

receiving the correspondence information from the receiving end of the first reference signal, and performing positioning according to the correspondence information.

In the embodiment of the present disclosure, the correspondence information generated by the receiving end of the first reference signal refers to corresponding relationship among the first positioning measurement value, the feature information of the first receive timing error group, and the feature information of the first transport timing error group. A first receive timing error of the first positioning measurement value is located in a division range of the first receive timing error group having the corresponding relationship with the first positioning measurement value. A first transport timing error of the first reference signal corresponding to the first positioning measurement value is located in a division range of the first transport timing error group having the corresponding relationship with the first positioning measurement value.

On the basis of the foregoing embodiments, as an optional embodiment, performing positioning according to the correspondence information, includes:

taking first positioning measurement value pairs, which are corresponding to the feature information of the same first receive timing error group and respectively corresponding to different transmitting ends, as a basic first positioning measurement value pair;

determining similarity between feature information of first transport timing error groups corresponding to any basic first positioning measurement value pairs;

determining a difference between two first positioning measurement values in at least one basic first positioning measurement value pair with the greatest similarity, and performing positioning according to the difference.

In case that the correspondence information includes the corresponding relationship among the first positioning measurement value, the feature information of the first receive timing error group, and the feature information of the first transport timing error group, the way LMF performs positioning is the same for both uplink positioning and downlink positioning. That is, the LMF first determines the first positioning measurement value pairs, which are corresponding to the feature information of the same first receive timing error group and respectively corresponding to different transmitting ends, as a basic first positioning measurement value pair which is used to calculate the difference to help to eliminate receive errors; then, determines similarity between feature information of first transport timing error groups corresponding to any basic first positioning measurement value pairs; and then takes at least one basic first positioning measurement value pair with the greatest similarity as one first positioning measurement value pair for difference. The transport timing errors of two first positioning measurement values in the first positioning measurement value pairs are closer to each other, which can cancel out the transport timing errors as much as possible when calculating the difference, thereby obtaining a more accurate difference of measurement values.

Interaction process of downlink positioning and uplink positioning are described hereinafter.

Figure 5:
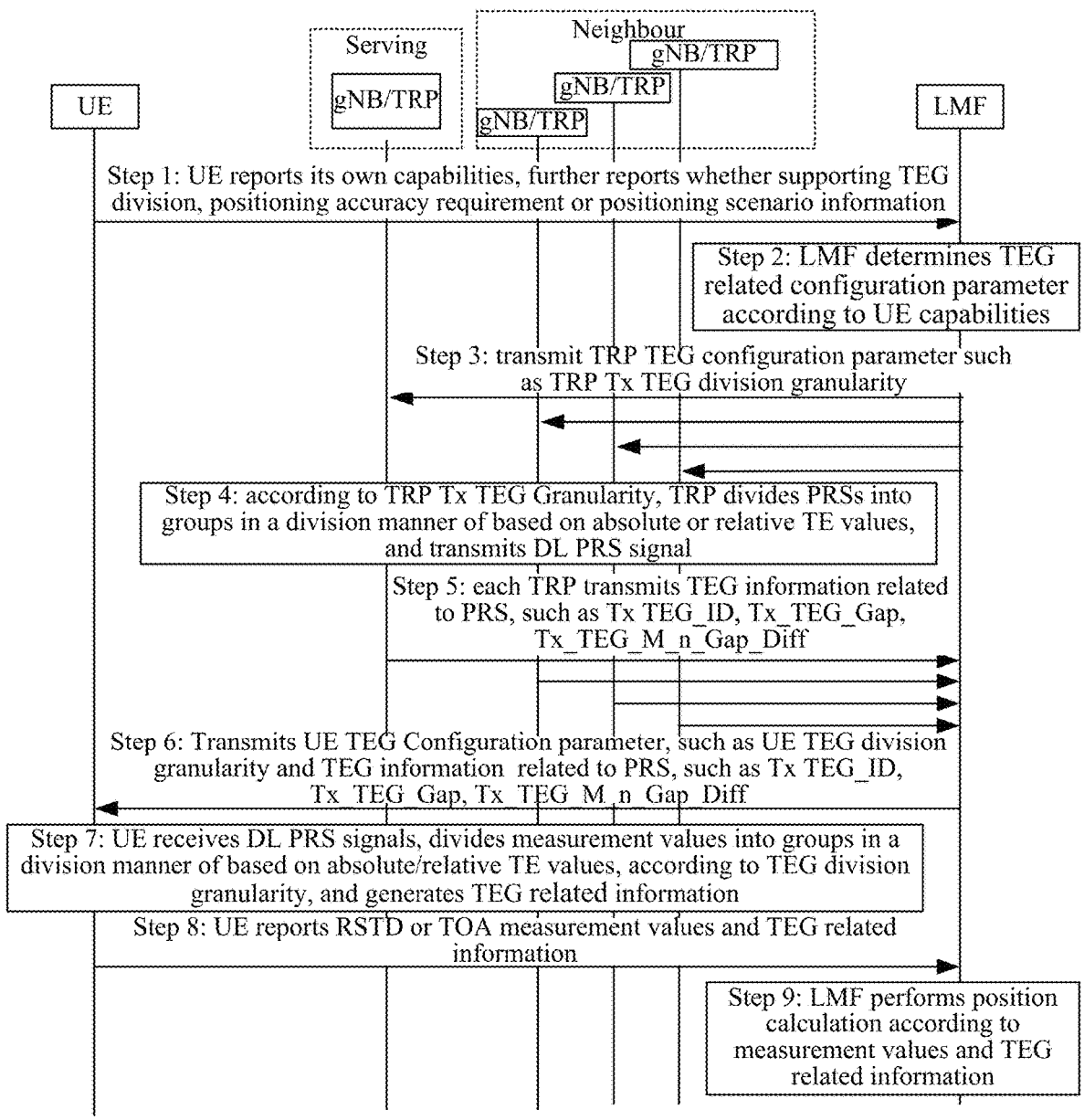
FIG. 5 is a schematic diagram exemplarily showing interaction between UE, TRP and LMF in downlink positioning according to an embodiment of the present disclosure.

Referring to FIG. 5, it is a schematic diagram exemplarily showing interaction between UE, TRP and LMF in downlink positioning according to an embodiment of the present disclosure. In the downlink positioning, a first reference signal is PRS, a transmitting end is TRP, a receiving end is UE, and a first positioning measurement value is TOA measurement value. As shown in the figure, the interaction process includes the following steps performed at different execution entities.

At UE Side 1. (Step 1): in case that the UE reports its own capabilities through the LPP protocol, in addition to reporting whether DL TDOA positioning is supported, it is also necessary to report whether the UE supports TEG division and positioning accuracy requirement or positioning scenario types. The positioning accuracy requirement is related to positioning scenarios. For example, in the 3GPP R17 standard, for an IIOT factory scenario, the positioning accuracy requirement is at a sub-meter level; for an ordinary business scenario, the positioning accuracy requirement is at a meter level.

2. (Step 7): the UE receives a DL PRS signal, and divides different TOA measurement values into groups according to a first timing error group configuration parameter (i.e., UE TEG configuration parameter shown in the figure) such as UE Rx TEG division granularity (i.e., first grouping granularity) provided by LMF.

There are a variety of manners to divide ranges of UE Rx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$ and $[a_{k+2}, a_{k+3}]$, absolute Rx TE values corresponding to different measurement values are compared with each interval, respectively, and an interval with the highest degree of overlap is selected as a representative numerical value interval of one measurement value. Measurement values with the same representative numerical value interval are classified into the same TEG group, and measurement values with different representative numerical value intervals are divided into different TEG groups. The intervals may be defined or configured in different ways, for example, it may be defined through tables or mathematical formulas in standard specifications, such as $a_k = a_{offset} + k \times \Delta$, ($k \in Z$), where $a_{offset}$, $\Delta$ are configurable values, which for example, may be calculated by the LMF or TRP via finding tables or mathematical formulas in standard specifications (for example, $\Delta$ is determined according to a grouping granularity).

Manner 2: based on relative TE values.

If a difference between Rx TE values of two measurement values is within the range $\Delta$, the two measurement values can be divided into the same Rx TEG, that is, TEG IDs of the two measurement values are the same, or there is a TEG which includes the two measurement values. For example, if a measurement value A and a measurement value B are associated with Rx TEG i, then $|Rx\ TE_A - Rx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a grouping granularity).

3. (Step 8): the UE reports measurement values and TEG related information. By introducing TEG, the embodiments of the present disclosure provide the following UE measurement value reporting manners:

Reporting Manner 1: RSTD

An RSTD measurement value is a difference between two TOA measurement values. One of the two TOA measurement values is from a reference TRP, which is represented as serving in the figure. The other one of the two TOA measurement values is from a non-reference TRP, which is represented as neighbor in the figure.

When constructing an RSTD measurement value, there are several manners as follows:

Manner 1:

The UE matches TOA measurement values of the reference TRP and non-reference TRP to obtain an RSTD, and meanwhile, reports the following TEG related information corresponding to the TOA measurement values used to construct the RSTD, such as:

1) TEG identifier

TRP Tx TEG ID, UE Rx TEG ID

2) TE value or value range in TEG

TRP Tx TEG ID Gap, UE Rx TEG ID Gap 3) a difference between TE values or value ranges in TEG TRP Tx TEG m n Gap Diff, UE Rx TEG m n Gap Diff, where m and n belong to different TEG identifiers of UE or TRP.

Manner 2: according to TEG and its related information to which different PRS and TOA measurement values belong, an RSTD measurement value is obtained by reasonable difference.

Figure 6:
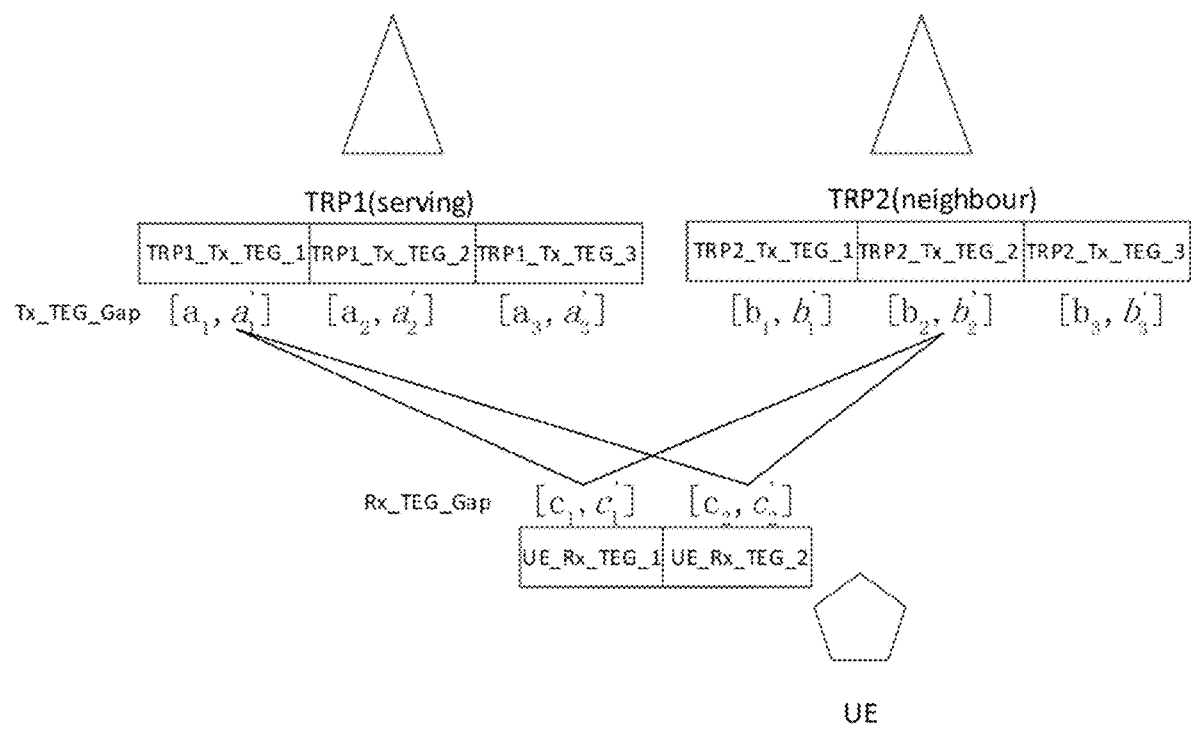
FIG. 6 is a schematic diagram exemplarily showing correspondence between a first transport timing error group and a first receive timing error group.

Referring to FIG. 6, it is a schematic diagram exemplarily showing correspondence between a first transport timing error group and a first receive timing error group. As shown in FIG. 6, a reference TRP1 has 3 Tx TEGs, which are denoted as TRP1 Tx TEG1~3, and feature information of Tx TEG is an actual range Gap, which is correspondingly expressed as Gap=[$a_1$, $a_1'$], [$a_2$, $a_2'$] and [$a_3$, $a_3'$]. A non-reference TRP2 has 3 Tx TEGs, which are denoted as TRP2 Tx TEG1~3, and feature information of Tx TEG is an actual range Gap, which is correspondingly expressed as [$b_1$, $b_1'$], [$b_2$, $b_2'$] and [$b_3$, $b_3'$]. The UE has two Rx TEGs, which are denoted as UE RX TEG1~2, and feature information of Rx TEG is an actual range Gap, which is correspondingly expressed as [$c_1$, $c_1'$] and [$c_2$, $c_2'$].

In FIG. 6, there is a connection line between UE Rx TEG 1 and TRP1 Tx TEG1, and there is a connection line between UE Rx TEG 1 and TRP2 Tx TEG2, which indicates that there are two TOAs in UE Rx TEG 1, and transport timing error groups TRP1 Tx TEG1 and TRP2 Tx TEG2 where transport timing errors corresponding to these two TOAs are located, have high similarity, and these two TOAs are suitable as TOAs for calculating RSTD.

Manner 3: on the basis of manner 2, according to UE RX TEG and feature information (such as actual range Gap) of different RSTD measurement values, the smallest RSTD measurement value or multiple smaller RSTD measurement values are selected to report.

Reporting Manner 2: TOA

Although the 3GPP standard does not currently support reporting of TOA measurement values, when the reporting of TOA measurement values is supported in the future, a new UE TOA measurement value can be added and it is not necessary to report the RSTD measurement value. When reporting the TOA measurement value, the UE also reports related information of corresponding UE RX TEG and TRP TX TEG (including the information reported in the manner 1 of the Reporting manner 1) to the LMF. The TOA reporting manner is simpler than the RSTD reporting manner, and can avoid mixing the TOA measurement values of different TEs together, thereby reducing the complexity of processing the measurement values by the UE.

At TRP Side 1. (Step 4): the TRP divides different PRS resources into groups according to the TEG configuration parameter (i.e., the second timing error group configuration parameter) provided by the LMF, such as TRP Tx TEG division granularity, and transmits DL PRS signals to the UE.

There are a variety of manners to divide ranges of TRP Tx TEG. The following manners 1 and 2 may be used alone or in combination.

Manner 1: based on absolute TE values.

It is assumed that there are multiple intervals including [$a_{k-1}$, $a_k$], [$a_k$, $a_{k+1}$], [$a_{k+1}$, $a_{k+2}$], [$a_{k+2}$, $a_{k+3}$]; absolute Rx TE values corresponding to different PRSs are compared with each interval, respectively, and an interval with the highest degree of overlap is selected as a representative numerical value interval of one PRS. PRSs with the same representative numerical value interval are classified into the same TEG group, and PRSs with different representative numerical value intervals are divided into different TEG groups. The intervals may be defined or configured in different ways, for example, it may be defined through tables or mathematical formulas in standard specifications, such as $a_k = a_{offset} + k \times \Delta$, ($k \in Z$), where $a_{offset}$, $\Delta$ are configurable values, which for example, may be calculated by the LMF or TRP via finding tables or mathematical formulas in standard specifications (for example, A is determined according to a grouping granularity).

Manner 2: based on relative TE values.

If a difference between Rx TE values of two PRSs is within the range $\Delta$, the two PRSs can be divided into the same Tx TEG, that is, TEG IDs of the two PRSs are the same, or there is a TEG which includes the two PRSs. For example, if a PRS A and a PRS B are associated with Tx TEG i, then $|Tx\ TE_A - Tx\ TE_B| < \Delta$, where $\Delta$ is a configurable value, which may be defined or configured in different ways, for example, it may be calculated by the LMF or TRP via finding tables or mathematical formulas in standard specifications (for example, A is determined according to a grouping granularity).

2. (Step 5): each TRP provides the LMF with Tx TEG information related to DL PRSs, such as an identifier of Tx TEG, Tx TEG ID, and an actual range of TEG, Tx TEG Gap.

At LMF Side 1. (Step 2): the LMF determines TRP TEG configuration parameter and UE TEG configuration parameter by looking up tables or mathematical definition formulas according to UE capabilities (including whether TEG division is supported, and positioning accuracy requirement); where the configuration parameters can include TEG division granularity, etc.

2. (Step 3): the LMF transmits the TRP TEG configuration parameter such as TRP Tx TEG division granularity, to each TRP.

3. (Step 6): the LMF notifies the UE of UE TEG configuration parameters, such as UE TEG division granularity, and Tx TEG related information of DL PRSs provided by each TRP, such as Tx TEG ID, Tx TEG Gap.

4. (Step 9): when calculating a position, if RSTD measurement values are received, the LMF selects, based on TEG and TE timing ranges, a measurement value that meet the requirements, for position calculation; if TOA measurement values are received, the LMF performs single-difference operations reasonably according to the TEG and TE timing range, and selects an appropriate single-difference measurement value for position calculation.

Next, the downlink positioning of the embodiment of the present disclosure is described hereinafter with reference to specific examples.

Example 1

At UE Side 1. (Corresponding to step 1 in FIG. 5) the UE reports information such as supporting for DL TDOA positioning, supporting for TEG division, and a positioning accuracy requirement of 0.2 m, through the LPP protocol.

2. (Corresponding to step 7 in FIG. 5) the UE receives DL PRS signals of 4 TRPs, and divides different measurement values into groups in a division manner 1 of based on absolute TE values, according to TEG division granularity UE Rx TEG Granularity=0.11 ns provided by LMF.

In case that the UE obtains 10 TOA measurement values, whose TE ranges are corresponding to Rx1 TE, Rx2 TE, . . . Rx10 TE, respectively. According to the formula $a_k = a_{offset} + k \times \Delta$, ($k \in Z$) where $a_{offset}$=0.1, $\Delta$=TRP Tx TEG Granularity=0.13, the UE generates multiple intervals including [0.1−0.13*2, 0.1−0.13*1], [0.1−0.13*1, 0.1], [0.1, 0.1+0.13*1], [0.1+0.13*1, 0.1+0.13*2]. That is, the UE compares an absolute Rx TE value of each of these 10 TOA measurement values with each interval, and selects the interval with the highest degree of overlap as a TEG group of the TOA measurement value.

Finally, three Rx TEGs are obtained, namely Rx TEG 1, Rx TEG 2, and Rx TEG 3, and the TE timing range of each Rx TEG is recorded as Rx TEG 1 Gap=[c1, c1'], Rx TEG 2 Gap=[c2, c2'], Rx TEG 3 Gap=[c3,c3'], where TEs of TOA3, 4, 7, and 10 are in Rx TEG1, TEs of TOA1, 5, 8, and 9 are in Rx TEG2, and TEs of TOA2 and 6 are in Rx TEG3.

3. (Corresponding to step 8 in FIG. 5) according to the Tx TEG information of the DL PRS provided by the LMF, for these 10 TOA measurement values (only measurement values of TRP1 and TRP2 are taken as examples), each is corresponding to the Tx TEG ID, Tx TEG ID Gap, Rx TEG ID and Rx TEG ID Gap. The TOA values of TRP2 and TRP1, whose TEs belong to the same Rx TEG respectively, are differentiated to generate RSTD measurement values. For example, the TOA values in the Rx TEG1, which belong to different TRPs, can be differentiated.

The following takes a single-difference of Rx TEG1 as an example. When TOA3, 4, 7, and 10 corresponding to the TE in Rx TEG2 are differenced, multiple RSTD values are obtained. The UE reports RSTD together with Rx TEG2 GAP and Tx TEG ID GAP required to generate the RSTD, to the LMF.

Finally, three TRP1 Rx TEGs are obtained, namely TRP1 Rx TEG 1, TRP1 Rx TEG 2, TRP1 Rx TEG 3, and the timing range of each Rx TEG is recorded as TRP1 Rx TEG 1 Gap=[b1,b1'], TRP1 Rx TEG 2 Gap=[b2,b2'], TRP1 Rx TEG 3 Gap=[b3,b3'].

At TRP Side 1. (corresponding to step 4 in FIG. 5) according to the parameter TRP Tx TEG Granularity=0.055 ns provided by the LMF, the TRP divides TEs of different PRSs into groups in a division manner of based on absolute TE values, and transmits a DL PRS signal.

The following takes TRP1 (reference TRP) and TRP2 (non-reference TRP) as examples for illustrate a division process, and a division process of other non-reference TRPs is similar.

It is assumed that the TRP1 has a total of 4 PRSs, whose TE ranges are corresponding to TRP1 RES1 TE, TRP1 RES2 TE, TRP1 RES3 TE, TRP1 RES4 TE. According to the formula $a_k=a_{offset}+k\times\Delta$, $(k\in Z)$, where $a_{offset}=0.1$, $\Delta$=TRP Tx TEG Granularity=0.065, the TRP1 generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the TRP1 compares an absolute Rx TE value of each of these 4 PRSs with each interval, and selects the interval with the highest degree of overlap as a TEG group of the PRS. Finally, three TRP1 Tx TEGs are obtained, namely TRP1 Tx TEG 1, TRP1 Tx TEG 2, TRP1 Tx TEG 3, and the timing range of each Tx TEG is recorded as TRP1 Tx TEG 1 Gap=[b1,b1'], TRP1 Tx TEG 2 Gap=[b2,b2'], TRP1 Tx TEG 3 Gap=[b3,b3'].

It is assumed that the TRP2 has a total of 5 PRSs, whose TE ranges are corresponding to TRP2 RES1 TE, RP2 RES2 TE, TRP2 RES3 TE, TRP2 RES4 TE, TRP2 RES5 TE. According to the formula $a_k=a_{offset}+k\times\Delta$, $(k\in Z)$, where $a_{offset}=0.1$, $\Delta$=TRP Tx TEG Granularity=0.065, the UE generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the UE compares an absolute Rx TE value of each of these 5 PRSs with each interval, and selects the interval with the highest degree of overlap as a TEG group of the PRS. Finally, three TRP2 Tx TEGs are obtained, namely TRP2 Tx TEG 1, TRP2 Tx TEG 2, TRP2 Tx TEG 3, and the timing range of each Tx TEG is recorded as TRP2 Tx TEG 1 Gap=[b1,b1'], TRP2 Tx TEG 2 Gap=[b2,b2'], TRP2 Tx TEG 3 Gap=[b3,b3'].

2. (Corresponding to step 5 in FIG. 5) 4 TRPs provide the LMF with Tx TEG information of 4 DL PRSs, such as TEG identifiers: Tx TEG ID, TEG TE range: Tx TEG Gap, a difference of TEG TE ranges: Tx TEG m n Gap Diff.

At LMF Side 1. (Corresponding to step 2 in FIG. 5) the LMF determines Tx\Rx TEG configuration parameters of the UE and TRP based on information reported by the UE that the UE supports TEG division and a positioning accuracy requirement is 0.2 m, according to a predefined mathematical formula granularity=10*accuracy/3/K, where K is 5, thereby obtaining TEG division granularity TRP Tx TEG Granularity=0.065 ns and UE Rx TEG Granularity=0.13 ns.

2. (Corresponding to step 3 in FIG. 5) the LMF informs 4 TRPs through the NRPPa protocol, of the TEG configuration parameter, i.e., the TEG division granularity TRP Tx TEG Granularity=0.055 ns.

3. (Corresponding to step 6 in FIG. 5) the LMF informs the UE of the TEG division granularity UE Rx TEG Granularity=0.11 ns and Tx TEG related information of DL PRSs provided by each TRP, including Tx TEG ID, Tx TEG Gap, Tx TEG Gap m n.

4. (Corresponding to step 9 in FIG. 5) according to the RSTD and Rx TEG2 GAP as well as Tx TEG ID GAP required for generating the RSTD, reported by the UE, the LMF selects a measurement value that meet the requirements, for position calculation.

Example 2

At UE Side 1. (Corresponding to step 1 in FIG. 5) the UE reports information such as supporting for DL TDOA positioning, supporting for TEG division, and a positioning accuracy requirement of 0.2 m, through the LPP protocol.

2. (Corresponding to step 7 in FIG. 5) the UE receives DL PRS signals of 4 TRPs, and divides different measurement values into groups in a division manner 1 of based on relative TE values, according to TEG division granularity UE Rx TEG Granularity=0.11 ns provided by LMF.

In case that the UE obtains 10 TOA measurement values, whose TE ranges are corresponding to Rx1 TE, Rx2 TE, . . . Rx10 TE, respectively. The UE obtains differences of TEs of these 10 TOA measurement values, compares the differences with $\Delta$=UE Rx TEG Granularity=0.11 ns, and classifies the TEs of measurement values whose difference is smaller than this value into one TEG group, that is, if |Rx2 TE-Rx1 TE|<0.11 ns, then Rx TEG IDs of Rx1 TE and Rx2 TE are the same. Finally, three Rx TEGs are obtained, namely Rx TEG 1, Rx TEG 2, and Rx TEG 3, and a TE timing range of each Rx TEG is recorded as Rx TEG 1 Gap=[c1,c1'], Rx TEG 2 Gap=[c2, c2'], Rx TEG 3 Gap=[c3, c3'], where RX TEs of TOA3, 4, 7, and 10 are in Rx TEG1, TEs of TOA1, 5, 8, and 9 are in Rx TEG2, and TEs of TOA2, 6 are in Rx in TEG3.

3. (Corresponding to step 8 in FIG. 5) according to the Tx TEG information of the DL PRS provided by the LMF, for these 10 TOA measurement values (measurement values of TRP1 and TRP2), each is corresponding to the Tx TEG ID, Tx TEG ID Gap, Rx TEG ID and Rx TEG ID Gap. The TOA values of TRP2 and TRP1, whose RX TEs belong to the same Rx TEG respectively, are differentiated to generate RSTD measurement values. For example, the TOA values in the Rx TEG1, which belong to different TRPs, can be differentiated. The following takes a single-difference of Rx TEG1 as an example. When TOA3, 4, 7, and 10 corresponding to the TE in Rx TEG2 are differenced, multiple RSTD values are obtained. According to the TEG information used for generating RSTD, an RSTD value with the smallest Rx TEG2 GAP and Tx TEG ID GAP for position calculation.

At TRP Side 1. (corresponding to step 4 in FIG. 5) according to the parameter TRP Tx TEG Granularity=0.055 ns provided by the LMF, the TRP divides TEs of different PRSs into groups in a division manner of based on absolute TE values, and transmits a DL PRS signal.

The following takes TRP1 (reference TRP) and TRP2 (non-reference TRP) as examples for illustrate a division process, and a division process of other non-reference TRPs is similar.

It is assumed that the TRP1 has a total of 4 PRSs, whose TE ranges are corresponding to TRP1 RES1 TE, TRP1 RES2 TE, TRP1 RES3 TE, TRP1 RES4 TE. According to the formula $a_k=a_{offset}+k\times\Delta$, ($k\in Z$), where $a_{offset}=0$, $\Delta$=TRP Tx TEG Granularity=0.055, the UE generates multiple intervals including [−0.055*2, −0.055*1], [−0.055*1, 0], [0, 0.055*1], [0.055*1, 0.055*2]. That is, the UE compares an absolute Rx TE value of each of these 4 PRSs with each interval, and selects the interval with the highest degree of overlap as a TEG group of the PRS. Finally, three TRP1 Tx TEGs are obtained, namely TRP1 Tx TEG 1, TRP1 Tx TEG 2, TRP1 Tx TEG 3, and the timing range of each Tx TEG is recorded as TRP1 Tx TEG 1 Gap=[b1,b1'], TRP1 Tx TEG 2 Gap=[b2,b2'], TRP1 Tx TEG 3 Gap=[b3,b3'].

It is assumed that the TRP2 has a total of 5 PRSs, whose TE ranges are corresponding to TRP2 RES1 TE, RP2 RES2 TE, TRP2 RES3 TE, TRP2 RES4 TE, TRP2 RES5 TE. According to the formula $a_k=a_{offset}+k\times\Delta$, ($k\in Z$), where $a_{offset}=0$, $\Delta$=TRP Tx TEG Granularity=0.055, the UE generates multiple intervals including [−0.055*2, −0.055*1], [−0.055*1, 0], [0, 0.055*1], [0.055*1, 0.055*2]. That is, the UE compares an absolute Rx TE value of each of these 5 PRSs with each interval, and selects the interval with the highest degree of overlap as a TEG group of the PRS. Finally, three TRP2 Tx TEGs are obtained, namely TRP2 Tx TEG 1, TRP2 Tx TEG 2, TRP2 Tx TEG 3, and the timing range of each Tx TEG is recorded as TRP2 Tx TEG 1 Gap=[b1,b1'], TRP2 Tx TEG 2 Gap=[b2,b2'], TRP2 Tx TEG 3 Gap=[b3,b3'].

2. (Corresponding to step 5 in FIG. 5) 4 TRPs provide the LMF with Tx TEG information of 4 DL PRSs, such as TEG identifiers: Tx TEG ID, TEG TE range: Tx TEG Gap, a difference of TEG TE ranges: Tx TEG m n Gap Diff.

At LMF Side 1. (Corresponding to step 2 in FIG. 5) the LMF determines Tx\Rx TEG configuration parameters of the UE and TRP by looking up a predefined corresponding table of positioning accuracy requirements and TEG partitioning granularities, such as Table 4-1, based on information reported by the UE that the UE supports TEG division and a positioning accuracy requirement is 0.2 m, thereby obtaining TEG division granularity TRP Tx TEG Granularity=0.055 ns and UE Rx TEG Granularity=0.11 ns.

2. (Corresponding to step 3 in FIG. 5) the LMF informs 4 TRPs through the NRPPa protocol, of the TEG configuration parameter, i.e., the TEG division granularity TRP Tx TEG Granularity=0.055 ns.

3. (Corresponding to step 6 in FIG. 5) the LMF informs the UE of the TEG division granularity UE Rx TEG Granularity=0.11 ns and Tx TEG related information of DL PRSs provided by each TRP, including Tx TEG ID, Tx TEG Gap, Tx TEG Gap m n.

Figure 7:
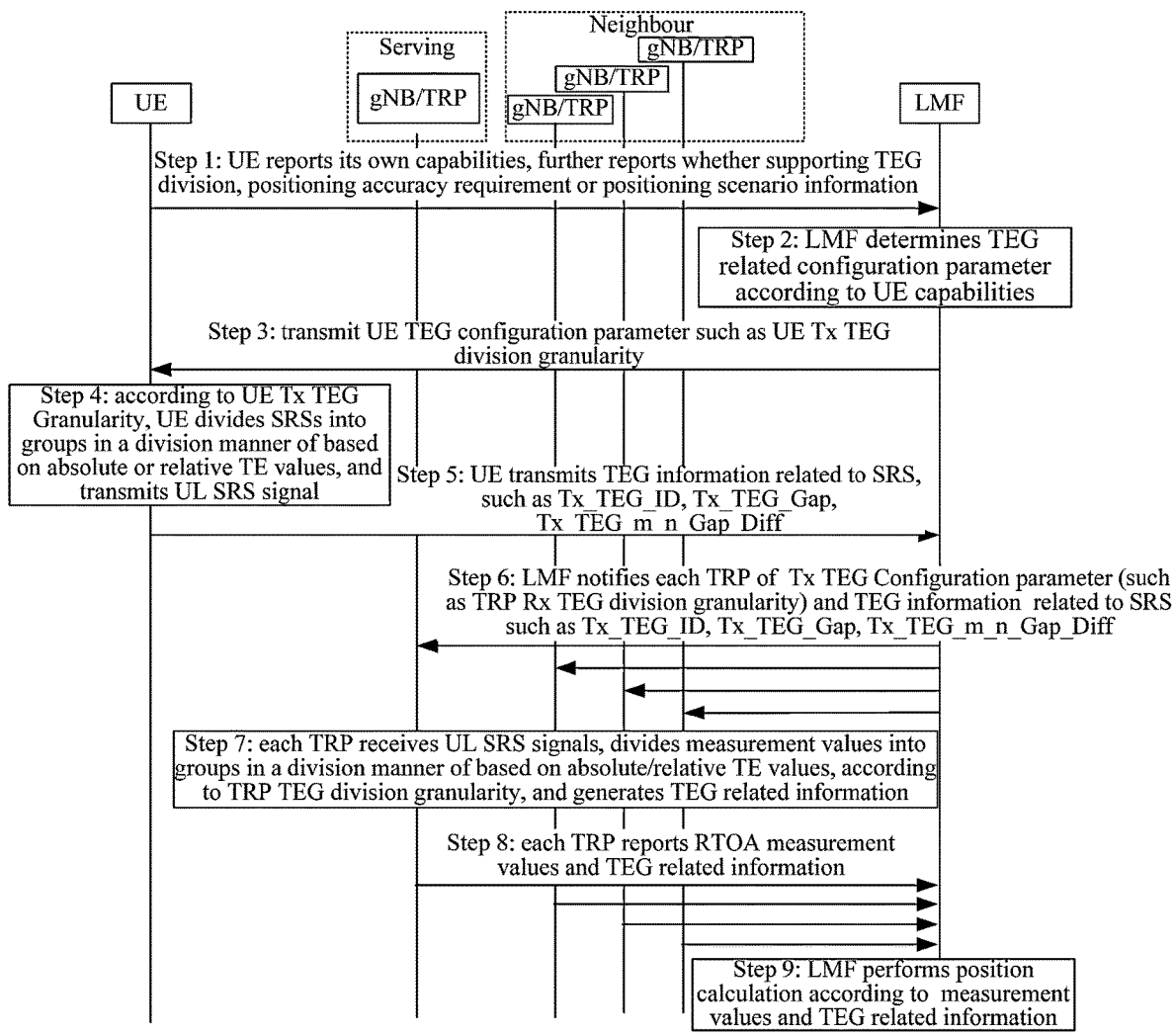
FIG. 7 is a schematic diagram exemplarily showing interaction between UE, TRP and LMF in uplink positioning according to an embodiment of the present disclosure.

Referring to FIG. 7, it is a schematic diagram exemplarily showing interaction between UE, TRP and LMF in uplink positioning according to an embodiment of the present disclosure. In the uplink positioning, a first reference signal is SRS, a transmitting end is UE, a receiving end is TRP, and a first positioning measurement value is RTOA measurement value. As shown in the figure, the interaction process includes the following steps performed at different execution entities.

At UE Side 1. (Step 1): in case that the UE reports its own capabilities through the LPP protocol, in addition to reporting whether DL TDOA positioning is supported, it is also necessary to report whether the UE supports TEG division and positioning accuracy requirement or positioning scenario types. The positioning accuracy requirement is related to positioning scenarios. For example, in the 3GPP R17 standard, for an IIOT factory scenario, the positioning accuracy requirement is at a sub-meter level; for an ordinary business scenario, the positioning accuracy requirement is at a meter level.

2. (Step 4): the UE divides SRSs into groups according to a TEG configuration parameter such as UE Tx TEG division granularity provided by the LMF, and transmits a UL SRS signal.

There are a variety of manners to divide ranges of UE Tx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$, $[a_{k+2}, a_{k+3}]$, absolute Tx TE values corresponding to different SRSs are compared with each interval, respectively, and an interval with the highest degree of overlap is selected as a representative numerical value interval of one SRS. SRSs with the same representative numerical value interval are classified into the same TEG group, and SRSs with different representative numerical value intervals are divided into different TEG groups. The intervals may be defined or configured in different ways, for example, it may be defined through tables or mathematical formulas in standard specifications, such as $a_k=a_{offset}+k\times\Delta$, ($k\in Z$), where $a_{offset}$, $\Delta$ are configurable values, which for example, may be calculated by the LMF or TRP via finding tables or mathematical formulas in standard specifications (for example, $\Delta$ is determined according to a grouping granularity).

Manner 2: based on relative TE values.

If a difference between Tx TE values of two SRSs is within the range $\Delta$, the two SRSs can be divided into the same Tx TEG, that is, TEG IDs of the two SRSs are the same, or there is a TEG which includes the two SRSs. For example, if an SRS A and an SRS B are associated with Rx TEG i, then $|Tx\ TE_A - Tx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a grouping granularity).

3. (Step 5) the UE provides the LMF with Tx TEG information related to UL SRSs, such as TEG identifier: Tx TEG ID, TEG TE range: Tx TEG Gap, a difference of TEG TE ranges: Tx TEG m n Gap Diff.

At TRP Side 1. (Step 7) the TRP receives a UL SRS signal, and divides different measurement values into groups according to a TRP Rx TEG configuration parameter such as TRP Rx TEG division granularity provided by the LMF.

There are a variety of manners to divide ranges of TRP Rx TEG. The following manners 1 and 2 may be used alone or in combination.

Manner 1: based on absolute TE values.

It is assumed that there multiple intervals including $[a_{k-1}, a_k]$, $[a_k, a_{k+1}]$, $[a_{k+1}, a_{k+2}]$, $[a_{k+2}, a_{k+3}]$; absolute Rx TE values corresponding to different measurement values are compared with each interval, respectively, and an interval with the highest degree of overlap is selected as a representative numerical value interval of one measurement value. Measurement values with the same representative numerical value interval are classified into the same TEG group, and measurement values with different representative numerical value intervals are divided into different TEG groups. The intervals may be defined or configured in different ways, for example, it may be defined through tables or mathematical formulas in standard specifications, such as $a_k=a_{offsset}+k\times\Delta$, ($k\in Z$), where $a_{offsset}$, $\Delta$ are configurable values, which for example, may be calculated by the LMF or TRP via finding tables or mathematical formulas in standard specifications (for example, $\Delta$ is determined according to a TEG granularity).

Manner 2: based on relative TE values.

If a difference between Rx TE values of two measurement values is within the range $\Delta$, the two measurement values can be divided into the same Rx TEG, that is, TEG IDs of the two measurement values are the same, or there is a TEG which includes the two measurement values. For example, if a measurement value A and a measurement value B are associated with Rx TEG i, then $|Rx\ TE_A - Rx\ TE_B| < \Delta$, where $\Delta$ is a configurable value, which may be defined or configured in different ways, for example, it may be calculated by the LMF or TRP via finding tables or mathematical formulas in standard specifications (for example, $\Delta$ is determined according to a TEG grouping granularity).

2. (Step 8): the TRP reports measurement values and TEG related information. By introducing TEG, the embodiments of the present disclosure provide the following TRP measurement value reporting manners:

Reporting Manner: RTOA

When reporting RTOA measurement values, the TRP also reports related information of corresponding TRP RX TEG and UE TX TEG to the LMF. The related information includes:
1) TEG identifier
   UE Rx TEG ID, TRP Tx TEG ID
2) TE value or value range in TEG
   UE Rx TEG ID Gap, TRP Tx TEG ID Gap
3) a difference between TE values or value ranges in TEG
   UE Rx TEG m n Gap Diff,
   TRP Tx TEG m n Gap Diff (where m and n belong to different TEG identifiers of UE or TRP).

At LMF Side 1. (Step 2): the LMF determines TRP TEG configuration parameter and UE TEG configuration parameter by looking up tables or mathematical definition formulas according to UE capabilities (including whether TEG division is supported, and positioning accuracy requirement); where the configuration parameters can include TEG division granularity.

2. (Step 3): the LMF transmits the TEG configuration parameter such as UE Tx TEG division granularity, to the UE.

3. (Step 6): the LMF notifies each TRP of the TEG configuration parameter such as TRP Rx TEG division granularity, and Tx TEG related information of UL SRSs provided by the UE such as Tx TEG ID, Tx TEG Gap, and Tx TEG m n Gap Diff.

4. (Step 9): when calculating a position, the LMF performs difference operations reasonably according to the TEG and TEG timing range, and selects an appropriate differential measurement value for position calculation.

Next, the uplink positioning of the embodiment of the present disclosure is described hereinafter with reference to specific examples.

This example is about uplink positioning:

At UE Side 1. (Corresponding to step 1 in FIG. 7) the UE reports information such as supporting for UL TDOA positioning, supporting for TEG division, and a positioning accuracy requirement of 1 m, through the LPP protocol.

2. (corresponding to step 4 in FIG. 7) according to the TEG configuration parameter provided by the LMF, i.e., UE Tx TEG Granularity=0.44 ns, the UE divides TEs of the SRSs into groups in a division manner of based on absolute TE values, and transmits a UL SRS.

It is assumed that the UE has a total of 4 SRS resources, whose TE ranges are corresponding to UE RES1 TE, UE RES2 TE, UE RES3 TE, and UE RES4 TE respectively. According to the formula $a_k=a_{offsset}+k\times\Delta$, ($k\in Z$), where a_offsset=−0.2, $\Delta$=UE Tx TEG Granularity=0.44 ns, the UE generates multiple intervals including [−0.2−0.44*2, −0.2−0.44*1], [−0.2−0.44*1, −0.2], [−0.2, −0.2+0.44*1], [−0.2+0.44*1, −0.2+0.44*2]. That is, the UE compares an absolute Tx TE value of each of the 4 SRS resources with each interval, and selects the interval with the highest degree of overlap as a TEG group of the SRS. Finally, three Tx TEGs are obtained, namely UE Tx TEG 1, UE Tx TEG 2, TRP1 Tx TEG 3, and the timing range of each Tx TEG is recorded as UE Tx TEG 1 Gap=[b1,b1'], UE Tx TEG 2 Gap=[b2,b2'], UE Tx TEG 3 Gap=[b3,b3'].

3. (Corresponding to step 5 in FIG. 7) the UE provides the LMF with Tx TEG information of the four UL SRS resources, such as TEG identifiers: Tx TEG ID, TEG TE range: Tx TEG Gap, a difference of TEG TE ranges: Tx TEG m n Gap Diff.

At TRP Side 1. (corresponding to step 7 in FIG. 7) each TRP receives a UL SRS signal, and divides different measurement values into groups in a division manner of based on absolute TE values according to TRP Rx TEG Granularity=0.22 ns.

The following takes TRP1 (reference TRP) and TRP2 (non-reference TRP) as examples for illustrate a division process, and a division process of other non-reference TRPs is similar.

It is assumed that the TRP1 has a total of 4 measurement values, whose TE ranges are corresponding to TRP1 Rx1 TE, TRP1 Rx2 TE, TRP1 Rx3 TE, TRP1 Rx4 TE. According to the formula $a_k=a_{offsset}+k\times\Delta$, ($k\in Z$), where $a_{offsset}$=0.1, $\Delta$=TRP Rx TEG Granularity=0.22, the UE generates multiple intervals including [0.1−0.22*2, 0.1−0.22*1], [0.1−0.22*1, 0.1], [0.1, 0.1+0.22*1], [0.1+0.22*1, 0.1+0.22*2]. That is, the UE compares an absolute Tx TE value of each of these 4 measurement values with each interval, and selects the interval with the highest degree of overlap as a TEG group of the measurement value. Finally, three TRP1 Rx TEGs are obtained, namely TRP1 Rx TEG 1, TRP1 Rx TEG 2, TRP1 Rx TEG 3, and the timing range of each Tx TEG is recorded as TRP1 Rx TEG 1 Gap=[b1,b1'], TRP1 Rx TEG 2 Gap=[b2,b2'], TRP1 Rx TEG 3 Gap=[b3,b3'].

It is assumed that the TRP2 has a total of 5 measurement values, whose TE ranges are corresponding to TRP2 Rx1 TE, TRP2 Rx2 TE, TRP2 Rx3 TE, TRP2 Rx4 TE, TRP2 Rx5 TE. According to the formula $a_k=a_{offsset}+k\times\Delta$, ($k\in Z$), where $a_{offsset}$=0.1, $\Delta$=TRP Rx TEG Granularity=0.22, the UE generates multiple intervals including [0.1−0.22*2, 0.1−0.22*1], [0.1−0.22*1, 0.1], [0.1, 0.1+0.22*1], [0.1+0.22*1, 0.1+0.22*2]. That is, the UE compares an absolute Tx TE value of each of these 5 measurement values with each interval, and selects the interval with the highest degree of overlap as a TEG group of the measurement value. Finally, three TRP2 Rx TEGs are obtained, namely TRP2 Rx TEG 1, TRP2 Rx TEG 2, TRP2 Rx TEG 3, and the timing range of each Tx TEG is recorded as TRP2 Rx TEG 1 Gap=[b1, b1'], TRP2 Rx TEG 2 Gap=[b2,b2'], TRP2 Rx TEG 3 Gap=[b3,b3'].

2. (corresponding to step 8 in FIG. 7) each TRP reports RTOA measurement values and TEG related information. The related information includes:
   1) TEG identifier
      UE Tx TEG ID, TRP Rx TEG ID
   2) TE value or value range in TEG
      UE Tx TEG ID Gap, TRP Rx TEG ID Gap
   3) a difference between TE values or value ranges in TEG
      UE Tx TEG m n Gap Diff
      TRP Rx TEG m n Gap Diff (where m and n belong to different TEG identifiers of UE or TRP).

At LMF Side 1. (corresponding to step 2 in FIG. 7) the LMF determines Tx\Rx TEG configuration parameters of the UE and TRP by looking up a predefined corresponding table of positioning accuracy requirements and TEG partitioning granularities, such as Table 4-2, based on information reported by the UE that the UE supports TEG division and a positioning accuracy requirement is 1 m, thereby obtaining TRP Tx TEG Granularity=0.22 ns and UE Rx TEG Granularity=0.44 ns.

2. (corresponding to step 3 in FIG. 7) the LMF notifies the UE of TEG division Granularity UE Tx TEG Granularity=0.44 ns, through the LPP protocol.

3. (corresponding to step 6 in FIG. 7) the LMF notifies each TRP of the TEG division granularity TRP Rx TEG granularity=0.22 ns, and the Tx TEG related information of the UL SRS resources provided by the UE, including Tx TEG ID, Tx TEG Gap, and Tx TEG m n Gap Diff.

4. (corresponding to step 9 in FIG. 7) when calculating a position, the LMF reasonably performs the differential operation according to the TEG related information, constructs a UL-TDOA value and calculates the position.

On the basis of the foregoing embodiments, as an optional embodiment, the embodiment of the present disclosure is also applicable to Multi-RTT positioning. It is to be understood that in Multi-RTT positioning, both the UE and the TRP need to transmit reference signals to each other, that is, the UE transmits an SRS signal to the TRP, and the TRP transmits a PRS signal to the UE, thereby using multiple round-trip delays to calculate the position of the UE. Referring to FIG. 8, it is a schematic diagram exemplarily showing components of RTT in Multi-RTT positioning according to an embodiment of the present disclosure. As shown in FIG. 8, there is a transport timing error from a reference signal generated by a baseband (BB) to the time the reference signal is transmitted through an antenna hardware interface (Ant). Correspondingly, when receiving the reference signal, there is also a receive timing error in the process of the signal reaching the BB through Ant. For TRP, the Rx Tx time difference of the TRP includes the transport timing error generated when the TRP transmits PRS, a propagation delay of the PRS signal from the antenna hardware interface of the TRP to the antenna hardware interface of the UE, the time from when the UE's antenna hardware interface receives the PRS signal until a corresponding SRS signal is transmitted out through an antenna hardware interface, a propagation delay of the SRS from UE's antenna hardware interface to TRP's antenna hardware interface, and a receive timing error generated when the SRS is from the TRP's antenna hardware interface to the baseband.

The RTT between TRP1 and UE can be expressed as:

RTT1=UE Rx-Tx time difference+TRP1 Rx-Tx time difference.

The RTT between TRP2 and UE can be expressed as:

RTT2=UE' Rx-Tx time difference+TRP2 Rx-Tx time difference.

The UE Rx-Tx time difference and the UE'Rx-Tx time difference represent receiving-transmitting timing differences on the UE side caused by different TRPs.

When constructing a differential RTT, RTT difference=RTT2−RTT1 (TRP1 is a reference TRP).

By analyzing the structure of the RTT, it can be seen that in order to improve accuracy of the RTT difference, it is necessary to reduce differences between receive timing errors and transport timing errors between different RTTs.

Based on the above analysis, as an optional embodiment, for a receiving end of a first reference signal, after receiving the first reference signal, the method further includes:
    determining second transport timing errors of a second reference signal, and dividing the second transport timing errors into groups according to the first timing error group configuration parameter to obtain second transport timing error group information.

It is to be noted that after receiving the first reference signal, the receiving end of the first reference signal needs to return the second reference signal to a transmitting end of the first reference signal. In the embodiment of the present disclosure, the receiving end of the first reference signal may be a UE or a TRP. When the receiving end of the first reference signal is the UE, the transmitted second reference signal is SRS. When the receiving end of the first reference signal is the TRP, the transmitted second reference signal is PRS.

When transmitting the second reference signal, the receiving end of the first reference signal in the embodiment of the present disclosure further needs to determine a second transport timing error of the second reference signal. The embodiment of the present disclosure does not specifically limit ways of determining transport timing errors. After obtaining the transport timing error, which is also referred to as the second transport timing error, the second transport timing errors are divided into groups according to the first timing error group configuration parameter to obtain at least one second transport timing error group. When the first reference signal is PRS, it means that a second transport timing group is a grouping result of transport time when the UE transmits SRS, which can be identified as UE Tx TEG. When the first reference signal is SRS, it means that the second transport time group is a grouping result of transport time when the TRP transmits PRS, which can be identified as TRP Tx TEG.

When transmitting the second reference signal to the transmitting end of the first reference signal, a transmitting moment of the second reference signal is determined.

For the multi RTT positioning process, the UE and TRP need to record transmitting moments and receiving moments accordingly when transmitting the reference signals or receiving reference signals.

A first receiving-transmitting time difference is obtained according to a receiving moment of the first reference signal and a transmitting moment of the second reference signal. The first positioning measurement value includes the receiving moment of the first reference signal.

The receiving-transmitting time difference Rx-Tx time difference is obtained by subtracting the receiving moment of the resource from the transmitting time. As can be seen from FIG. 8, for the UE, the receiving time is before the transmitting time, so a result of the UE's receiving-transmitting time difference is a negative number, and the corresponding TRP's receiving-transmitting time difference is a positive value. When the two are added together, the UE's receiving-transmitting time difference can just be eliminated.

Corresponding relationship information of the first receiving-transmitting time difference is determined, and the corresponding relationship information is transmitted to a location management function module so that the location management function module performs positioning.

In the embodiment of the present disclosure, after obtaining the first receiving-transmitting time difference, it is necessary to further determine the corresponding relationship information of the first receiving-transmitting time difference. As can be seen from FIG. 8, one receiving-transmitting time difference is corresponding to transport timing errors and receive timing errors of the UE and the TRP, that is, one receiving-transmitting time difference is corresponding to 4 timing errors, so the established corresponding relationship information can include corresponding relationship among the first receiving-transmitting time difference, feature information of the first receive timing error group and feature information of the second transport timing error group, that is, information about the transport timing error group and the receive timing error group of the single execution subject side. For the UE, the corresponding relationship between the UE Rx-Tx time difference, the UE Rx TEG and the UE Tx TEG is established. A first receive timing error (i.e., a first receive timing error required for calculating the first receiving-transmitting time difference) corresponding to the first receiving-transmitting time difference is located in a division range of the first receive timing error group having the corresponding relationship with the first receiving-transmitting time difference. The second transport timing error (i.e., a second transport timing error required for calculating the first receiving-transmitting time difference) corresponding to the first receiving-transmitting time difference is located in a division range of the second transport timing error group having the corresponding relationship with the first receiving-transmitting time difference.

By establishing the corresponding relationship between the first receiving-transmitting time difference and timing error groups through the UE or TRP locally, when the RTT is subsequently differentiated, UE' Tx TEG and Rx TEG of RTT2 may be approximately equal to or in the same group as UE's Tx TEG and Rx TEG of RTT1 to eliminate TE at UE side; meanwhile, TRP' Tx TEG and Rx TEG of RTT2 may be approximately equal to or in the same group as TRP's Tx TEG and Rx TEG of RTT1 to eliminate TE at TRP side, thereby obtaining an RTT closer to twice the transmission delay.

On the basis of foregoing embodiments, as an optional embodiment, when performing multi RTT positioning in the embodiment of the present disclosure, the Rx TEG and Tx TEG may not be obtained separately, but the Rx TE and Tx TE may be summed and then only summed error results are divided into groups, thereby further improving efficiency of the LMF screening RTT. Specifically, in this embodiment of the present disclosure, the first positioning measurement value includes a receiving moment of the first reference signal, that is, a TOA measurement value or a RTOA measurement value during non-uplink and downlink positioning. Moreover, in addition to obtaining the corresponding relationship information of the first positioning measurement value, the positioning method further includes:

determining a second transport timing error of the second reference signal.

That is to say, the receiving end of the first reference signal needs to determine to transmit the second reference signal to the transmitting end of the first reference signal and determine the second transport timing error of the second reference signal.

Taking the first reference signal being a PRS as an example, the receiving end of the PRS, i.e., the UE, needs to determine the second transport timing error of SRS, i.e., UE Tx TE. Correspondingly, if the first reference signal is an SRS, then, the second transport timing error is TRP Tx TE.

The second reference signal is transmitted to the transmitting end of the first reference signal, and the transmitting moment of the second reference signal is determined.

On this basis, in the embodiment of the present disclosure, dividing the first receive timing errors into groups according to the first receive timing error group configuration parameter, includes: summing the first receive timing error and the second transport timing error, and dividing summation results into groups according to the first receive timing error group configuration parameter, thereby obtaining first receiving-transmitting timing error group information.

That is to say, in the embodiment of the present disclosure, it needs to sum the first receive timing error and the second transport timing error to obtain an overall timing error on one side of the UE or TRP (also referred as receiving-transmitting time difference Rx Tx TE), and divide receiving-transmitting time differences obtained by the summation reception to obtain a first receiving-transmitting timing error group. The first receiving-transmitting timing error group information includes feature information of at least one first receiving-transmitting timing error group. The specific information of the feature information is the same as the above other timing error group information, and includes an error group identifier, an error group actual range and an error group range relative difference. The actual range may be an interval defined by a maximum receiving-transmitting timing error and a minimum receiving-transmitting timing error in the receiving-transmitting timing error group information. The range relative difference is a difference between actual ranges of two receiving-transmitting timing error groups.

After obtaining the first receiving-transmitting timing error group, it is further necessary to obtain corresponding relationship information which determines the first receiving-transmitting time difference, and transmit the corresponding relationship information to the location management function module, so that the location management function module performs positioning.

It is to be understood that the corresponding relationship information includes the first receiving-transmitting time difference and feature information of the first receiving-transmitting timing error group that has a corresponding relationship with the first receiving-transmitting time difference. The first receiving-transmitting timing error group includes a summation result of the first receive timing error of the first reference signal and the second transport timing error of the second reference signal, which are corresponding to the first receiving-transmitting time difference, respectively.

For the transmitting end of the first reference signal, when performing multi RTT positioning, in addition to the above determining the first transport timing error group information, the positioning method on this side further includes:
  receiving the second reference signal from the receiving end of the first reference signal, and determining a second receive timing error and a receiving moment of the second reference signal.

In the embodiment of the present disclosure, in addition to transmitting the first reference signal by the transmitting end of the first reference signal itself, the transmitting end of the first reference signal further needs to receive the second reference signal from the receiving end of the first reference signal, thereby obtaining the second receive timing error and the receiving moment of the second reference signal, thereby laying a foundation for subsequent establishment of corresponding relationship information of the receiving-transmitting time difference.

The second receive timing errors are divided into groups according to the second timing error group configuration parameter, thereby obtaining the second receive timing error group information.

In the embodiment of the present disclosure, after obtaining the second receive timing errors, it is further necessary to divide the second receive timing errors into groups. The specific division steps have been explained in the above embodiments, and will not be described in detail in the embodiment of the present disclosure. After grouping, the second receive timing error can be obtained. The second receive timing error group information includes feature information of at least one second receive timing error group. In the embodiment of the present disclosure, the feature information of the second receive timing error group may be at least one of an error group identifier, an actual range and an actual range relative difference.

A second receiving-transmitting time difference is obtained according to the receiving moment of the second reference signal and the transmitting moment of the first reference signal.

Correspondence information of the second receiving-transmitting time difference is determined, and the correspondence information is transmitted to the location management function module, so that the location management function module performs positioning.

In the embodiment of the present disclosure, after determining the second receiving-transmitting time difference, the correspondence information of the second receiving-transmitting time difference can be further obtained. The correspondence information includes corresponding relationship between the second receiving-transmitting time difference, feature information of the second receive timing error group and feature information of the first transport timing error group. A second receive timing error corresponding to the second receiving-transmitting time difference is located in a division range of the second receive timing error group having the corresponding relationship with the second receiving-transmitting time difference. The first transport timing error corresponding to first reference information of the second receiving-transmitting time difference is located in a division range of the first transport timing error group having the corresponding relationship with the second receiving-transmitting time difference.

Similar to the receiving end of the first reference information, the transmitting end of the first reference information may also receive a second reference signal from the receiving end of the first reference signal to obtain a second positioning measurement value. The second positioning measurement value includes a receiving moment of the second reference signal. The receiving end of the first reference signal determines a second receiving timing error of the second reference signal.

The dividing the first transport timing errors into groups according to the second timing error group configuration parameter, includes: summing the second receive time error and the first transport timing error, and dividing summation results into groups according to the second timing error group configuration parameter, thereby obtaining second receiving-transmitting timing error group information.

The positioning method further includes:
  obtaining a second receiving-transmitting time difference according to the receiving moment of the second reference signal and the transmitting moment of the first reference signal, determining correspondence information of the second receiving-transmitting time difference, and transmitting the correspondence information to the location management function module, so that the location management function module performs positioning;
  where the receiving-transmitting timing error group information includes feature information of at least one receiving-transmitting timing error group. The correspondence information includes the second receiving-transmitting time difference and feature information of the second receiving-transmitting timing error group that has a corresponding relationship with the second receiving-transmitting time difference. The second receiving-transmitting timing error group includes a summation result of the second receive timing error of the second reference information and the first transport timing error of the first reference signal, which are corresponding to the second receiving-transmitting time difference, respectively.

Referring to FIG. 9, it is a schematic flowchart of performing multi RTT positioning at the LMF side. As shown in FIG. 9, the method includes the following steps.

S301: receiving correspondence information of a first receiving-transmitting time difference from a receiving end of a first reference signal and correspondence information of a second receiving-transmitting time difference from a receiving end of a second reference signal.

It is to be understood that a transmitting end of the second reference signal is the receiving end of the first reference signal; and the first receiving-transmitting time difference is obtained by the receiving end of the first reference signal according to a receiving moment of the first reference signal and a transmitting moment of the second reference signal. The receiving end of the second reference signal is a transmitting end of first reference signal. The second receiving-transmitting time difference is obtained by the receiving end of the second reference signal according to a receiving moment of the second reference signal and a transmitting moment of the first reference signal.

S302: determining at least two target receiving-transmitting time difference pairs according to the correspondence information of the first receiving-transmitting time difference and the correspondence information of the second receiving-transmitting time difference; where the target receiving-transmitting time difference pair includes a first receiving-transmitting time difference and a second receiving-transmitting time difference.

After obtaining the correspondence information of the first receiving-transmitting time difference and the correspondence information of the second receiving-transmitting time difference, the target receiving-transmitting time difference pair required to calculate a round-trip delay of the UE and the TRP can be obtained. Apparently, the target receiving-transmitting time difference pair includes one first receiving-transmitting time difference and one second receiving-transmitting time difference, and a difference between the first receiving-transmitting time difference and the second receiving-transmitting time difference is a target receiving-transmitting time difference (or a negative value of the target receiving-transmitting time difference).

S303: determining a corresponding round-trip delay according to the target receiving-transmitting time difference, and performing positioning based on the round-trip delay.

As can be seen from the above embodiments, there are two types of correspondence information of the receiving-transmitting time differences in the embodiment of the present disclosure. One is corresponding relationship among the receiving-transmitting time difference, the receive timing error group and the transport timing error group. The other is corresponding relationship between the receiving-transmitting time difference and receiving-transmitting time difference group. For these two solutions, the LMF in the embodiment of the present disclosure has two different ways to determine the target receiving-transmitting time difference.

As an optional embodiment, the correspondence information of the first receiving-transmitting time difference includes corresponding relationship among the first receiving-transmitting time difference, feature information of the first receive timing error group, and feature information of the second transport timing error group.

A first receive timing error corresponding to the first receiving-transmitting time difference is located in a division range of the first receive timing error group having the corresponding relationship with the first receiving-transmitting time difference. The second transport timing error corresponding to the first receiving-transmitting time difference is located in a division range of the second transport timing error group having the corresponding relationship with the first receiving-transmitting time difference.

The correspondence information of the second receiving-transmitting time difference includes corresponding relationship among the second receiving-transmitting time difference, feature information of the second receive timing error group, and feature information of the first transport timing error group.

A second receive timing error corresponding to the second receiving-transmitting time difference is located in a division range of the second receive timing error group having the corresponding relationship with the second receiving-transmitting time difference. The first transport timing error corresponding to the second receiving-transmitting time difference is located in a division range of the first transport timing error group having the corresponding relationship with the second receiving-transmitting time difference.

In view of the above situation, any two target receiving-transmitting time differences determined by the LMF, satisfy:

for a first receiving-transmitting time difference in any two target receiving-transmitting time difference pairs: similarity of feature information of the first receive timing error groups that have corresponding relationship with first receive timing errors which are corresponding to two first receiving-transmitting time differences respectively, is greater than a first preset threshold; similarity of feature information of the second transport timing error groups that have corresponding relationship with second transport timing errors which are corresponding to two first receiving-transmitting time differences respectively, is greater than a second preset threshold;

for a second receiving-transmitting time difference in any two target receiving-transmitting time difference pairs: similarity of feature information of the second receive timing error groups that have corresponding relationship with second receive timing errors which are corresponding to two second receiving-transmitting time differences respectively, is greater than a third preset threshold; similarity of feature information of the first transport timing error groups that have corresponding relationship with first transport timing errors which are corresponding to two second receiving-transmitting time differences respectively, is greater than a fourth preset threshold.

The embodiment of the present disclosure does not further limit the relationship between the first to fourth preset thresholds and their specific numerical values.

As an optional embodiment, the correspondence information of the first receiving-transmitting time difference includes corresponding relationship between the first receiving-transmitting time difference and a first receiving-transmitting timing error group. The first receiving-transmitting timing error group includes a summation result of the first receive timing error of the first reference signal and the second transport timing error of the second reference signal, which are corresponding to the first receiving-transmitting time difference, respectively.

The correspondence information of the second receiving-transmitting time difference includes corresponding relationship between the second receiving-transmitting time difference and a second receiving-transmitting timing error group. The second receiving-transmitting timing error group includes a summation result of the second receive timing error of the second reference signal and the first transport timing error of the first reference signal, which are corresponding to the second receiving-transmitting time difference, respectively.

In view of the above situation, any two target receiving-transmitting time differences determined by the LMF, satisfy:

If it is determined that two receiving-transmitting time difference pairs which are corresponding to different base stations, respectively, have corresponding relationship with feature information of the same receiving-transmitting timing error group, then the two receiving-transmitting time difference pairs which are corresponding to different base stations, are taken as two target receiving-transmitting time difference pairs.

Figure 10:
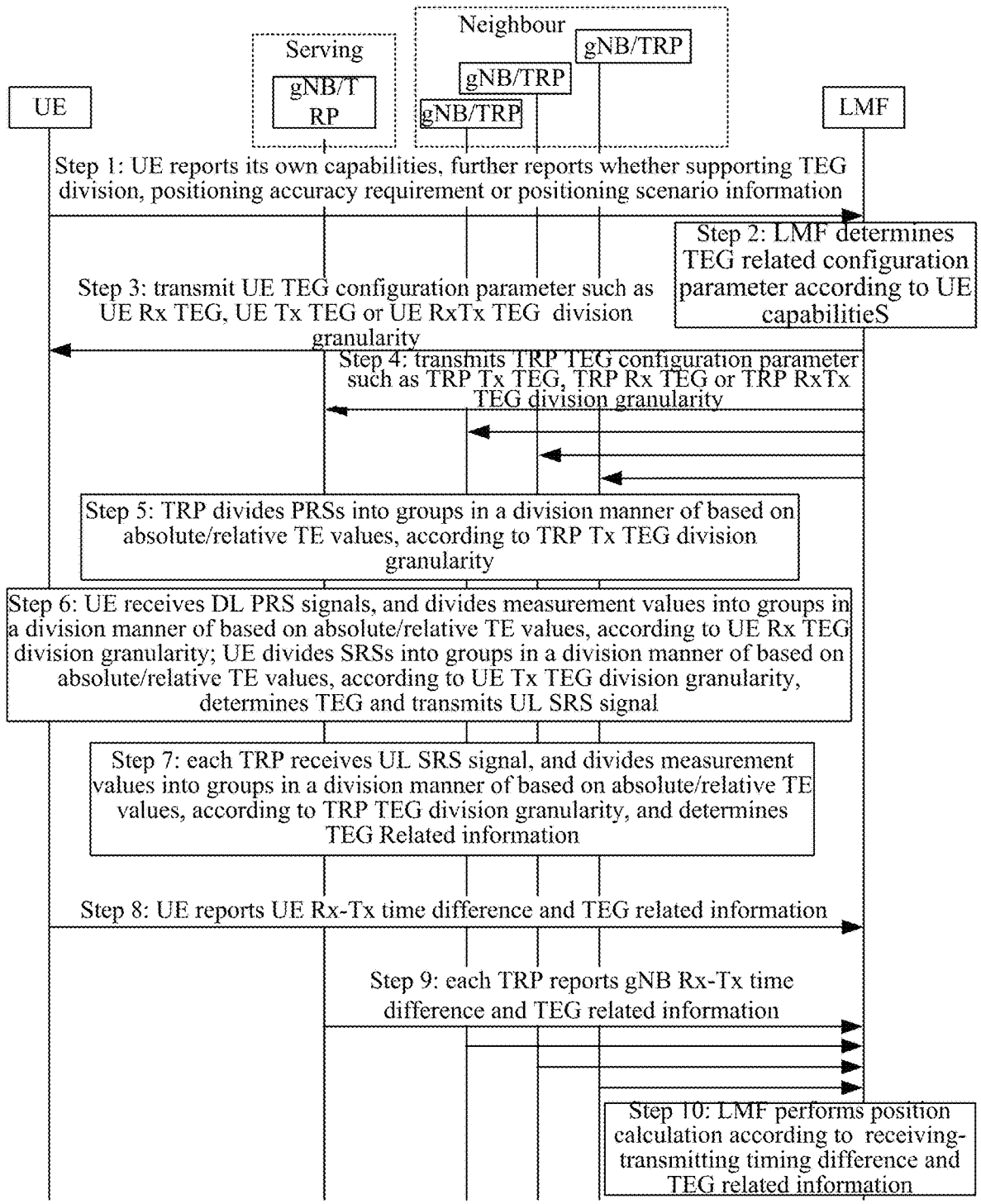
FIG. 10 is a schematic diagram exemplarily showing interaction between UE, TRP and LMF in multi RTT positioning according to an embodiment of the present disclosure.

Referring to FIG. 10, it is a schematic diagram exemplarily showing interaction between UE, TRP and LMF in multi RTT positioning according to an embodiment of the present disclosure. As shown in FIG. 10, the interaction process includes the following steps.

At UE Side 1. (Step 1): in case that the UE reports its own capabilities through the LPP protocol, in addition to reporting that multi RTT positioning is supported, it is also necessary to report whether the UE supports TEG division and positioning accuracy requirement/positioning scenario types. The positioning accuracy requirement is related to positioning scenarios. For example, in the 3GPP R17 standard, for an IIOT factory scenario, the positioning accuracy requirement is at a sub-meter level; for an ordinary business scenario, the positioning accuracy requirement is at a meter level.

2. (Step 6): this step includes the following sub-steps:

2.1: the UE receives a DL PRS signal, and divides different measurement values into groups according to TEG configuration parameter provided by the LMF, such as UE Rx TEG division granularity.

There are a variety of manners to divide ranges of UE Rx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$ and $[a_{k+2}, a_{k+3}]$, absolute Rx TE values corresponding to different measurement values are compared with each interval, respectively, and an interval with the highest degree of overlap is selected as a representative numerical value interval of one measurement value. TEs of measurement values with the same representative numerical value interval are classified into the same TEG group, and TEs of measurement values with different representative numerical value intervals are divided into different TEG groups. The intervals may be defined or configured in different ways, for example, it may be defined through tables or mathematical formulas in standard specifications, such as $a_k = a_{offset} + k \times \Delta$, $(k \in Z)$, where $a_{offset}$, $\Delta$ are configurable values, which for example, may be calculated by the LMF or TRP via finding tables or mathematical formulas in standard specifications (for example, $\Delta$ is determined according to a TEG granularity).

Manner 2: based on relative TE values.

If a difference between Rx TE values of two measurement values is within the range $\Delta$, the two measurement values can be divided into the same Rx TEG, that is, TEG IDs of the two measurement values are the same, or there is a TEG which includes TEs of the two measurement values. For example, if a measurement value A and a measurement value B are associated with Rx TEG i, then $|Rx\ TE_A - Rx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a TEG granularity).

2.2: the UE divides SRSs into groups according to a TEG configuration parameter such as UE Tx TEG division granularity provided by the LMF.

There are a variety of manners to divide ranges of UE Tx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$, $[a_{k+2}, a_{k+3}]$, absolute Tx TE values corresponding to different SRSs are compared with each interval, respectively, and an interval with the highest degree of overlap is selected as a representative numerical value interval of one SRS. TEs of measurement values with the same representative numerical value interval are classified into the same TEG group, and TEs of measurement values with different representative numerical value intervals are divided into different TEG groups. The intervals may be defined or configured in different ways, for example, it may be defined through tables or mathematical formulas in standard specifications, such as $a_k = a_{offset} + k \times \Delta$, $(k \in Z)$, where $a_{offset}$, $\Delta$ are configurable values, which for example, may be calculated by the LMF or TRP via finding tables or mathematical formulas in standard specifications (for example, $\Delta$ is determined according to a TEG granularity).

Manner 2: based on relative TE values.

If a difference between Tx TE values of two SRSs is within the range $\Delta$, the two SRSs can be divided into the same Tx TEG, that is, TEG IDs of the two SRSs are the same, or there is a TEG which includes TEs of the two SRSs. For example, if a resource A and a resource B are associated with Rx TEG i, then $|Tx\ TE_A - Tx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a TEG granularity).

2.3: UE RxTx TEG can also be defined according to UE Rx TEG and UE Tx TEG, that is, grouping according to a sum of Tx TE and Rx TE, which may be obtained by summing results of sub-steps 2.1 and 2.2, or by directly grouping RxTx TEGs while omitting the sub-steps 2.1 and 2.2.

3. (Step 8): the measurement values and TEG related information are reported. By introducing TEG, the embodiments of the present disclosure provide the following UE measurement value reporting manners:

Reporting Manner: Rx-Tx Time Difference

The UE randomly combines different measurement values and the receiving moment and transmitting moment corresponding to the SRS to form UE Rx-Tx time difference measurement value. When reporting, in addition to reporting the Rx-Tx time difference measurement value, TEG related information also needs to be reported to the LMF. The related information includes:

1) TEG identifier

UE Tx TEG ID, UE Rx TEG ID or,

UE RxTx TEG ID;

That is, the embodiment of the present disclosure provides two solutions for reporting identifiers, one is to simultaneously report a unique identifier of the transport timing error group and a unique identifier of the receive timing error group, and the other is to report only the unique identifier of the receiving-transmitting timing error group.

2) TE value in TEG or TEG value range (i.e., actual range)

UE Tx TEG ID Gap, UE Rx TEG ID Gap or,

UE RxTx TEG ID Gap.

That is, the embodiment of the present disclosure provides two solutions for reporting TE values or TEG value ranges. One is to simultaneously report error values or value ranges of the transport timing error groups and receive timing error groups. The other is to report only error values or value ranges of the receiving-transmitting timing error groups.

3) a difference between TE values or TEG value ranges

UE Tx TEG m n Gap Diff,

UE Rx TEG m n Gap Diff or,

UE RxTx TEG m n Gap Diff (where m and n belong to different TEG identifiers of UE or TRP).

That is, the embodiment of the present disclosure provides two solutions for reporting a difference between TE values or TEG value ranges. One is to simultaneously report TE values or TEG value ranges of the transport timing error groups and receive timing error groups. The other is to report only TE values or TEG value ranges of the receiving-transmitting timing error groups.

At TRP Side 1. (Step 5) the TRP divides different PRSs into groups according to the TEG configuration parameter provided by the LMF, such as TRP Tx TEG division granularity.

There are a variety of manners to divide ranges of TRP Tx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$, $[a_{k+2}, a_{k+3}]$; absolute Rx TE values corresponding to different PRSs are compared with each interval, respectively, and an interval with the highest degree of overlap is selected as a representative numerical value interval of one PRS. TEs of resources with the same representative numerical value interval are classified into the same TEG group, and TEs of resources with different representative numerical value intervals are divided into different TEG groups. The intervals may be defined or configured in different ways, for example, it may be defined through tables or mathematical formulas in standard specifications, such as $a_k = a_{offsset} + k \times \Delta$, ($k \in Z$), where $a_{offsset}$, $\Delta$ are configurable values, which for example, may be calculated by the LMF or TRP via finding tables or mathematical formulas in standard specifications (for example, $\Delta$ is determined according to a grouping granularity).

Manner 2: based on relative TE values.

If a difference between Rx TE values of two resources is within the range $\Delta$, the two resources can be divided into the same Tx TEG, that is, TEG IDs of the two resources are the same, or there is a TEG which includes TEs of the two resources. For example, if a resource A and a resource B are associated with Tx TEG i, then $|Tx\ TE_A - Tx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a grouping granularity).

2. (Step 7): this step includes the following two steps.
   2.1: the TRP receives a UL SRS signal, and divides different measurement values into groups according to a TEG configuration parameter such as TRP Rx TEG division granularity provided by the LMF.

There are a variety of manners to divide ranges of TRP Rx TEG. The following manners 1 and 2 may be used alone or in combination.

Manner 1: based on absolute TE values.

It is assumed that there are multiple intervals including $[a_{k-1}, a_k]$, $[a_k, a_{k+1}]$, $[a_{k+1}, a_{k+2}]$, $[a_{k+2}, a_{k+3}]$; absolute Rx TE values corresponding to different measurement values are compared with each interval, respectively, and an interval with the highest degree of overlap is selected as a representative numerical value interval of one measurement value. TEs of measurement values with the same representative numerical value interval are classified into the same TEG group, and TEs of measurement values with different representative numerical value intervals are divided into different TEG groups. The intervals may be defined or configured in different ways, for example, it may be defined through tables or mathematical formulas in standard specifications, such as $a_k = a_{offsset} + k \times \Delta$, ($k \in Z$), where $a_{offsset}$, $\Delta$ are configurable values, which for example, may be calculated by the LMF or TRP via finding tables or mathematical formulas in standard specifications (for example, $\Delta$ is determined according to a TEG granularity).

Manner 2: based on relative TE values.

If a difference between Rx TE values of two measurement values is within the range $\Delta$, the two measurement values can be divided into the same Rx TEG, that is, TEG IDs of the two measurement values are the same, or there is a TEG which includes TEs of the two measurement values. For example, if a measurement value A and a measurement value B are associated with Rx TEG i, then $|Rx\ TE_A - Rx\ TE_B| < \Delta$ is required, where $\Delta$ is a configurable value, which may be defined or configured in different ways, for example, it may be calculated by the LMF or TRP via finding tables or mathematical formulas in standard specifications (for example, $\Delta$ is determined according to a TEG grouping granularity).

2.2: TRP RxTx TEG can also be defined according to TRP Rx TEG and TRP Tx TEG, that is, grouping according to a sum of TRP Rx TEG and TRP Tx TEG, which may be obtained by summing results of steps 5 and 2.1, or by directly grouping RxTx TEGs while omitting the steps 5 and 2.1.

3. (Step 9): the measurement values and TEG related information are reported. By introducing TEG, the embodiments of the present disclosure provide the following TRP measurement value reporting manners:

Reporting Manner: Rx-Tx Time Difference

The TRP randomly combines different PRSs and the receiving moment and transmitting moment corresponding to measurement values to form TRP Rx-Tx time difference measurement value. When reporting, in addition to reporting the Rx-Tx time difference measurement value, TEG related information also needs to be reported to the LMF. The related information includes:
   1) TEG identifier
   TRP i Tx TEG ID, TRP i Rx TEG ID
   or,
   TRP i RxTx TEG ID;
   2) TE value or value range in TEG
   TRP i Tx TEG ID Gap, TRP i Rx TEG ID Gap
   or,
   TRP i RxTx TEG ID Gap.
   3) a difference between TE values or TEG value ranges
   TRP i Tx TEG m n Gap Diff,
   TRP i Rx TEG m n Gap Diff
   or,
   TRP i RxTx TEG m n Gap Diff (where m and n belong to different TEG identifiers of UE or TRP).

At LMF Side 1. (Step 2): the LMF determines a relevant configuration parameter for dividing TEG, including TEG division granularity by looking up tables or mathematical definition formulas according to UE capabilities (including whether TEG division is supported, and positioning accuracy requirement).

2. (Step 3): the LMF transmits the UE TEG configuration parameter such as TEG division granularity, to the UE.

3. (Step 4): the LMF transmits the TRP TEG configuration parameter such as TEG division granularity, to each TRP.

4. (Step 10): the LMF receives Rx-Tx time difference measurement value, performs RTT and single-difference operations based on the TEG and TE time range, and selects an appropriate single-difference measurement value for position calculation.

Next, the multi RTT positioning of the embodiments of the present disclosure is described hereinafter with reference to specific examples.

At UE Side 1. (Corresponding to step 1 in FIG. 10) the UE reports information such as supporting for DL TDOA positioning, supporting for TEG division, and a positioning accuracy requirement of 0.2 m, through the LPP protocol.

2. (Corresponding to step 6 in FIG. 10)
   2.1: the UE receives DL PRS signals from 4 TRPs, and divides different measurement values into groups in a division manner of based on absolute TE values, according to TEG division granularity provided by the LMF, such as UE Tx\Rx TEG Granularity=0.13 ns.

The UE obtains 10 receiving moments, whose TE ranges are corresponding to Rx1 TE, Rx2 TE . . . Rx10 TE, respectively. According to the formula $a_k=a_{offsset}+k\times\Delta$, (k∈Z), where $a_{offsset}$=0.1, Δ=TRP Tx TEG Granularity=0.13, the UE generates multiple intervals including [0.1−0.13*2, 0.1−0.13*1], [0.1−0.13*1, 0.1], [0.1, 0.1+0.13*1], [0.1+0.13*1, 0.1+0.13*2]. That is, the UE compares an absolute Rx TE value of each of these 10 TOA measurement values with each interval, and selects the interval with the highest degree of overlap as a TEG group of the TOA measurement value. Finally, three Rx TEGs are obtained, namely Rx TEG 1, Rx TEG 2, and Rx TEG 3, and the TE timing range of each Rx TEG is recorded as Rx TEG 1 Gap=[c1, c1'], Rx TEG 2 Gap=[c2, c2'], Rx TEG 3 Gap=[c3,c3'], where TEs of TOA3, 4, 7, and 10 are in Rx TEG1, TEs of TOA1, 5, 8, and 9 are in Rx TEG2, and TEs of TOA2 and 6 are in Rx TEG3.

2.2: the UE divides SRSs into groups in a division manner of based on absolute TE values, according to TEG division granularity provided by the LMF, such as UE Tx\Rx TEG Granularity=0.13 ns.

The UE obtains 4 SRSs, whose TE ranges are corresponding to Tx1 TE, Tx2 TE, Tx3 TE, Tx4 TE. The UE obtains differences of TEs of these 4 SRSs, compares the differences with Δ=UE Tx TEG Granularity=0.11 ns, and classifies the TEs of measurement values whose difference is smaller than this value into one TEG group, that is, if |Tx2 TE−Tx1 TE|<0.11 ns, then Tx TEG IDs of Tx1 TE and Tx2 TE are the same. Finally, three Tx TEGs are obtained, namely Tx TEG 1, Tx TEG 2, and Tx TEG 3, and a TE timing range of each Tx TEG is recorded as Tx TEG 1 Gap=[c1, c1'], Tx TEG 2 Gap=[c2, c2'], Tx TEG 3 Gap=[c3, c3'].

2.3: the time ranges of UE Rx TEG and UE Tx TEG groups are added.

3. (Corresponding to step 8 in FIG. 10) the UE randomly combines different measurement values and the receiving moment and transmitting moment corresponding to the SRS to form UE Rx-Tx time difference measurement value. When reporting, in addition to reporting the Rx-Tx time difference measurement value, TEG related information also needs to be reported to the LMF. The related information includes:

1) TEG identifier
UE Tx TEG ID, UE Rx TEG ID
2) TEG' TE value or value range
UE Tx TEG ID Gap, UE Rx TEG ID Gap At TRP Side 1. (Corresponding to step 5 in FIG. 10) the TRP divides different PRSs into groups in a division manner of based on absolute TE values, according to TEG division granularity provided by the LMF, such as TRP Tx\Rx TEG Granularity=0.065 ns.

It is assumed that the TRP1 has a total of 4 PRSs, whose TE ranges are corresponding to TRP1 RES1 TE, TRP1 RES2 TE, TRP1 RES3 TE, TRP1 RES4 TE.

According to the formula $a_k=a_{offsset}+k\times\Delta$, (k∈Z), $a_{offsset}$=0.1, Δ=TRP Tx TEG Granularity=0.065, the TRP1 generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the TRP1 compares an absolute Rx TE value of each of these 4 PRSs with each interval, and selects the interval with the highest degree of overlap as a TEG group of the PRS. Finally, three TRP1 Tx TEGs are obtained, namely TRP1 Tx TEG 1, TRP1 Tx TEG 2, TRP1 Tx TEG 3, and the timing range of each Tx TEG is recorded as TRP1 Tx TEG 1 Gap=[b1,b1'], TRP1 Tx TEG 2 Gap=[b2,b2'], TRP1 Tx TEG 3 Gap=[b3,b3'].

It is assumed that the TRP2 has a total of 5 PRSs, whose TE ranges are corresponding to TRP2 RES1 TE, RP2 RES2 TE, TRP2 RES3 TE, TRP2 RES4 TE, TRP2 RES5 TE. According to the formula $a_k=a_{offsset}+k\times\Delta$, (k∈Z), where $a_{offsset}$=0.1, Δ=TRP Tx TEG Granularity=0.065, the TRP2 generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the TRP2 compares an absolute Rx TE value of each of these 5 PRSs with each interval, and selects the interval with the highest degree of overlap as a TEG group of the PRS. Finally, three TRP2 Tx TEGs are obtained, namely TRP2 Tx TEG 1, TRP2 Tx TEG 2, TRP2 Tx TEG 3, and the timing range of each Tx TEG is recorded as TRP2 Tx TEG 1 Gap=[b1,b1'], TRP2 Tx TEG 2 Gap=[b2,b2'], TRP2 Tx TEG 3 Gap=[b3,b3'].

2. (Corresponding to step 7 in FIG. 10) this step includes the following two sub-steps.

2.1: the TRP receives a UL SRS signal, and divides TEs of different receiving moments into groups in a division manner of based on absolute TE values, according to TEG division granularity provided by the LMF, such as TRP Tx\Rx TEG Granularity=0.065 ns.

It is assumed that the TRP1 has a total of 4 receiving moments, whose TE ranges are corresponding to TRP1 Rx1 TE, TRP1 Rx2 TE, TRP1 Rx3 TE, TRP1 Rx4 TE. According to the formula $a_k=a_{offsset}+k\times\Delta$, (k∈Z), where $a_{offsset}$=0.05, Δ=TRP Rx TEG Granularity=0.065, the TRP1 generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the TRP1 compares an absolute Rx TE value of each of these 4 receiving moments with each interval, and selects the interval with the highest degree of overlap as a TEG group of the receiving moments. Finally, three TRP1 Rx TEGs are obtained, namely TRP1 Rx TEG 1, TRP1 Rx TEG 2, TRP1 Rx TEG 3, and the timing range of each Tx TEG is recorded as TRP1 Rx TEG 1 Gap=[b1, b1'], TRP1 Rx TEG 2 Gap=[b2,b2'], TRP1 Rx TEG 3 Gap=[b3,b3'].

It is assumed that the TRP2 has a total of 5 receiving moments, whose TE ranges are corresponding to TRP2 Rx1 TE, TRP2 Rx2 TE, TRP2 Rx3 TE, TRP2 Rx4 TE, TRP2 Rx5 TE. According to the formula $a_k=a_{offsset}+k\times\Delta$, (k∈Z), where $a_{offsset}$=0.05, Δ=TRP Rx TEG Granularity=0.065, the TRP2 generates multiple intervals including [0.05−0.065*2, 0.05−0.065*1], [0.05−0.065*1, 0.05], [0.05, 0.05+0.065*1], [0.05+0.065*1, 0.05+0.065*2]. That is, the TRP2 compares an absolute Rx TE value of each of these 5 receiving moments with each interval, and selects the interval with the highest degree of overlap as a TEG group of the receiving moments. Finally, three TRP2 Rx TEGs are obtained, namely TRP2 Rx TEG 1, TRP2 Rx TEG 2, TRP2 Rx TEG 3, and the timing range of each Tx TEG is recorded as TRP2 Rx TEG 1 Gap=[b1,b1'], TRP2 Rx TEG 2 Gap=[b2,b2'], TRP2 Rx TEG 3 Gap=[b3,b3'].

2.2: the time ranges of TRP Rx TEG and TRP Tx TEG groups are added.

3. (Corresponding to step 9 in FIG. 10) the TRP randomly combines different PRS and the receiving moment and transmitting moment corresponding to the measurement values to form TRP Rx-Tx time difference measurement value. When reporting, in addition to reporting the Rx-Tx time difference measurement value, TEG related information also needs to be reported to the LMF. The related information includes:

1) TEG identifier
TRP i Tx TEG ID, TRP i Rx TEG ID
2) TEG' TE value or value range
TRP i Tx TEG ID Gap, TRP i Rx TEG ID Gap
At LMF Side 1. (Corresponding to step 2 in FIG. 10) the LMF determines Tx\Rx TEG configuration parameters of the UE and TRP based on information reported by the UE that the UE supports TEG division and a positioning accuracy requirement is 0.2 m, according to a predefined mathematical formula granularity=10*accuracy/3/K, where K is 5, thereby obtaining TEG division granularity TRP Tx\Rx TEG Granularity=0.065 ns and UE Tx\Rx TEG Granularity=0.13 ns.

2. (Corresponding to step 3 in FIG. 10) the LMF informs the UE through the NRPPa protocol, of TEG configuration parameter, i.e., TEG division granularity UE Tx\Rx TEG Granularity-0.13 ns.

3. (Corresponding to step 4 in FIG. 10) the LMF informs 4 TRPs through the NRPPa protocol, of TEG configuration parameter, i.e., TEG division granularity TRP Tx\Rx TEG Granularity=0.065 ns.

4. (Corresponding to step 10 in FIG. 10) the LMF receives the Rx-Tx time difference measurement value, performs RTT and single-difference operations based on a sum of Rx\Tx TEG ID and Rx\Tx TEG GAP of the UE and TRP, and selects an appropriate single-difference measurement value for position calculation.

In the embodiment of the present disclosure, the LMF determines the TEG configuration parameter based on the positioning capability information reported by the UE (including additionally reported information such as whether TEG division is supported and positioning requirement accuracy/positioning scenario type), and notifies the UE and TRP to use TE absolute value or relative value to divide different resources or measurement values into TEG, thereby providing various measurement value reporting forms. For various positioning technologies, the specific manners of TEG division, the definition and transmission of TEG related information, and how to perform positioning based on TEG related information are given. Positioning services with different accuracy is provided according to positioning requirements and positioning device' capabilities, which enhances flexibility of positioning services and pertinence of specific scenarios, effectively reduces receiving-transmitting timing errors, thereby improving positioning accuracy. The embodiments of the present disclosure provide a specific solution for TEG division for the first time.

Figure 11:
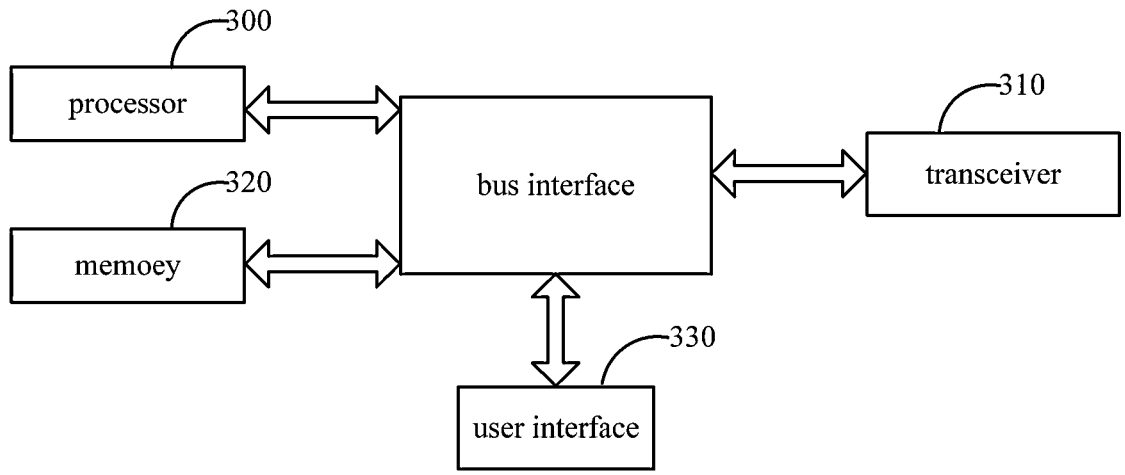
FIG. 11 is a schematic diagram of an apparatus according to an embodiment of the present disclosure.

FIG. 11 is a schematic diagram of an apparatus according to an embodiment of the present disclosure. As shown in FIG. 11, the apparatus includes: a memory 320, a transceiver 310, a processor 300, and a user interface 330.

The memory 320 is used to store a computer program. The transceiver 310 is used to transmit and receive data under the control of the processor 300. The processor 300 is used to read the computer program in the memory and perform the following operations:

obtaining a first timing error group configuration parameter;

receiving a first reference signal to obtain first positioning measurement values, and determining first receiving timing errors of the first positioning measurement values;

dividing the first receive timing errors into groups according to the first timing error group configuration parameter to obtain at least one first receive timing error group for positioning the terminal;

The first reference signal includes one of a positioning reference signal and a sounding reference signal. The first positioning measurement value is used to represent a distance between the transmitting end and the receiving end of the first reference signal.

In a possible implementation, obtaining a first timing error group configuration parameter, includes:

receiving the first timing error group configuration parameter which is determined by a location management function module according to positioning requirement.

The positioning requirement includes at least one of a positioning accuracy of the UE, a positioning scenario, and capability information for indicating that the UE supports dividing timing errors into groups. The UE is a transmitting end or receiving end of the first reference signal.

In a possible implementation, the first timing error group configuration parameter includes a first grouping granularity.

The dividing the first receive timing errors into groups according to the first timing error group configuration parameter to obtain at least one first receive timing error group, includes:

determining division ranges of first receive timing error groups according to the first grouping granularity;

dividing the first receive timing errors into groups according to the division ranges, to obtain at least one first receive timing error group.

In a possible implementation, any one first receive timing error in the first receive timing error group is located in a division range of the first receive timing error group; or, a difference between any one first receive timing error in the first receive timing error group and at least one other first receive timing error in the first receive timing error group except for the any one first receive timing error, is located in a division range of the first receive timing error group.

In a possible implementation, the apparatus is further configured to perform the following operations:

generating first receive timing error group information, where the first receive timing error group information includes feature information of at least one first receive timing error group.

The feature information includes at least one of an error group identifier, an actual range, and an actual range relative difference.

In a possible implementation, the apparatus is further configured to perform the following operations:

determining correspondence information of the first positioning measurement values according to the first receive timing error group information;

where the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

In a possible implementation, the apparatus is further configured to perform the following operations:

receiving first transport timing error group information determined by the transmitting end;

determining correspondence information of each first positioning measurement value, according to the first transport timing error group information and the first receive timing error group information.

The first transport timing error group information includes feature information of at least one first transport timing error group.

The correspondence information includes a first positioning measurement value, feature information of a first receive timing error group having a corresponding relationship with the first positioning measurement value and feature information of the first transport timing error group having a corresponding relationship with the first positioning measurement value. The first receive timing error of the first positioning measurement value is located in the actual range of the first receive timing error group having the corresponding relationship with the first positioning measurement value. The first transport timing error of the first positioning measurement value is located in the actual range of the first transport timing error group having the corresponding relationship with the first positioning measurement value.

In a possible implementation, the apparatus is further configured to perform the following operations:
- transmitting the correspondence information to the location management function module, so that the location management function module performs positioning according to the correspondence information; or,
- when the first reference signal is a positioning reference signal, performing, by the receiving end, positioning according to the correspondence information.

In a possible implementation, the apparatus is further configured to perform the following operations:
- when the first reference signal is a positioning reference signal, determining at least one pair of first positioning measurement values which are corresponding to different transmitting ends, respectively, as a target first positioning measurement value pair, and obtaining a reference signal timing difference of the target first positioning measurement value pair;
- obtaining correspondence information of each first positioning measurement value in the target first positioning measurement value pair, as target correspondence information;
- where the different transmitting ends include a reference base station and a non-reference base station.

In a possible implementation, determining at least one pair of first positioning measurement values which are corresponding to different transmitting ends, respectively, as a target first positioning measurement value pair, includes:
- if it is determined that there is a correspondence between the feature information of the same first receive timing error group and two first positioning measurement values corresponding to different transmitting ends respectively, obtaining the target first positioning measurement value pair according to the two first positioning measurement values corresponding to different transmitting ends respectively.

In a possible implementation, the apparatus is further configured to perform the following operations:
- receiving first transport timing error group information determined by the transmitting end;
- determining correspondence information of each first positioning measurement value, according to the first receive timing error group information and the first transport timing error group information.

The first transport timing error group information includes feature information of at least one first transport timing error group.

The correspondence information includes a first positioning measurement value, feature information of a first receive timing error group having a corresponding relationship with the first positioning measurement value and feature information of the first transport timing error group having a corresponding relationship with the first positioning measurement value. The first receive timing error of the first positioning measurement value is located in the actual range of the first receive timing error group having the corresponding relationship with the first positioning measurement value. The first transport timing error of the first positioning measurement value is located in the actual range of the first transport timing error group having the corresponding relationship with the first positioning measurement value.

In a possible implementation, obtaining the target first positioning measurement value pair according to the two first positioning measurement values corresponding to different transmitting ends respectively, includes:
- determining similarity between feature information of a first transport timing error group corresponding to a first positioning measurement value of a reference base station and feature information of a first transport timing error group corresponding to a first positioning measurement value of a non-reference base station;
- taking at least one pair of first positioning measurement values with the greatest similarity corresponding to different transmitting ends respectively, as the target first positioning measurement value pair.

In a possible implementation, the apparatus is further configured to perform the following operations:
- transmitting a reference signal timing difference of the target first positioning measurement value pair and the target correspondence information to the location management function module, thereby enabling the location management function module to perform positioning, or,
- performing positioning according to the reference signal timing difference of the target first positioning measurement value pair and the target correspondence information.

In a possible implementation, the apparatus is further configured to perform the following operations:
- determining second transport timing errors of a second reference signal, and dividing the second transport timing errors into groups according to the first timing error group configuration parameter to obtain second transport timing error group information;
- transmitting the second reference signal to the transmitting end of the first reference signal, and determining a transmitting moment of the second reference signal;
- obtaining a first receiving-transmitting time difference according to a receiving moment of the first reference signal and a transmitting moment of the second reference signal; where the first positioning measurement value includes the receiving moment of the first reference signal;
- determining corresponding relationship information of the first receiving-transmitting time difference, and transmitting the corresponding relationship information to a location management function module so that the location management function module performs positioning.

When the first reference signal is a positioning reference signal, the second reference signal is a sounding reference signal. When the first reference signal is a sounding reference signal, the second reference signal is a positioning reference signal.

The second transport timing error group information includes feature information of at least one second transport timing error group.

The corresponding relationship information includes the first receiving-transmitting time difference, feature information of the first receiving-transmitting timing error group that has a corresponding relationship with the first receiving-transmitting time difference, and feature information of the second receiving-transmitting timing error group that has a corresponding relationship with the first receiving-transmitting time difference.

A first receive timing error corresponding to the first receiving-transmitting time difference is located in a division range of the first receive timing error group having the corresponding relationship with the first receiving-transmitting time difference. The second transport timing error corresponding to the first receiving-transmitting time difference is located in a division range of the second transport timing error group having the corresponding relationship with the first receiving-transmitting time difference.

In a possible implementation, the first positioning measurement value includes a receiving moment of the first reference signal.

The apparatus is further configured to perform the following operations:
  determining a second transport timing error of the second reference signal;
  transmitting the second reference signal to the transmitting end of the first reference signal, and determining a transmitting moment of the second reference signal.

The dividing the first receive timing errors into groups according to the first receive timing error group configuration parameter, includes: summing the first receive timing error and the second transport timing error, and dividing summation results into groups according to the first receive timing error group configuration parameter, thereby obtaining first receiving-transmitting timing error group information.

The apparatus is further configured to perform the following operations:
  obtaining a first receiving-transmitting time difference according to a receiving moment of the first reference signal and a transmitting moment of the second reference signal; determining corresponding relationship information of the first receiving-transmitting time difference, and transmitting the corresponding relationship information to a location management function module so that the location management function module performs positioning.

The first receiving-transmitting timing error group information includes feature information of at least one first receiving-transmitting timing error group.

The corresponding relationship information includes the first receiving-transmitting time difference and feature information of the first receiving-transmitting timing error group that has a corresponding relationship with the first receiving-transmitting time difference. The first receiving-transmitting timing error group includes a summation result of the first receive timing error of the first reference signal and the second transport timing error of the second reference signal, which are corresponding to the first receiving-transmitting time difference, respectively.

Further, the transceiver 310 is used to transmit and receive data under the control of the processor 300.

In FIG. 11, a bus architecture may include any number of interconnected bus and bridge. Specifically, various circuits of one or more processors, which are represented by the processor 300, and one or more memories, which are represented by the memory 320, are linked together. The bus architecture may link various other circuits, such as a peripheral device, voltage regulator and a power management circuit together. These features are well known in this field; therefore, this disclosure does not make further description on these features. The bus interface provides an interface. The transceiver 310 may be multiple elements, including a transmitter and a receiver and provide units, which communicate with other devices on the transmission medium. The transmission medium includes wireless channels, wired channels, and optical cables. For different UEs, the user interface 330 may also be an interface capable of externally connecting required devices, and the connected devices include but are not limited to keypads, displays, speakers, microphones, joysticks, etc.

The processor 300 is responsible for managing the bus architecture and the normal processing. The memory 320 may be used to store data used by the processor 300 for performing operations.

Optionally, the processor 300 may be a central processing unit (CPU), an application specific integrated circuit (ASIC), a field-programmable gate array (FPGA) or a complex programmable logic device (CPLD). The processor 300 may also adopt multi-core architecture.

The processor is used to call the computer program stored in the memory, and execute any method provided in the embodiments of the present disclosure according to obtained executable instructions. The processor 300 and the memory 320 may also be physically separated.

Figure 12:
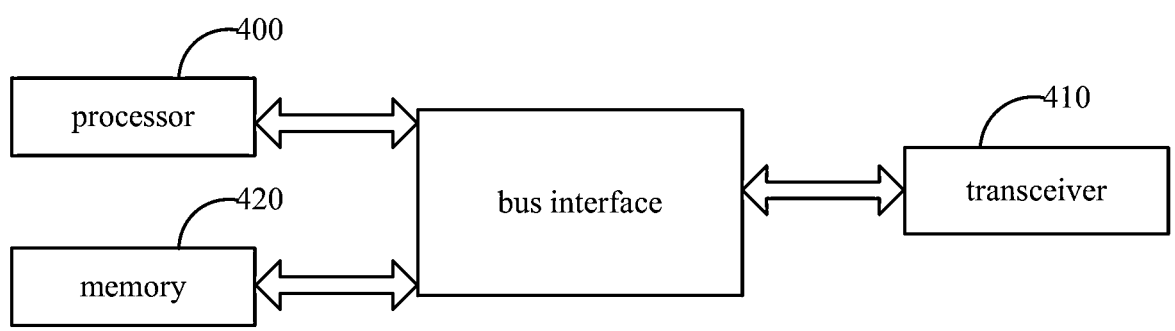
FIG. 12 is a schematic diagram of another apparatus according to an embodiment of the present disclosure.

FIG. 12 is a schematic diagram of another apparatus according to an embodiment of the present disclosure. As shown in FIG. 12, the apparatus includes: a memory 420, a transceiver 410, and a processor 400.

The memory 420 is used to store a computer program. The transceiver 410 is used to transmit and receive data under the control of the processor. The processor 400 is used to read the computer program in the memory and perform the following operations:
  obtaining a second timing error group configuration parameter;
  determining first transport timing errors of a first reference signal, and dividing the first transport timing errors into groups according to the second timing error group configuration parameter to obtain first transport timing error groups;
  transmitting the first reference signal.

The first reference signal includes one of a positioning reference signal and a sounding reference signal.

In a possible implementation, the obtaining a second timing error group configuration parameter, includes:
  receiving the second timing error group configuration parameter which is determined by a location management function module according to positioning requirement.

The positioning requirement includes at least one of a positioning accuracy of the UE, a positioning scenario, and capability information for indicating that the UE supports dividing first receive timing errors into groups.

In a possible implementation, the second timing error group configuration parameter includes a second grouping granularity.

The dividing the first transport timing errors into groups according to the second timing error group configuration parameter to obtain at least one first transport timing error group, includes:
  determining division ranges of first transport timing error groups according to the second grouping granularity;

dividing the first transport timing errors into groups according to the division ranges, to obtain at least one first transport timing error group.

In a possible implementation, any one first transport timing error in the first transport timing error group is located in a division range of the first transport timing error group; or, a difference between any one first transport timing error in the first transport timing error group and at least one other first transport timing error in the first transport timing error group except for the any one first transport timing error, is located in a division range of the first transport timing error group.

In a possible implementation, the apparatus is further configured to perform the following operations:

generating first transport timing error group information;

transmitting the first transport timing error group information to the location management function module; where the first transport timing error group information includes feature information of at least one first transport timing error group.

The feature information includes at least one of an error group identifier, an actual range, and an actual range relative difference.

In a possible implementation, the apparatus is further configured to perform the following operations:

receiving the second reference signal from the receiving end of the first reference signal, and determining a second receive timing error and a receiving moment of the second reference signal;

dividing the second receive timing errors into groups according to the second timing error group configuration parameter, thereby obtaining the second receive timing error group information; where the second receive timing error group information includes feature information of at least one second receive timing error group;

determining a second receiving-transmitting time difference according to the receiving moment of the second reference signal and the transmitting moment of the first reference signal;

determining correspondence information of the second receiving-transmitting time difference, and transmitting the correspondence information to the location management function module, so that the location management function module performs positioning.

When the first reference signal is a positioning reference signal, the second reference signal is a sounding reference signal. When the first reference signal is a sounding reference signal, the second reference signal is a positioning reference signal.

The correspondence information includes the second receiving-transmitting time difference, feature information of the second receiving-transmitting timing error group that has a corresponding relationship with the second receiving-transmitting time difference, and feature information of the first receiving-transmitting timing error group that has a corresponding relationship with the second receiving-transmitting time difference.

A second receive timing error corresponding to the second receiving-transmitting time difference is located in a division range of the second receive timing error group having the corresponding relationship with the second receiving-transmitting time difference. A first transport timing error corresponding to the second receiving-transmitting time difference is located in a division range of the first transport timing error group having the corresponding relationship with the second receiving-transmitting time difference.

In a possible implementation, the apparatus is further configured to perform the following operations:

receiving a second reference signal from the receiving end of the first reference signal to obtain a second positioning measurement value; where the second positioning measurement value includes a receiving moment of the second reference signal; and determining a second receive timing error of the second reference signal.

The dividing the first transport timing errors into groups according to the second timing error group configuration parameter, includes: summing the second receive time error and the first transport timing error, and dividing summation results into groups according to the second timing error group configuration parameter, thereby obtaining second receiving-transmitting timing error group information.

The apparatus is further configured to perform the following operations:

obtaining a second receiving-transmitting time difference according to the receiving moment of the second reference signal and the transmitting moment of the first reference signal, determining correspondence information of the second receiving-transmitting time difference, and transmitting the correspondence information to the location management function module, so that the location management function module performs positioning;

where the receiving-transmitting timing error group information includes feature information of at least one receiving-transmitting timing error group.

The correspondence information includes the second receiving-transmitting time difference and feature information of the second receiving-transmitting timing error group that has a corresponding relationship with the second receiving-transmitting time difference. The second receiving-transmitting timing error group includes a summation result of the second receive timing error of the second reference information and the first transport timing error of the first reference signal, which are corresponding to the second receiving-transmitting time difference, respectively.

Further, the transceiver 410 is used to transmit and receive data under the control of the processor 400.

In FIG. 12, a bus architecture may include any number of interconnected bus and bridge. Specifically, various circuits of one or more processors, which are represented by the processor 400, and one or more memories, which are represented by the memory 420, are linked together. The bus architecture may link various other circuits, such as a peripheral device, voltage regulator and a power management circuit together. These features are well known in this field; therefore, this disclosure does not make further description on these features. The bus interface provides an interface. The transceiver 410 may be multiple elements, including a transmitter and a receiver and provide units, which communicate with other devices on the transmission medium. The transmission medium includes wireless channels, wired channels, and optical cables. The processor 400 is responsible for managing the bus architecture and the normal processing. The memory 420 may be used to store data used by the processor 400 for performing operations.

Optionally, the processor 400 may be a central processing unit (CPU), an application specific integrated circuit (ASIC), a field-programmable gate array (FPGA) or a complex programmable logic device (CPLD). The processor 400 may also adopt multi-core architecture.

It is to be noted here that the foregoing apparatus provided in the embodiments of the present disclosure can implement all the method steps implemented by the above method embodiment, and can achieve the same technical effect. The parts and beneficial effects in this embodiment that are the same as those in the method embodiment will not be repeated here.

Figure 13:
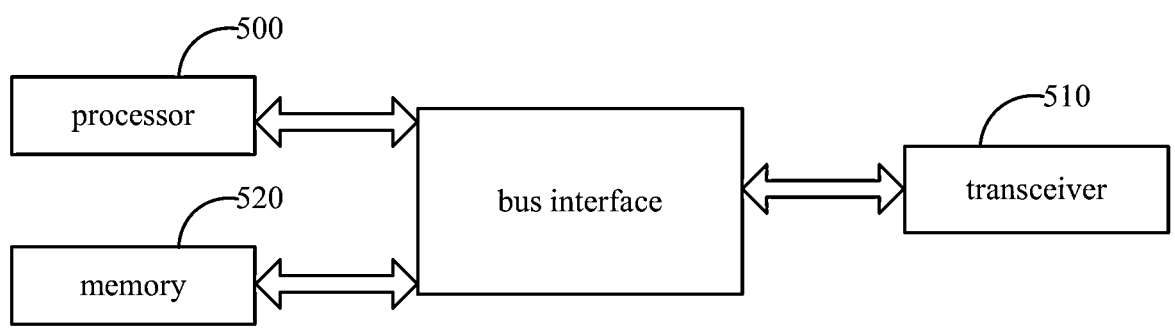
FIG. 13 is a schematic diagram of yet another apparatus according to an embodiment of the present disclosure.

FIG. 13 is a schematic diagram of another apparatus according to an embodiment of the present disclosure. As shown in FIG. 13, the apparatus includes: a memory 520, a transceiver 510, and a processor 500.

The memory 520 is used to store a computer program. The transceiver 510 is used to transmit and receive data under the control of the processor. The processor 500 is used to read the computer program in the memory and perform the following operations:

transmitting a first timing error group configuration parameter to a receiving end of a first reference signal, thereby enabling the receiving end to obtain first receive timing error group information according to the first timing error group configuration parameter;

where the first reference signal is a positioning reference signal or a sounding reference signal.

The first receive timing error group information includes feature information of at least one first receive timing error group. The feature information includes at least one of an error group identifier, an actual range, and an actual range relative difference.

In a possible implementation, the apparatus is further configured to perform the following operations:

receiving correspondence information from the receiving end of the first reference signal, and performing positioning according to the correspondence information;

where the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value.

The first positioning measurement value is used to represent a distance between the transmitting end and the receiving end of the first reference signal.

In a possible implementation, performing positioning according to the correspondence information, includes:

when the first reference signal is a positioning reference signal, obtaining a reference signal timing difference according to first positioning measurement values which are corresponding to the feature information of the same first receive timing error group and respectively corresponding to different transmitting ends; and performing positioning according to the reference signal timing difference;

when the first reference signal is a sounding reference signal, obtaining a difference of first positioning measurement values which are corresponding to different transmitting ends, and performing positioning based on the obtained difference;

where the different transmitting ends include a reference base station and a non-reference base station.

In a possible implementation, the apparatus is further configured to perform the following operations:

receiving first transport timing error group information from the transmitting end of the first reference signal, and transmitting the first transport timing error group information to the receiving end of the first reference signal, thereby enabling the receiving end of the first reference signal to generate correspondence information;

receiving the correspondence information from the receiving end of the first reference signal, and performing positioning according to the correspondence information.

The correspondence information includes corresponding relationship among the first positioning measurement value, the feature information of the first receive timing error group, and the feature information of the first transport timing error group. A first receive timing error of the first positioning measurement value is located in a division range of the first receive timing error group having the corresponding relationship with the first positioning measurement value. A first transport timing error of the first reference signal corresponding to the first positioning measurement value is located in a division range of the first transport timing error group having the corresponding relationship with the first positioning measurement value.

In a possible implementation, performing positioning according to the correspondence information, includes:

taking first positioning measurement value pairs, which are corresponding to the feature information of the same first receive timing error group and respectively corresponding to different transmitting ends, as a basic first positioning measurement value pair;

determining similarity between feature information of first transport timing error groups corresponding to any basic first positioning measurement value pairs;

determining a difference between two first positioning measurement values in at least one basic first positioning measurement value pair with the greatest similarity, and performing positioning according to the difference.

In a possible implementation, the apparatus is further configured to perform the following operations:

receiving correspondence information of a first receiving-transmitting time difference from a receiving end of a first reference signal and correspondence information of a second receiving-transmitting time difference from a receiving end of a second reference signal;

determining at least two target receiving-transmitting time difference pairs according to the correspondence information of the first receiving-transmitting time difference and the correspondence information of the second receiving-transmitting time difference; where the target receiving-transmitting time difference pair includes a first receiving-transmitting time difference and a second receiving-transmitting time difference;

determining a corresponding round-trip delay according to the target receiving-transmitting time difference, and performing positioning based on the round-trip delay.

The transmitting end of the second reference signal is the receiving end of the first reference signal, and the first receiving-transmitting time difference is obtained by the receiving end of the first reference signal according to a receiving moment of the first reference signal and a transmitting moment of the second reference signal.

The receiving end of the second reference signal is a transmitting end of first reference signal. The second receiving-transmitting time difference is obtained by the receiving end of the second reference signal according to a receiving moment of the second reference signal and a transmitting moment of the first reference signal.

In a possible implementation, the correspondence information of the first receiving-transmitting time difference includes the first receiving-transmitting time difference, feature information of the first receive timing error group having a corresponding relationship with the first receiving-transmitting time difference, and feature information of the second transport timing error group having the corresponding relationship with the first receiving-transmitting time difference.

A first receive timing error corresponding to the first receiving-transmitting time difference is located in a division range of the first receive timing error group having the corresponding relationship with the first receiving-transmitting time difference. The second transport timing error corresponding to the first receiving-transmitting time difference is located in a division range of the second transport timing error group having the corresponding relationship with the first receiving-transmitting time difference.

The correspondence information of the second receiving-transmitting time difference includes the second receiving-transmitting time difference, feature information of the second receive timing error group having the corresponding relationship with the second receiving-transmitting time difference, and feature information of the first transport timing error group having the corresponding relationship with the second receiving-transmitting time difference.

A second receive timing error corresponding to the second receiving-transmitting time difference is located in a division range of the second receive timing error group having the corresponding relationship with the second receiving-transmitting time difference. The first transport timing error corresponding to the second receiving-transmitting time difference is located in a division range of the first transport timing error group having the corresponding relationship with the second receiving-transmitting time difference.

For a first receiving-transmitting time difference in any two target receiving-transmitting time difference pairs: similarity of feature information of the first receive timing error groups that have corresponding relationship with first receive timing errors which are corresponding to two first receiving-transmitting time differences respectively, is greater than a first preset threshold; similarity of feature information of the second transport timing error groups that have corresponding relationship with second transport timing errors which are corresponding to two first receiving-transmitting time differences respectively, is greater than a second preset threshold.

For a second receiving-transmitting time difference in any two target receiving-transmitting time difference pairs: similarity of feature information of the second receive timing error groups that have corresponding relationship with second receive timing errors which are corresponding to two second receiving-transmitting time differences respectively, is greater than a third preset threshold; similarity of feature information of the first transport timing error groups that have corresponding relationship with first transport timing errors which are corresponding to two second receiving-transmitting time differences respectively, is greater than a fourth preset threshold.

In a possible implementation, the correspondence information of the first receiving-transmitting time difference includes the first receiving-transmitting time difference and feature information of a first receiving-transmitting timing error group having corresponding relationship with the first receiving-transmitting time difference. The first receiving-transmitting timing error group includes a summation result of the first receive timing error of the first reference signal and the second transport timing error of the second reference signal, which are corresponding to the first receiving-transmitting time difference, respectively.

The correspondence information of the second receiving-transmitting time difference includes the second receiving-transmitting time difference and feature information of a second receiving-transmitting timing error group having corresponding relationship with the second receiving-transmitting time difference. The second receiving-transmitting timing error group includes a summation result of the second receive timing error of the second reference signal and the first transport timing error of the first reference signal, which are corresponding to the second receiving-transmitting time difference, respectively.

If it is determined that two receiving-transmitting time difference pairs which are corresponding to different base stations, respectively, have corresponding relationship with feature information of the same receiving-transmitting timing error group, then the two receiving-transmitting time difference pairs which are corresponding to different base stations, are taken as two target receiving-transmitting time difference pairs.

Further, the transceiver 510 is used to transmit and receive data under the control of the processor 500.

In FIG. 13, a bus architecture may include any number of interconnected bus and bridge. Specifically, various circuits of one or more processors, which are represented by the processor 500, and one or more memories, which are represented by the memory 520, are linked together. The bus architecture may link various other circuits, such as a peripheral device, voltage regulator and a power management circuit together. These features are well known in this field; therefore, this disclosure does not make further description on these features. The bus interface provides an interface. The transceiver 510 may be multiple elements, including a transmitter and a receiver and provide units, which communicate with other devices on the transmission medium. The transmission medium includes wireless channels, wired channels, and optical cables. The processor 500 is responsible for managing the bus architecture and the normal processing. The memory 520 may be used to store data used by the processor 500 for performing operations.

Optionally, the processor 500 may be a central processing unit (CPU), an application specific integrated circuit (ASIC), a field-programmable gate array (FPGA) or a complex programmable logic device (CPLD). The processor 500 may also adopt multi-core architecture.

It is to be noted here that the foregoing apparatus provided in the embodiments of the present disclosure can implement all the method steps implemented by the above method embodiment, and can achieve the same technical effect. The parts and beneficial effects in this embodiment that are the same as those in the method embodiment will not be repeated here.

Figure 14:
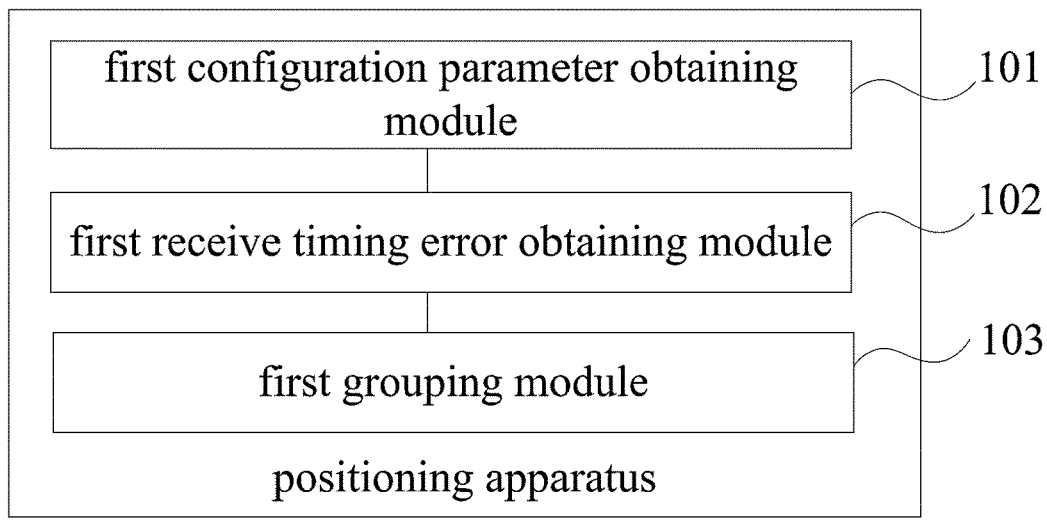
FIG. 14 is a schematic diagram of a positioning apparatus according to an embodiment of the present disclosure.

One embodiment of the present disclosure further provides a positioning apparatus, as shown in FIG. 14, including:

a first configuration parameter obtaining module 101 configured to obtain a first timing error group configuration parameter;

a first receive timing error obtaining module 102 configured to receive a first reference signal to obtain first positioning measurement values, and determine first receiving timing errors of the first positioning measurement values;

a first grouping module 103 configured to divide the first receive timing errors into groups according to the first timing error group configuration parameter to obtain at least one first receive timing error group for positioning the terminal.

The first reference signal includes one of a positioning reference signal and a sounding reference signal. The first positioning measurement value is used to represent a distance between the transmitting end and the receiving end of the first reference signal.

Figure 15:
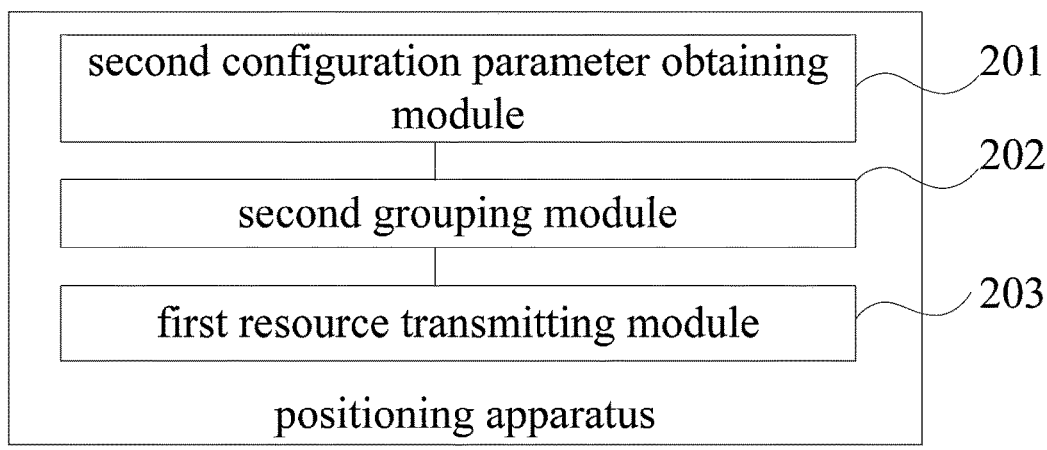
FIG. 15 is a schematic diagram of a positioning apparatus according to an embodiment of the present disclosure.

One embodiment of the present disclosure further provides a positioning apparatus, as shown in FIG. 15, including:
- a second configuration parameter obtaining module 201 configured to obtain a second timing error group configuration parameter;
- a second grouping module 202 configured to determine first transport timing errors of a first reference signal, and divide the first transport timing errors into groups according to the second timing error group configuration parameter to obtain first transport timing error groups;
- a first resource transmitting module 203 configured to transmit the first reference signal.

The first reference signal includes one of a positioning reference signal and a sounding reference signal.

Figure 16:
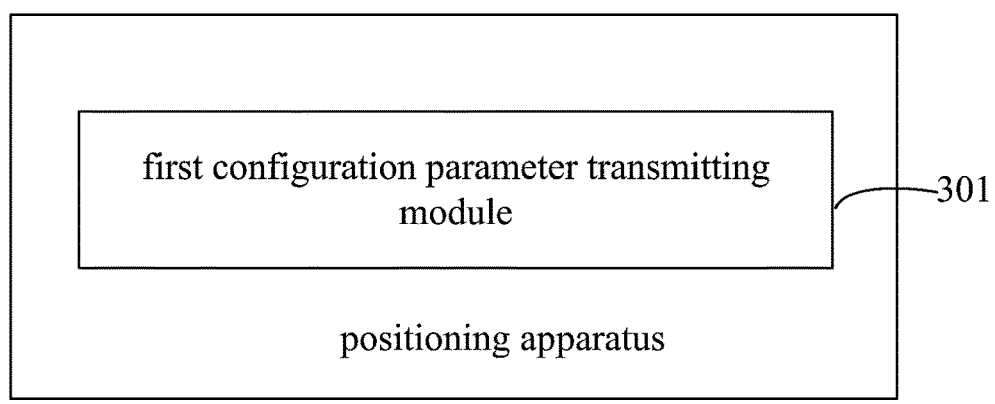
FIG. 16 is a schematic diagram of a positioning apparatus according to an embodiment of the present disclosure.

One embodiment of the present disclosure further provides a positioning apparatus, as shown in FIG. 16, including:
- a first configuration parameter transmitting module 301 configured to transmit a first timing error group configuration parameter to a receiving end of a first reference signal, thereby enabling the receiving end to obtain first receive timing error group information according to the first timing error group configuration parameter;
- where the first reference signal is a positioning reference signal or a sounding reference signal.

The first receive timing error group information includes feature information of at least one first receive timing error group. The feature information includes at least one of an error group identifier, an actual range, and an actual range relative difference.

One embodiment of the present disclosure further provides a processor-readable storage medium. The processor-readable storage medium stores a computer program. The computer program is configured to cause the processor to execute the above method.

The processor-readable storage medium may be any available medium or data storage device that can be accessed by a processor, including but not limited to magnetic storage (such as floppy disk, hard disk, magnetic tape, magneto-optical disk (MO)), optical storage (such as CD, DVD, BD, HVD), and semiconductor memory (such as ROM, EPROM, EEPROM, non-volatile memory (Nand flash), solid-state drive (SSD)).

It is to be understood that although various steps in the flowchart of the accompanying drawings are shown in sequence as indicated by arrows, these steps are not necessarily performed in the order indicated by the arrows. Unless otherwise defined, the execution of these steps is not strictly limited in order, and they can be executed in other orders. Moreover, at least some of the steps in the flow chart of the accompanying drawings may include multiple sub-steps or multiple stages. These sub-steps or stages are not necessarily executed at the same time, but may be executed at different times, and their execution order is not necessarily sequential, but may be performed in turn or alternately with other steps or at least part of sub-steps or the stages of other steps.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A positioning method, performed by a receiving end of a first reference signal, comprising:
   obtaining a first timing error group configuration parameter;
   receiving the first reference signal, obtaining first positioning measurement value, and determining first receiving timing errors of the first positioning measurement value;
   dividing the first receive timing errors into groups according to the first timing error group configuration parameter to obtain at least one first receive timing error group, wherein the at least one first receive timing error group is used for positioning a UE;
   wherein the first reference signal includes one of a positioning reference signal and a sounding reference signal; and the first positioning measurement value is used to represent a distance between a transmitting end and the receiving end of the first reference signal.

2. The positioning method according to claim 1, wherein the obtaining a first timing error group configuration parameter, includes:
   receiving the first timing error group configuration parameter which is determined by a location management function module according to positioning requirement;
   wherein the positioning requirement includes at least one of a positioning accuracy of a UE, a positioning scenario, and capability information for indicating that the UE supports dividing timing errors into groups; and the UE is the transmitting end or the receiving end of the first reference signal.

3. The positioning method according to claim 1, wherein the first timing error group configuration parameter includes a first grouping granularity;
   the dividing the first receive timing errors into groups according to the first timing error group configuration parameter to obtain at least one first receive timing error group, includes:
   determining division ranges of first receive timing error groups according to the first grouping granularity;
   dividing the first receive timing errors into groups according to the division ranges, to obtain the at least one first receive timing error group;
   wherein any one first receive timing error in the first receive timing error group is located in a division range of the first receive timing error group; or,
   a difference between any one first receive timing error in the first receive timing error group and at least one other first receive timing error in the first receive timing error group except for the any one first receive timing error, is located in a division range of the first receive timing error group.

4. The positioning method according to claim 1, wherein the positioning method further includes:
   generating first receive timing error group information;
   wherein the first receive timing error group information includes feature information of the at least one first receive timing error group;
   the feature information includes at least one of an error group identifier, an actual range, or an actual range relative difference;

wherein the positioning method further includes:
determining correspondence information of the first positioning measurement value according to the first receive timing error group information; wherein the correspondence information includes the first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value;

or, receiving first transport timing error group information determined by the transmitting end; determining correspondence information of the first positioning measurement value, according to the first transport timing error group information and the first receive timing error group information; wherein the first transport timing error group information includes feature information of at least one first transport timing error group; the correspondence information includes the first positioning measurement value, feature information of a first receive timing error group having a corresponding relationship with the first positioning measurement value and feature information of a first transport timing error group having a corresponding relationship with the first positioning measurement value; a first receive timing error of the first positioning measurement value is located in a division range of the first receive timing error group having the corresponding relationship with the first positioning measurement value; a first transport timing error of the first positioning measurement value is located in a division range of the first transport timing error group having the corresponding relationship with the first positioning measurement value.

5. The positioning method according to claim 4, wherein the positioning method further includes:
transmitting the correspondence information to a location management function module, wherein the correspondence information is used to enable the location management function module to perform positioning; or,
when the first reference signal is a positioning reference signal, performing, by the receiving end, positioning according to the correspondence information;

or, wherein the positioning method further includes:
when the first reference signal is a positioning reference signal, determining at least one pair of first positioning measurement values which are corresponding to different transmitting ends, respectively, as a target first positioning measurement value pair, and obtaining a reference signal timing difference of the target first positioning measurement value pair;
obtaining correspondence information of each first positioning measurement value in the target first positioning measurement value pair, as target correspondence information of the target first positioning measurement value pair;
wherein the different transmitting ends include a reference base station and a non-reference base station;

or, wherein the positioning method further includes:
determining second transport timing errors of a second reference signal, and dividing the second transport timing errors into groups according to the first timing error group configuration parameter to obtain second transport timing error group information;
transmitting the second reference signal to the transmitting end of the first reference signal, and determining a transmitting moment of the second reference signal;
obtaining a first receiving-transmitting time difference according to a receiving moment of the first reference signal and the transmitting moment of the second reference signal; wherein the first positioning measurement value includes the receiving moment of the first reference signal;
determining corresponding relationship information of the first receiving-transmitting time difference, and transmitting the corresponding relationship information to a location management function module, thereby enabling the location management function module to perform positioning;
wherein when the first reference signal is a positioning reference signal, the second reference signal is a sounding reference signal; when the first reference signal is a sounding reference signal, the second reference signal is a positioning reference signal;
the second transport timing error group information includes feature information of at least one second transport timing error group;
the corresponding relationship information includes the first receiving-transmitting time difference, feature information of a first receiving-transmitting timing error group having a corresponding relationship with the first receiving-transmitting time difference, and feature information of a second receiving-transmitting timing error group having a corresponding relationship with the first receiving-transmitting time difference;
a first receive timing error corresponding to the first receiving-transmitting time difference is located in a division range of the first receive timing error group having the corresponding relationship with the first receiving-transmitting time difference; a second transport timing error corresponding to the first receiving-transmitting time difference is located in a division range of the second transport timing error group having the corresponding relationship with the first receiving-transmitting time difference.

6. The positioning method according to claim 5, wherein the determining at least one pair of first positioning measurement values which are corresponding to different transmitting ends, respectively, as a target first positioning measurement value pair, includes:
in case that there is a correspondence between the feature information of the same first receive timing error group and two first positioning measurement values corresponding to different transmitting ends respectively, obtaining the target first positioning measurement value pair according to the two first positioning measurement values corresponding to different transmitting ends respectively;
wherein the positioning method further includes:
receiving first transport timing error group information determined by the transmitting end;
determining correspondence information of the first positioning measurement value, according to the first receive timing error group information and the first transport timing error group information;
wherein the first transport timing error group information includes feature information of at least one first transport timing error group;

wherein the correspondence information includes the first positioning measurement value, feature information of a first receive timing error group having a corresponding relationship with the first positioning measurement value and feature information of the first transport timing error group having a corresponding relationship with the first positioning measurement value; a first receive timing error of the first positioning measurement value is located in a division range of the first receive timing error group having the corresponding relationship with the first positioning measurement value; and a first transport timing error of the first positioning measurement value is located in the division range of the first transport timing error group having the corresponding relationship with the first positioning measurement value;

wherein the obtaining the target first positioning measurement value pair according to the two first positioning measurement values corresponding to different transmitting ends respectively, includes:

determining similarity between feature information of a first transport timing error group corresponding to a first positioning measurement value of the reference base station and feature information of a first transport timing error group corresponding to a first positioning measurement value of the non-reference base station;

taking at least one pair of first positioning measurement values corresponding to different transmitting ends respectively, with the greatest similarity, as the target first positioning measurement value pair;

wherein the positioning method further includes:

transmitting a reference signal timing difference of the target first positioning measurement value pair and the target correspondence information to a location management function module, wherein the reference signal timing difference and the target correspondence information are used to enable the location management function module to perform positioning, or, performing positioning according to the reference signal timing difference of the target first positioning measurement value pair and the target correspondence information.

7. The positioning method according to claim 1, wherein the first positioning measurement value includes a receiving moment of the first reference signal;

the positioning method further includes:

determining a second transport timing error of a second reference signal;

transmitting the second reference signal to the transmitting end of the first reference signal, and determining a transmitting moment of the second reference signal;

wherein the dividing the first receive timing errors into groups according to the first receive timing error group configuration parameter, includes: summing the first receive timing error and the second transport timing error, and dividing summation results into groups according to the first receive timing error group configuration parameter, thereby obtaining first receiving-transmitting timing error group information;

the positioning method further includes:

obtaining a first receiving-transmitting time difference according to the receiving moment of the first reference signal and the transmitting moment of the second reference signal; determining corresponding relationship information of the first receiving-transmitting time difference, and transmitting the corresponding relationship information to a location management function module, thereby enabling the location management function module to perform positioning;

wherein the first receiving-transmitting timing error group information includes feature information of at least one first receiving-transmitting timing error group;

the corresponding relationship information includes the first receiving-transmitting time difference and feature information of a first receiving-transmitting timing error group having a corresponding relationship with the first receiving-transmitting time difference; the first receiving-transmitting timing error group includes a summation result of the first receive timing error of the first reference signal and the second transport timing error of the second reference signal, which are corresponding to the first receiving-transmitting time difference, respectively.

8. An apparatus for performing the method according to claim 1, comprising: a memory, a transceiver and a processor;

wherein the memory is used to store a computer program; the transceiver is used to transmit and receive data under the control of the processor; the processor is used to read the computer program in the memory and perform the following operations:

obtaining a first timing error group configuration parameter;

receiving the first reference signal to obtain first positioning measurement value, and determining first receiving timing errors of the first positioning measurement value;

dividing the first receive timing errors into groups according to the first timing error group configuration parameter to obtain at least one first receive timing error group for positioning a UE;

wherein the first reference signal includes one of a positioning reference signal and a sounding reference signal; and the first positioning measurement value is used to represent a distance between a transmitting end and the receiving end of the first reference signal.

9. A positioning method, performed by a transmitting end of a first reference signal, comprising:

obtaining a second timing error group configuration parameter;

determining first transport timing errors of the first reference signal, and dividing the first transport timing errors into groups according to the second timing error group configuration parameter to obtain at least one first transport timing error group;

transmitting the first reference signal;

wherein the first reference signal includes one of a positioning reference signal and a sounding reference signal.

10. The positioning method according to claim 9, wherein the obtaining a second timing error group configuration parameter, includes:

receiving the second timing error group configuration parameter which is determined by a location management function module according to positioning requirement;

wherein the positioning requirement includes at least one of a positioning accuracy of a UE, a positioning scenario, and capability information for indicating that the UE supports dividing timing errors into groups.

11. The positioning method according to claim 9, wherein the second timing error group configuration parameter includes a second grouping granularity;

the dividing the first transport timing errors into groups according to the second timing error group configuration parameter to obtain at least one first transport timing error group, includes:
determining division ranges of first transport timing error groups according to the second grouping granularity;
dividing the first transport timing errors into groups according to the division ranges, to obtain the at least one first transport timing error group;
wherein any one first transport timing error in the first transport timing error group is located in a division range of the first transport timing error group; or,
a difference between any one first transport timing error in the first transport timing error group and at least one other first transport timing error in the first transport timing error group except for the any one first transport timing error, is located in a division range of the first transport timing error group.

12. The positioning method according to claim 9, wherein the positioning method further includes:
generating first transport timing error group information;
transmitting the first transport timing error group information to a location management function module; wherein the first transport timing error group information includes feature information of at least one first transport timing error group;
wherein the feature information includes at least one of an error group identifier, an actual range, and an actual range relative difference;
or,
wherein the positioning method further includes:
receiving a second reference signal from a receiving end of the first reference signal to obtain a second positioning measurement value; wherein the second positioning measurement value includes a receiving moment of the second reference signal; and determining a second receive timing error of the second reference signal;
the dividing the first transport timing errors into groups according to the second timing error group configuration parameter, includes: summing the second receive timing error and the first transport timing error, and dividing summation results into groups according to the second timing error group configuration parameter, thereby obtaining second receiving-transmitting timing error group information;
wherein the positioning method further includes:
obtaining a second receiving-transmitting time difference according to the receiving moment of the second reference signal and the transmitting moment of the first reference signal, determining correspondence information of the second receiving-transmitting time difference, and transmitting the correspondence information to a location management function module, thereby enabling the location management function module to perform positioning;
wherein the receiving-transmitting timing error group information includes feature information of at least one receiving-transmitting timing error group;
wherein the correspondence information includes the second receiving-transmitting time difference and feature information of a second receiving-transmitting timing error group having a corresponding relationship with the second receiving-transmitting time difference; the second receiving-transmitting timing error group includes a summation result of the second receive timing error of the second reference signal and the first transport timing error of the first reference signal, which are corresponding to the second receiving-transmitting time difference, respectively.

13. The positioning method according to claim 12, wherein the positioning method further includes:
receiving a second reference signal from a receiving end of the first reference signal, and determining second receive timing errors and a receiving moment of the second reference signal;
dividing the second receive timing errors into groups according to the second timing error group configuration parameter, thereby obtaining second receive timing error group information;
wherein the second receive timing error group information includes feature information of at least one second receive timing error group;
determining a second receiving-transmitting time difference according to the receiving moment of the second reference signal and a transmitting moment of the first reference signal;
determining correspondence information of the second receiving-transmitting time difference, and transmitting the correspondence information to a location management function module, wherein the correspondence information is used to enable the location management function module to perform positioning;
wherein when the first reference signal is a positioning reference signal, the second reference signal is a sounding reference signal; when the first reference signal is a sounding reference signal, the second reference signal is a positioning reference signal;
the correspondence information includes the second receiving-transmitting time difference, feature information of a second receiving-transmitting timing error group having a corresponding relationship with the second receiving-transmitting time difference, and feature information of a first receiving-transmitting timing error group having a corresponding relationship with the second receiving-transmitting time difference;
a second receive timing error corresponding to the second receiving-transmitting time difference is located in a division range of a second receive timing error group having a corresponding relationship with the second receiving-transmitting time difference; a first transport timing error corresponding to the second receiving-transmitting time difference is located in a division range of a first transport timing error group having a corresponding relationship with the second receiving-transmitting time difference.

14. An apparatus for performing the method according to claim 9, comprising: a memory, a transceiver and a processor;
wherein the memory is used to store a computer program; the transceiver is used to transmit and receive data under the control of the processor; the processor is used to read the computer program in the memory and perform the following operations:
obtaining a second timing error group configuration parameter;
determining first transport timing errors of the first reference signal, and dividing the first transport timing errors into groups according to the second timing error group configuration parameter to obtain at least one first transport timing error group;
transmitting the first reference signal;
wherein the first reference signal includes one of a positioning reference signal and a sounding reference signal.

15. A positioning method, performed by a location management function module, comprising:
transmitting a first timing error group configuration parameter to a receiving end of a first reference signal, wherein the first timing error group configuration parameter is used to enable thereby enabling the receiving end to obtain first receive timing error group information;
wherein the first reference signal is a positioning reference signal or a sounding reference signal;
the first receive timing error group information includes feature information of at least one first receive timing error group; the feature information includes at least one of an error group identifier, an actual range, and an actual range relative difference.

16. The positioning method according to claim 15, wherein the positioning method further includes:
receiving correspondence information from the receiving end of the first reference signal, and performing positioning according to the correspondence information;
wherein the correspondence information includes a first positioning measurement value and feature information of a first receive timing error group having a corresponding relationship with the first positioning measurement value; a first receive timing error of the first positioning measurement value is located in a division range of the first receive timing error group having the corresponding relationship with the first positioning measurement value;
the first positioning measurement value is used to represent a distance between a transmitting end and the receiving end of the first reference signal;
or,
wherein the positioning method further includes:
transmitting a second timing error group configuration parameter to a transmitting end of the first reference signal, wherein the second timing error group configuration parameter is used to enable the transmitting end of the first reference signal to obtain first transport timing error group information;
wherein the first transport timing error group information includes feature information of at least one first transport timing error group.

17. The positioning method according to claim 16, wherein the performing positioning according to the correspondence information, includes:
when the first reference signal is a positioning reference signal, obtaining a reference signal timing difference according to first positioning measurement values which are corresponding to the feature information of the same first receive timing error group and respectively corresponding to different transmitting ends; and performing positioning according to the reference signal timing difference;
when the first reference signal is a sounding reference signal, obtaining a difference of first positioning measurement values which are corresponding to different transmitting ends, and performing positioning based on an obtained difference;
wherein the different transmitting ends include a reference base station and a non-reference base station;
or,
wherein the positioning method further includes:
receiving first transport timing error group information from the transmitting end of the first reference signal, and transmitting the first transport timing error group information to the receiving end of the first reference signal, wherein the first transport timing error group information is used to enable the receiving end of the first reference signal to generate correspondence information;
receiving the correspondence information from the receiving end of the first reference signal, and performing positioning according to the correspondence information;
wherein the first transport timing error group information includes feature information of at least one first transport timing error group;
wherein the correspondence information includes corresponding relationship among a first positioning measurement value, the feature information of the first receive timing error group, and the feature information of the first transport timing error group; a first receive timing error of the first positioning measurement value is located in a division range of a first receive timing error group having the corresponding relationship with the first positioning measurement value; a first transport timing error of the first reference signal corresponding to the first positioning measurement value is located in a division range of the first transport timing error group having the corresponding relationship with the first positioning measurement value;
or,
wherein the positioning method further includes:
receiving correspondence information of a first receiving-transmitting time difference from the receiving end of the first reference signal and correspondence information of a second receiving-transmitting time difference from a receiving end of the second reference signal;
determining at least two target receiving-transmitting time difference pairs according to the correspondence information of the first receiving-transmitting time difference and the correspondence information of the second receiving-transmitting time difference; wherein the target receiving-transmitting time difference pair includes a first receiving-transmitting time difference and a second receiving-transmitting time difference;
determining a corresponding round-trip delay according to the target receiving-transmitting time difference, and performing positioning based on the round-trip delay;
wherein the transmitting end of the second reference signal is the receiving end of the first reference signal, and the first receiving-transmitting time difference is obtained by the receiving end of the first reference signal according to a receiving moment of the first reference signal and a transmitting moment of the second reference signal;
wherein the receiving end of the second reference signal is a transmitting end of the first reference signal; the second receiving-transmitting time difference is obtained by the receiving end of the second reference signal according to a receiving moment of the second reference signal and a transmitting moment of the first reference signal.

18. The positioning method according to claim 17, wherein the performing positioning according to the correspondence information, includes:
taking first positioning measurement value pairs, which are corresponding to feature information of the same first receive timing error group and respectively corresponding to different transmitting ends, as a basic first positioning measurement value pair;

determining similarity between feature information of first transport timing error groups corresponding to any basic first positioning measurement value pairs;

determining a difference between two first positioning measurement values in at least one basic first positioning measurement value pair with the greatest similarity, and performing positioning according to the difference.

19. The positioning method according to claim 17, wherein the correspondence information of the first receiving-transmitting time difference includes the first receiving-transmitting time difference, feature information of the first receive timing error group having a corresponding relationship with the first receiving-transmitting time difference, and feature information of the second transport timing error group having a corresponding relationship with the first receiving-transmitting time difference;

a first receive timing error corresponding to the first receiving-transmitting time difference is located in a division range of the first receive timing error group having the corresponding relationship with the first receiving-transmitting time difference; a second transport timing error corresponding to the first receiving-transmitting time difference is located in a division range of the second transport timing error group having the corresponding relationship with the first receiving-transmitting time difference;

the correspondence information of the second receiving-transmitting time difference includes the second receiving-transmitting time difference, feature information of the second receive timing error group having a corresponding relationship with the second receiving-transmitting time difference, and feature information of the first transport timing error group having a corresponding relationship with the second receiving-transmitting time difference;

a second receive timing error corresponding to the second receiving-transmitting time difference is located in a division range of the second receive timing error group having the corresponding relationship with the second receiving-transmitting time difference; a first transport timing error corresponding to the second receiving-transmitting time difference is located in a division range of the first transport timing error group having the corresponding relationship with the second receiving-transmitting time difference;

for a first receiving-transmitting time difference in any two target receiving-transmitting time difference pairs: similarity of feature information of the first receive timing error groups that have corresponding relationship with first receive timing errors which are corresponding to two first receiving-transmitting time differences respectively, is greater than a first preset threshold; similarity of feature information of the second transport timing error groups that have corresponding relationship with second transport timing errors which are corresponding to two first receiving-transmitting time differences respectively, is greater than a second preset threshold;

for a second receiving-transmitting time difference in any two target receiving-transmitting time difference pairs: similarity of feature information of the second receive timing error groups that have corresponding relationship with second receive timing errors which are corresponding to two second receiving-transmitting time differences respectively, is greater than a third preset threshold; similarity of feature information of the first transport timing error groups that have corresponding relationship with first transport timing errors which are corresponding to two second receiving-transmitting time differences respectively, is greater than a fourth preset threshold;

or, wherein the correspondence information of the first receiving-transmitting time difference includes the first receiving-transmitting time difference and feature information of a first receiving-transmitting timing error group having a corresponding relationship with the first receiving-transmitting time difference; the first receiving-transmitting timing error group includes a summation result of the first receive timing error of the first reference signal and the second transport timing error of the second reference signal, which are corresponding to the first receiving-transmitting time difference, respectively;

the correspondence information of the second receiving-transmitting time difference includes the second receiving-transmitting time difference and feature information of a second receiving-transmitting timing error group having a corresponding relationship with the second receiving-transmitting time difference; the second receiving-transmitting timing error group includes a summation result of the second receive timing error of the second reference signal and the first transport timing error of the first reference signal, which are corresponding to the second receiving-transmitting time difference, respectively;

in case that two receiving-transmitting time difference pairs which are corresponding to different base stations, respectively, have corresponding relationship with feature information of the same receiving-transmitting timing error group, then the two receiving-transmitting time difference pairs which are corresponding to different base stations, are taken as two target receiving-transmitting time difference pairs.

20. An apparatus for performing the method according to claim 15, comprising: a memory, a transceiver and a processor;

wherein the memory is used to store a computer program; the transceiver is used to transmit and receive data under the control of the processor; the processor is used to read the computer program in the memory and perform the following operations:

transmitting a first timing error group configuration parameter to a receiving end of a first reference signal, wherein the first timing error group configuration parameter is used to enable thereby enabling the receiving end to obtain first receive timing error group information;

wherein the first reference signal is a positioning reference signal or a sounding reference signal;

the first receive timing error group information includes feature information of at least one first receive timing error group; the feature information includes at least one of an error group identifier, an actual range, and an actual range relative difference.

* * * * *